United States Patent
Strandzhev et al.

(10) Patent No.: US 10,212,045 B2
(45) Date of Patent: Feb. 19, 2019

(54) METHOD AND SYSTEM FOR TESTING AND ANALYZING MANAGEMENT SERVERS

(71) Applicant: VMware, Inc., Palo Alto, CA (US)

(72) Inventors: Ivaylo Petkov Strandzhev, Sofia (BG); Danail Grigorov, Sofia (BG); Asen Alexandrov, Sofia (BG); Ilko Dragoev, Sofia (BG)

(73) Assignee: VMware, Inc., Palo Alto, CA (US)

( * ) Notice: Subject to any disclaimer, the term of this patent is extended or adjusted under 35 U.S.C. 154(b) by 539 days.

(21) Appl. No.: 14/755,594

(22) Filed: Jun. 30, 2015

(65) Prior Publication Data

US 2017/0005878 A1  Jan. 5, 2017

(51) Int. Cl.
| | |
|---|---|
| G06F 9/455 | (2018.01) |
| H04L 12/24 | (2006.01) |
| H04L 29/08 | (2006.01) |
| H04L 12/26 | (2006.01) |

(52) U.S. Cl.
CPC .......... H04L 41/20 (2013.01); G06F 9/45558 (2013.01); H04L 43/08 (2013.01); H04L 67/10 (2013.01); *G06F 2009/45591* (2013.01)

(58) Field of Classification Search
CPC ......... H04L 41/20; H04L 67/10; H04L 43/08; G06F 9/45558; G06F 2009/45591
See application file for complete search history.

(56) References Cited

U.S. PATENT DOCUMENTS

| | | | |
|---|---|---|---|
| 7,711,789 B1 * | 5/2010 | Jnagal ................. | G06F 3/0605 709/213 |
| 2013/0191105 A1 * | 7/2013 | Abdirashid ......... | G06F 17/5009 703/21 |
| 2014/0108717 A1 * | 4/2014 | Tian ..................... | G06F 3/0604 711/108 |
| 2015/0113162 A1 * | 4/2015 | Chan ................... | H04L 67/1008 709/238 |
| 2015/0117445 A1 * | 4/2015 | Koponen ............ | H04L 41/0896 370/389 |

* cited by examiner

*Primary Examiner* — Michael A Keller

(57) ABSTRACT

The current document is directed to methods and systems for testing and analyzing the operational characteristics of management servers that manage multiple host systems in distributed computing systems on which virtual data centers and other types of virtual infrastructure are implemented. Management servers are generally designed to manage host systems that include particular types of virtualization layers, referred to as "native host systems." In a described implementation, a management server is connected to a host-gateway appliance that includes host-gateway control logic implemented within a server computer. The host-gateway appliance allows a management server to interface to the management interfaces of non-native host systems that include visualization layers to which the management server is not designed to interface. The host-gateway appliance, in described implementations, is modified to simulate management interfaces of host systems in order to test and analyze the operational characteristics of the management server.

22 Claims, 40 Drawing Sheets

METHOD AND SYSTEM FOR TESTING AND ANALYZING MANAGEMENT SERVERS

TECHNICAL FIELD

The current document is directed to aggregation of computers into distributed computing systems and, in particular, to methods and systems for testing and analyzing the operational characteristics of management servers that manage host systems.

BACKGROUND

Early computer systems were monolithic, single-processor systems that executed only a single task at each point in time. The early computer systems lacked operating systems and basic programming facilities such as assemblers and compilers. During the first several decades of the computer revolution, many of the basic single-system components of computer systems were developed and evolved to produce capable, operating-system-controlled, multi-tasking computer systems. For another decade, rapid evolution of processor technology, data-storage technologies, memory, and communications technologies led to dramatic increases in the capabilities and capacities of single-processor computer systems. Ultimately, however, in order to achieve even greater capabilities and capacities, computer-system designers turned to multi-processor systems and then to more complex, distributed computing systems comprising aggregations of many intercommunicating computer systems. This turn towards distributed computing was facilitated by the development of distributed locking methods for controlling access to distributed computing resources, distributed operating systems, and high-bandwidth electronic communications. During the past few decades, extremely large cloud-computing facilities have been developed and commercialized to the point that computational bandwidth and data-storage capacity are provided to customers of large cloud-computing providers much as electrical power and water are provided to customers of utility companies. Cloud-computing facilities often employ hundreds, thousands, or more networked and often geographically distributed multi-processor servers that are controlled, by virtualization technology, to produce hierarchical layers of virtualized computing facilities.

Virtual data centers and other virtual data structures are generally implemented on large physical distributed computing systems, including computing systems that employ a management sever to manage a large number of host systems. Design, development, and maintenance of these systems generally involves significant testing and operational analysis of management servers. Designers, developers, administrators, and users of cloud-computing facilities and other large distributed computing systems therefore continue to seek new, cost-effective, and time-efficient approaches to testing and analysis of the operational characteristics of management servers.

SUMMARY

The current document is directed to methods and systems for testing and analyzing the operational characteristics of management servers that manage multiple host systems in distributed computing systems on which virtual data centers and other types of virtual infrastructure are implemented. Management servers are generally designed to manage host systems that include particular types of virtualization layers, referred to as "native host systems." In a described implementation, a management server is connected to a host-gateway appliance that includes host-gateway control logic implemented within a server computer. The host-gateway appliance allows a management server to interface to the management interfaces of non-native host systems that include visualization layers to which the management server is not designed to interface. The host-gateway appliance, in described implementations, is modified to simulate management interfaces of host systems in order to test and analyze the operational characteristics of the management server.

BRIEF DESCRIPTION OF THE DRAWINGS

In FIG. 9, three different physical data centers 902-904 are shown below planes representing the cloud-director layer of abstraction 906-908.

DETAILED DESCRIPTION OF EMBODIMENTS

Figure 1:
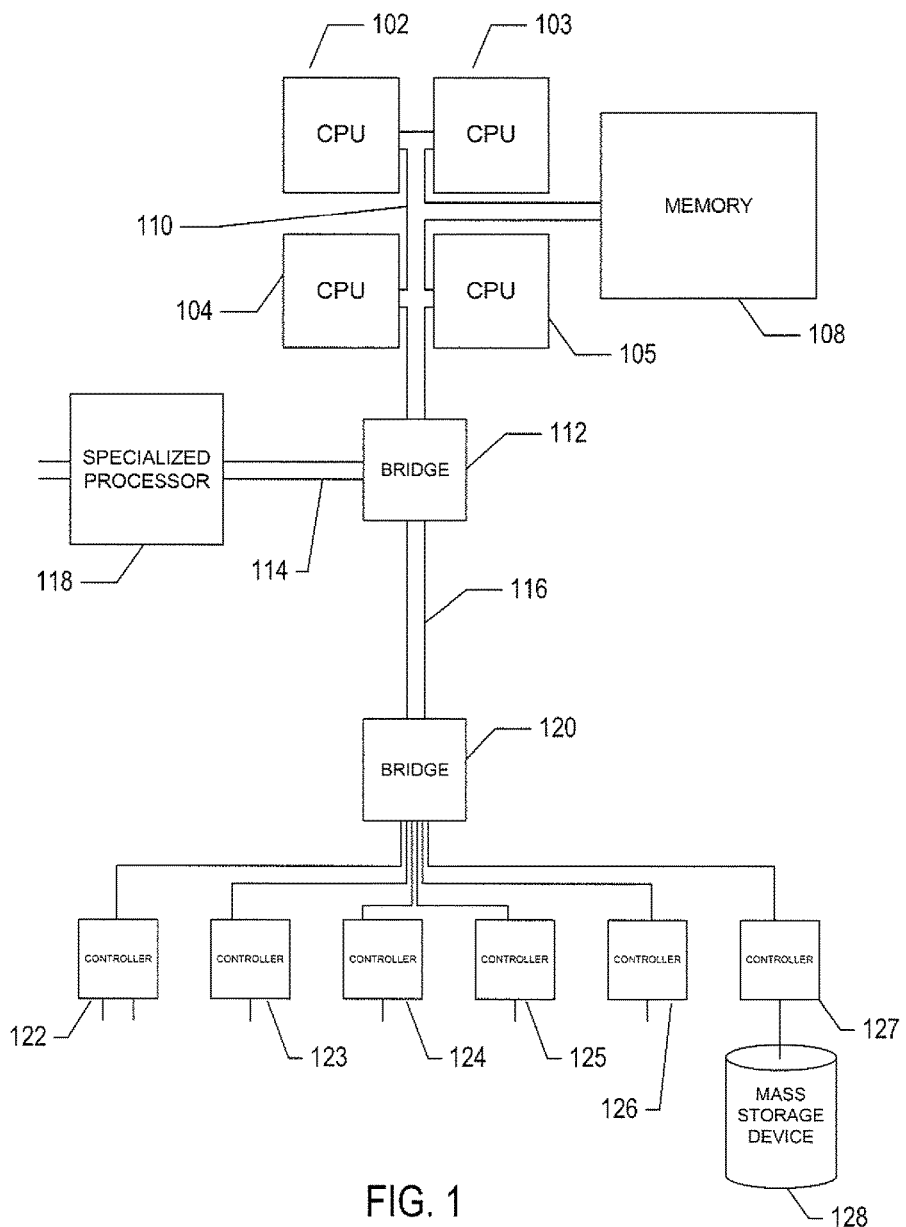
FIG. 1 provides a general architectural diagram for various types of computers.

The current document is directed to methods for aggregating host computers into distributed computing systems and to distributed computing systems created by the methods. In particular, the current document is directed to methods and systems for testing and analyzing the operational characteristics of management servers that manage host systems. In a first subsection, below, a detailed description of computer hardware, complex computational systems, and virtualization is provided with reference to FIGS. 1-12. In a second subsection, host-gateway-facilitated aggregation of host servers into a higher-level distributed computing system is discussed. In a third subsection, implementations of the currently disclosed testing and analysis methods and systems are discussed.

Computer Hardware, Complex Computational Systems, and Virtualization

The term "abstraction" is not, in any way, intended to mean or suggest an abstract idea or concept. Computational abstractions are tangible, physical interfaces that are implemented, ultimately, using physical computer hardware, data-storage devices, and communications systems. Instead, the term "abstraction" refers, in the current discussion, to a logical level of functionality encapsulated within one or more concrete, tangible, physically-implemented computer systems with defined interfaces through which electronically-encoded data is exchanged, process execution launched, and electronic services are provided. Interfaces may include graphical and textual data displayed on physical display devices as well as computer programs and routines that control physical computer processors to carry out various tasks and operations and that are invoked through electronically implemented application programming interfaces ("APIs") and other electronically implemented interfaces. There is a tendency among those unfamiliar with modern technology and science to misinterpret the terms "abstract" and "abstraction," when used to describe certain aspects of modern computing. For example, one frequently encounters assertions that, because a computational system is described in terms of abstractions, functional layers, and interfaces, the computational system is somehow different from a physical machine or device. Such allegations are unfounded. One only needs to disconnect a computer system or group of computer systems from their respective power supplies to appreciate the physical, machine nature of complex computer technologies. One also frequently encounters statements that characterize a computational technology as being "only software," and thus not a machine or device. Software is essentially a sequence of encoded symbols, such as a printout of a computer program or digitally encoded computer instructions sequentially stored in a file on an optical disk or within an electromechanical mass-storage device. Software alone can do nothing. It is only when encoded computer instructions are loaded into an electronic memory within a computer system and executed on a physical processor that so-called "software implemented" functionality is provided. The digitally encoded computer instructions are an essential and physical control component of processor-controlled machines and devices, no less essential and physical than a cam-shaft control system in an internal-combustion engine. Multi-cloud aggregations, cloud-computing services, virtual-machine containers and virtual machines, communications interfaces, and many of the other topics discussed below are tangible, physical components of physical, electro-optical-mechanical computer systems.

FIG. 1 provides a general architectural diagram for various types of computers. The computer system contains one or multiple central processing units ("CPUs") 102-105, one or more electronic memories 108 interconnected with the CPUs by a CPU/memory-subsystem bus 110 or multiple busses, a first bridge 112 that interconnects the CPU/memory-subsystem bus 110 with additional busses 114 and 116, or other types of high-speed interconnection media, including multiple, high-speed serial interconnects. These busses or serial interconnections, in turn, connect the CPUs and memory with specialized processors, such as a graphics processor 118, and with one or more additional bridges 120, which are interconnected with high-speed serial links or with multiple controllers 122-127, such as controller 127, that provide access to various different types of mass-storage devices 128, electronic displays, input devices, and other such components, subcomponents, and computational resources. It should be noted that computer-readable data-storage devices include optical and electromagnetic disks, electronic memories, and other physical data-storage devices. Those familiar with modern science and technology appreciate that electromagnetic radiation and propagating signals do not store data for subsequent retrieval, and can transiently "store" only a byte or less of information per mile, far less information than needed to encode even the simplest of routines.

Of course, there are many different types of computer-system architectures that differ from one another in the number of different memories, including different types of hierarchical cache memories, the number of processors and the connectivity of the processors with other system components, the number of internal communications busses and serial links, and in many other ways. However, computer systems generally execute stored programs by fetching instructions from memory and executing the instructions in one or more processors. Computer systems include general-purpose computer systems, such as personal computers ("PCs"), various types of servers and workstations, and higher-end mainframe computers, but may also include a plethora of various types of special-purpose computing devices, including data-storage systems, communications routers, network nodes, tablet computers, and mobile telephones.

Figure 2:
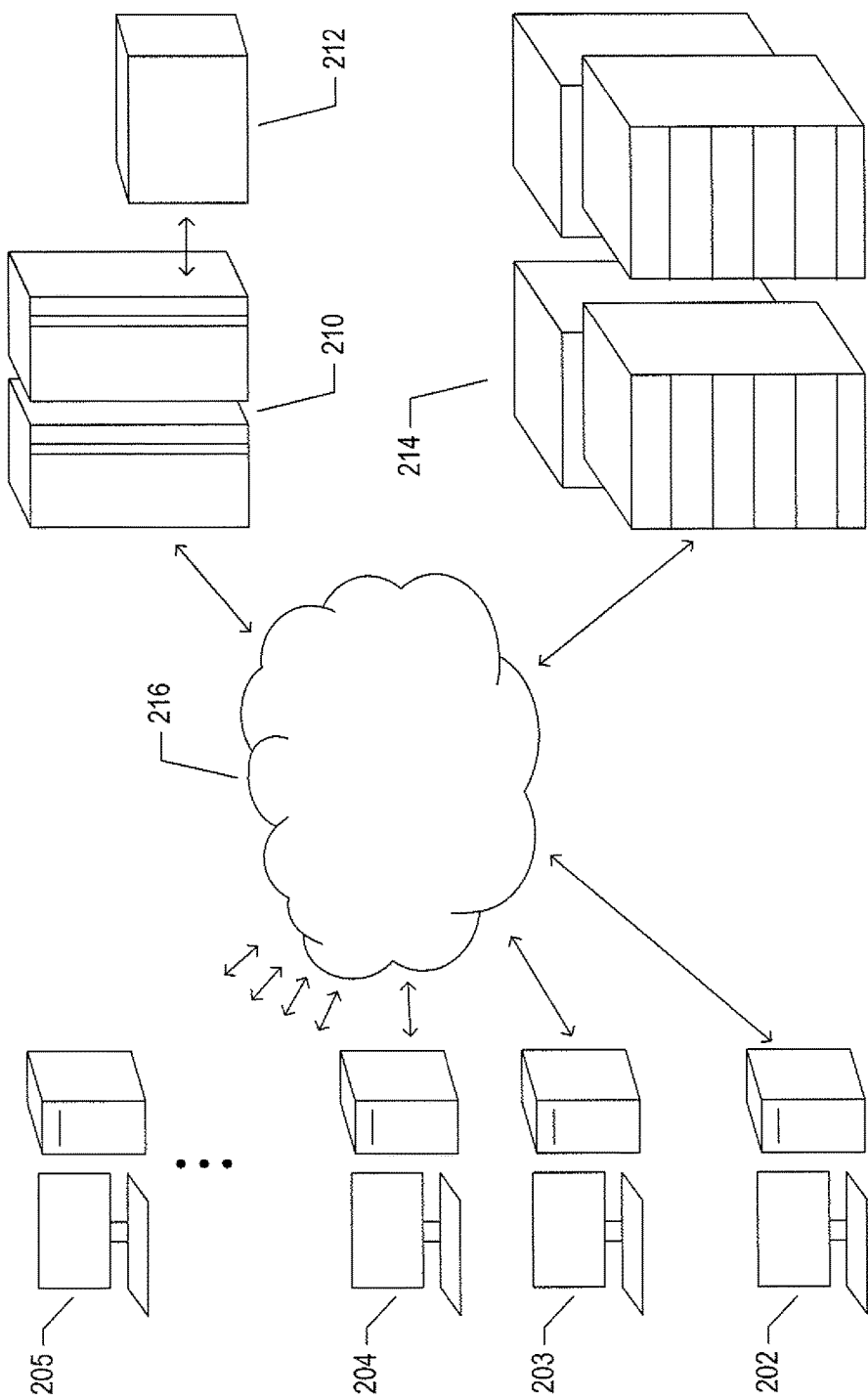
FIG. 2 illustrates an Internet-connected distributed computer system.

FIG. 2 illustrates an Internet-connected distributed computer system. As communications and networking technologies have evolved in capability and accessibility, and as the computational bandwidths, data-storage capacities, and other capabilities and capacities of various types of computer systems have steadily and rapidly increased, much of modern computing now generally involves large distributed systems and computers interconnected by local networks, wide-area networks, wireless communications, and the Internet. FIG. 2 shows a typical distributed system in which a large number of PCs 202-205, a high-end distributed mainframe system 210 with a large data-storage system 212, and a large computer center 214 with large numbers of rack-mounted servers or blade servers all interconnected through various communications and networking systems that together comprise the Internet 216. Such distributed computing systems provide diverse arrays of functionalities.

For example, a PC user sitting in a home office may access hundreds of millions of different web sites provided by hundreds of thousands of different web servers throughout the world and may access high-computational-bandwidth computing services from remote computer facilities for running complex computational tasks.

Until recently, computational services were generally provided by computer systems and data centers purchased, configured, managed, and maintained by service-provider organizations. For example, an e-commerce retailer generally purchased, configured, managed, and maintained a data center including numerous web servers, back-end computer systems, and data-storage systems for serving web pages to remote customers, receiving orders through the web-page interface, processing the orders, tracking completed orders, and other myriad different tasks associated with an e-commerce enterprise.

Figure 3:
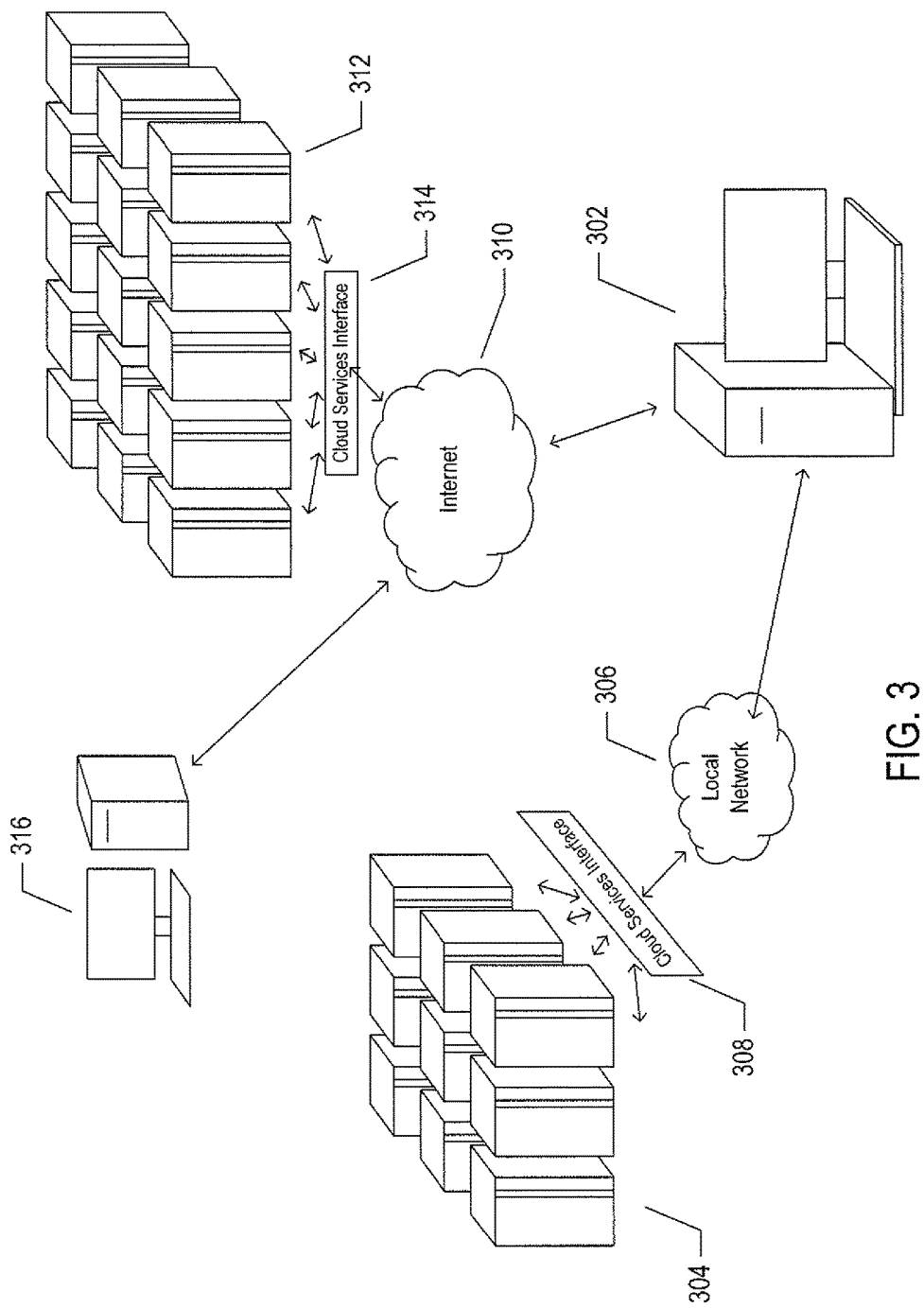
FIG. 3 illustrates cloud computing. In the recently developed cloud-computing paradigm, computing cycles and data-storage facilities are provided to organizations and individuals by cloud-computing providers.

FIG. 3 illustrates cloud computing. In the recently developed cloud-computing paradigm, computing cycles and data-storage facilities are provided to organizations and individuals by cloud-computing providers. In addition, larger organizations may elect to establish private cloud-computing facilities in addition to, or instead of, subscribing to computing services provided by public cloud-computing service providers. In FIG. 3, a system administrator for an organization, using a PC 302, accesses the organization's private cloud 304 through a local network 306 and private-cloud interface 308 and also accesses, through the Internet 310, a public cloud 312 through a public-cloud services interface 314. The administrator can, in either the case of the private cloud 304 or public cloud 312, configure virtual computer systems and even entire virtual data centers and launch execution of application programs on the virtual computer systems and virtual data centers in order to carry out any of many different types of computational tasks. As one example, a small organization may configure and run a virtual data center within a public cloud that executes web servers to provide an e-commerce interface through the public cloud to remote customers of the organization, such as a user viewing the organization's e-commerce web pages on a remote user system 316.

Cloud-computing facilities are intended to provide computational bandwidth and data-storage services much as utility companies provide electrical power and water to consumers. Cloud computing provides enormous advantages to small organizations without the resources to purchase, manage, and maintain in-house data centers. Such organizations can dynamically add and delete virtual computer systems from their virtual data centers within public clouds in order to track computational-bandwidth and data-storage needs, rather than purchasing sufficient computer systems within a physical data center to handle peak computational-bandwidth and data-storage demands. Moreover, small organizations can completely avoid the overhead of maintaining and managing physical computer systems, including hiring and periodically retraining information-technology specialists and continuously paying for operating-system and database-management-system upgrades. Furthermore, cloud-computing interfaces allow for easy and straightforward configuration of virtual computing facilities, flexibility in the types of applications and operating systems that can be configured, and other functionalities that are useful even for owners and administrators of private cloud-computing facilities used by a single organization.

Figure 4:
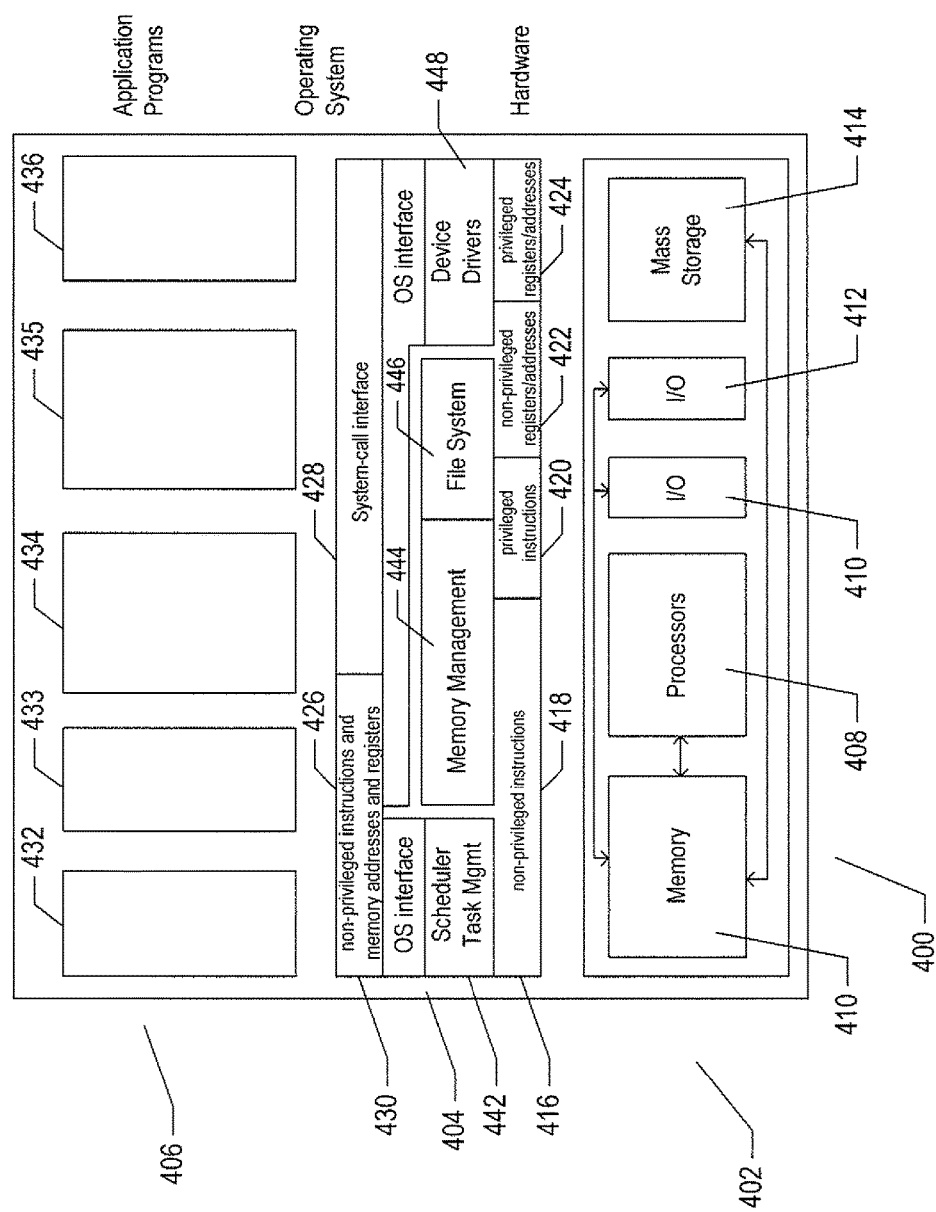
FIG. 4 illustrates generalized hardware and software components of a general-purpose computer system, such as a general-purpose computer system having an architecture similar to that shown in FIG. 1.

FIG. 4 illustrates generalized hardware and software components of a general-purpose computer system, such as a general-purpose computer system having an architecture similar to that shown in FIG. 1. The computer system 400 is often considered to include three fundamental layers: (1) a hardware layer or level 402; (2) an operating-system layer or level 404; and (3) an application-program layer or level 406. The hardware layer 402 includes one or more processors 408, system memory 410, various different types of input-output ("I/O") devices 410 and 412, and mass-storage devices 414. Of course, the hardware level also includes many other components, including power supplies, internal communications links and busses, specialized integrated circuits, many different types of processor-controlled or microprocessor-controlled peripheral devices and controllers, and many other components. The operating system 404 interfaces to the hardware level 402 through a low-level operating system and hardware interface 416 generally comprising a set of non-privileged computer instructions 418, a set of privileged computer instructions 420, a set of non-privileged registers and memory addresses 422, and a set of privileged registers and memory addresses 424. In general, the operating system exposes non-privileged instructions, non-privileged registers, and non-privileged memory addresses 426 and a system-call interface 428 as an operating-system interface 430 to application programs 432-436 that execute within an execution environment provided to the application programs by the operating system. The operating system, alone, accesses the privileged instructions, privileged registers, and privileged memory addresses. By reserving access to privileged instructions, privileged registers, and privileged memory addresses, the operating system can ensure that application programs and other higher-level computational entities cannot interfere with one another's execution and cannot change the overall state of the computer system in ways that could deleteriously impact system operation. The operating system includes many internal components and modules, including a scheduler 442, memory management 444, a file system 446, device drivers 448, and many other components and modules. To a certain degree, modern operating systems provide numerous levels of abstraction above the hardware level, including virtual memory, which provides to each application program and other computational entities a separate, large, linear memory-address space that is mapped by the operating system to various electronic memories and mass-storage devices. The scheduler orchestrates interleaved execution of various different application programs and higher-level computational entities, providing to each application program a virtual, stand-alone system devoted entirely to the application program. From the application program's standpoint, the application program executes continuously without concern for the need to share processor resources and other system resources with other application programs and higher-level computational entities. The device drivers abstract details of hardware-component operation, allowing application programs to employ the system-call interface for transmitting and receiving data to and from communications networks, mass-storage devices, and other I/O devices and subsystems. The file system 436 facilitates abstraction of mass-storage-device and memory resources as a high-level, easy-to-access, file-system interface. Thus, the development and evolution of the operating system has resulted in the generation of a type of multi-faceted virtual execution environment for application programs and other higher-level computational entities.

While the execution environments provided by operating systems have proved to be an enormously successful level of abstraction within computer systems, the operating-system-provided level of abstraction is nonetheless associated with difficulties and challenges for developers and users of application programs and other higher-level computational entities. One difficulty arises from the fact that there are many different operating systems that run within various different types of computer hardware. In many cases, popular application programs and computational systems are developed to run on only a subset of the available operating systems, and can therefore be executed within only a subset of the various different types of computer systems on which the operating systems are designed to run. Often, even when an application program or other computational system is ported to additional operating systems, the application program or other computational system can nonetheless run more efficiently on the operating systems for which the application program or other computational system was originally targeted. Another difficulty arises from the increasingly distributed nature of computer systems. Although distributed operating systems are the subject of considerable research and development efforts, many of the popular operating systems are designed primarily for execution on a single computer system. In many cases, it is difficult to move application programs, in real time, between the different computer systems of a distributed computer system for high-availability, fault-tolerance, and load-balancing purposes. The problems are even greater in heterogeneous distributed computer systems which include different types of hardware and devices running different types of operating systems. Operating systems continue to evolve, as a result of which certain older application programs and other computational entities may be incompatible with more recent versions of operating systems for which they are targeted, creating compatibility issues that are particularly difficult to manage in large distributed systems.

Figure 5A:
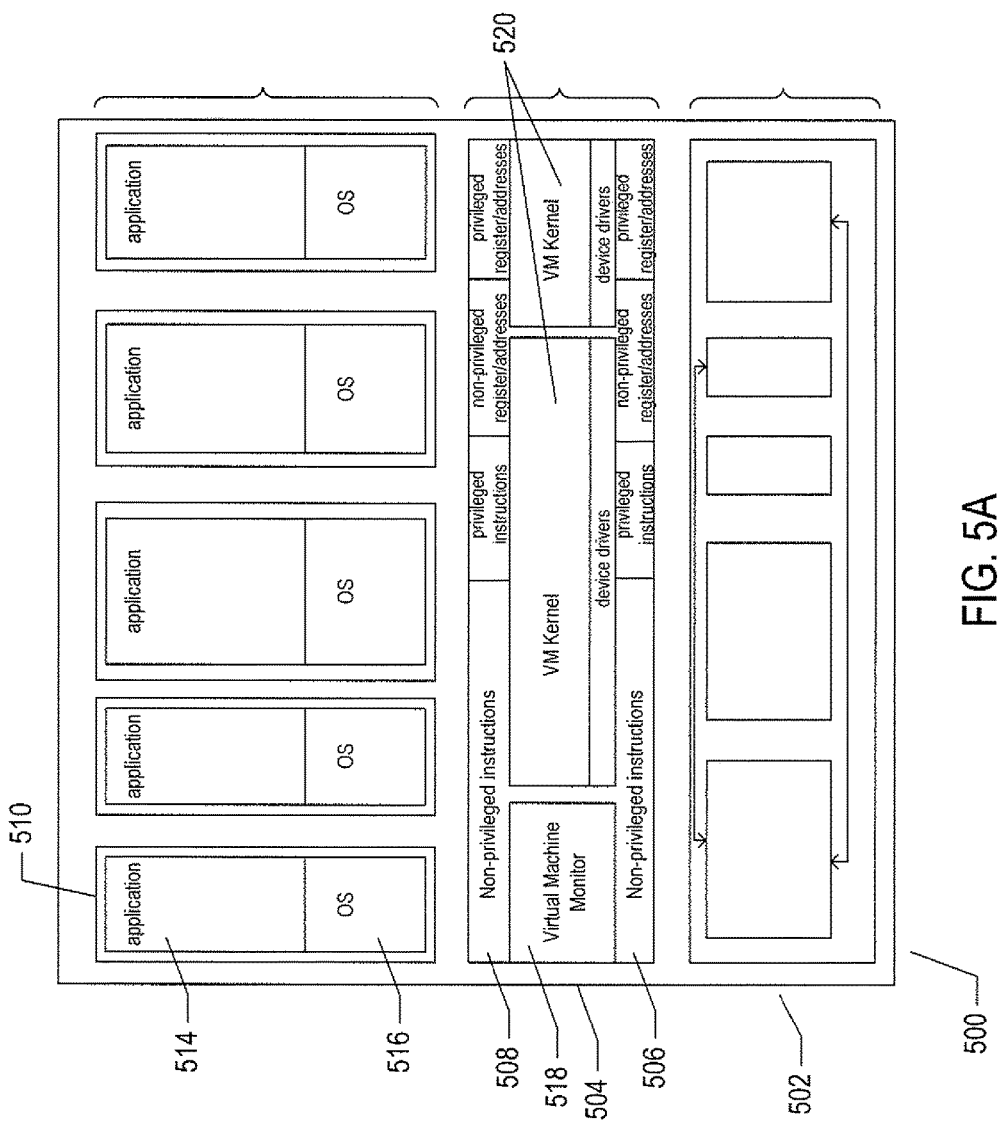
FIGS. 5A-B illustrate two types of virtual machine and virtual-machine execution environments.
Figure 5B:
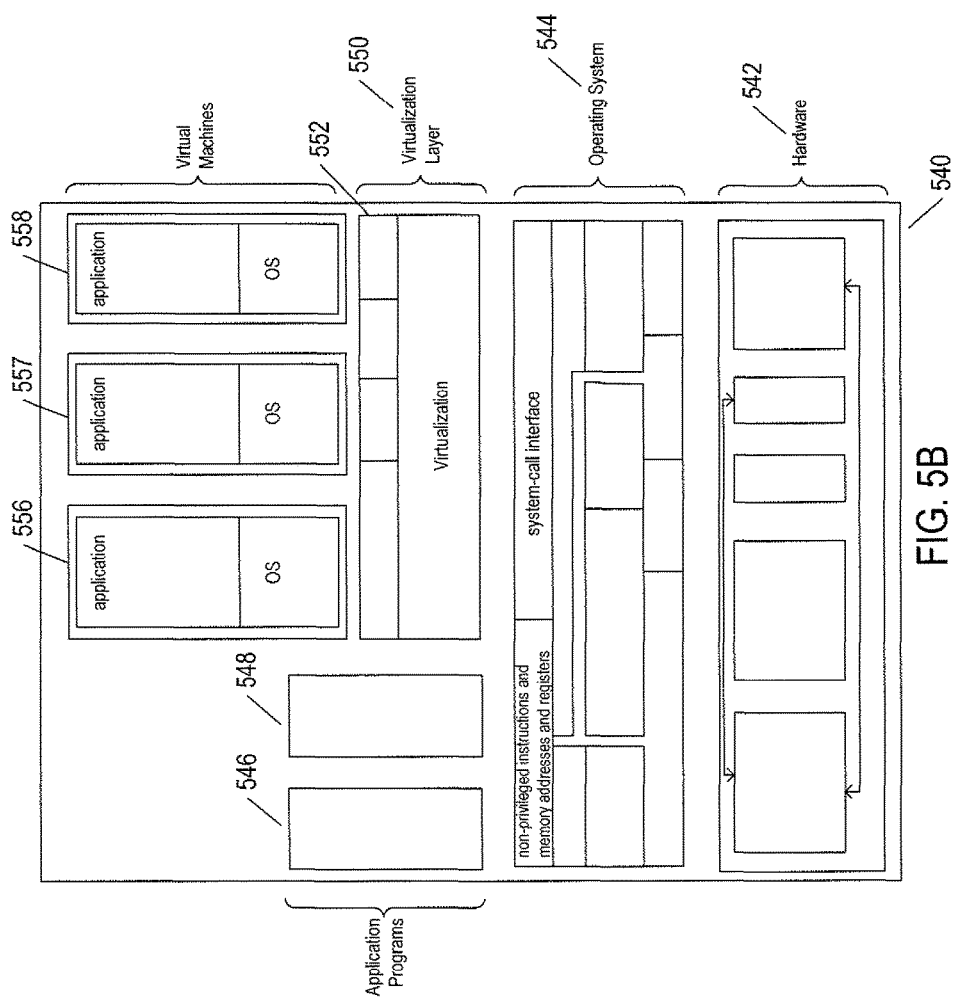

For all of these reasons, a higher level of abstraction, referred to as the "virtual machine," has been developed and evolved to further abstract computer hardware in order to address many difficulties and challenges associated with traditional computing systems, including the compatibility issues discussed above. FIGS. 5A-B illustrate two types of virtual machine and virtual-machine execution environments. FIGS. 5A-B use the same illustration conventions as used in FIG. 4. FIG. 5A shows a first type of virtualization. The computer system 500 in FIG. 5A includes the same hardware layer 502 as the hardware layer 402 shown in FIG. 4. However, rather than providing an operating system layer directly above the hardware layer, as in FIG. 4, the virtualized computing environment illustrated in FIG. 5A features a virtualization layer 504 that interfaces through a virtualization-layer/hardware-layer interface 506, equivalent to interface 416 in FIG. 4, to the hardware. The virtualization layer provides a hardware-like interface 508 to a number of virtual machines, such as virtual machine 510, executing above the virtualization layer in a virtual-machine layer 512. Each virtual machine includes one or more application programs or other higher-level computational entities packaged together with an operating system, referred to as a "guest operating system," such as application 514 and guest operating system 516 packaged together within virtual machine 510. Each virtual machine is thus equivalent to the operating-system layer 404 and application-program layer 406 in the general-purpose computer system shown in FIG. 4. Each guest operating system within a virtual machine interfaces to the virtualization-layer interface 508 rather than to the actual hardware interface 506. The virtualization layer partitions hardware resources into abstract virtual-hardware layers to which each guest operating system within a virtual machine interfaces. The guest operating systems within the virtual machines, in general, are unaware of the virtualization layer and operate as if they were directly accessing a true hardware interface. The virtualization layer ensures that each of the virtual machines currently executing within the virtual environment receive a fair allocation of underlying hardware resources and that all virtual machines receive sufficient resources to progress in execution. The virtualization-layer interface 508 may differ for different guest operating systems. For example, the virtualization layer is generally able to provide virtual hardware interfaces for a variety of different types of computer hardware. This allows, as one example, a virtual machine that includes a guest operating system designed for a particular computer architecture to run on hardware of a different architecture. The number of virtual machines need not be equal to the number of physical processors or even a multiple of the number of processors.

The virtualization layer includes a virtual-machine-monitor module 518 ("VMM") that virtualizes physical processors in the hardware layer to create virtual processors on which each of the virtual machines executes. For execution efficiency, the virtualization layer attempts to allow virtual machines to directly execute non-privileged instructions and to directly access non-privileged registers and memory. However, when the guest operating system within a virtual machine accesses virtual privileged instructions, virtual privileged registers, and virtual privileged memory through the virtualization-layer interface 508, the accesses result in execution of virtualization-layer code to simulate or emulate the privileged resources. The virtualization layer additionally includes a kernel module 520 that manages memory, communications, and data-storage machine resources on behalf of executing virtual machines ("VM kernel"). The VM kernel, for example, maintains shadow page tables on each virtual machine so that hardware-level virtual-memory facilities can be used to process memory accesses. The VM kernel additionally includes routines that implement virtual communications and data-storage devices as well as device drivers that directly control the operation of underlying hardware communications and data-storage devices. Similarly, the VM kernel virtualizes various other types of I/O devices, including keyboards, optical-disk drives, and other such devices. The virtualization layer essentially schedules execution of virtual machines much like an operating system schedules execution of application programs, so that the virtual machines each execute within a complete and fully functional virtual hardware layer.

FIG. 5B illustrates a second type of virtualization. In FIG. 5B, the computer system 540 includes the same hardware layer 542 and software layer 544 as the hardware layer 402 shown in FIG. 4. Several application programs 546 and 548 are shown running in the execution environment provided by the operating system. In addition, a virtualization layer 550 is also provided, in computer 540, but, unlike the virtualization layer 504 discussed with reference to FIG. 5A, virtualization layer 550 is layered above the operating system 544, referred to as the "host OS," and uses the operating system interface to access operating-system-provided functionality as well as the hardware. The virtualization layer 550 comprises primarily a VMM and a hardware-like interface 552, similar to hardware-like interface 508 in FIG. 5A. The virtualization-layer/hardware-layer interface 552, equivalent to interface 416 in FIG. 4, provides an execution environment for a number of virtual machines 556-558, each including one or more application programs or other higher-level computational entities packaged together with a guest operating system.

In FIGS. 5A-B, the layers are somewhat simplified for clarity of illustration. For example, portions of the virtualization layer 550 may reside within the host-operating-system kernel, such as a specialized driver incorporated into the host operating system to facilitate hardware access by the virtualization layer.

It should be noted that virtual hardware layers, virtualization layers, and guest operating systems are all physical entities that are implemented by computer instructions stored in physical data-storage devices, including electronic memories, mass-storage devices, optical disks, magnetic disks, and other such devices. The term "virtual" does not, in any way, imply that virtual hardware layers, virtualization layers, and guest operating systems are abstract or intangible. Virtual hardware layers, virtualization layers, and guest operating systems execute on physical processors of physical computer systems and control operation of the physical computer systems, including operations that alter the physical states of physical devices, including electronic memories and mass-storage devices. They are as physical and tangible as any other component of a computer since, such as power supplies, controllers, processors, busses, and data-storage devices.

Figure 6:
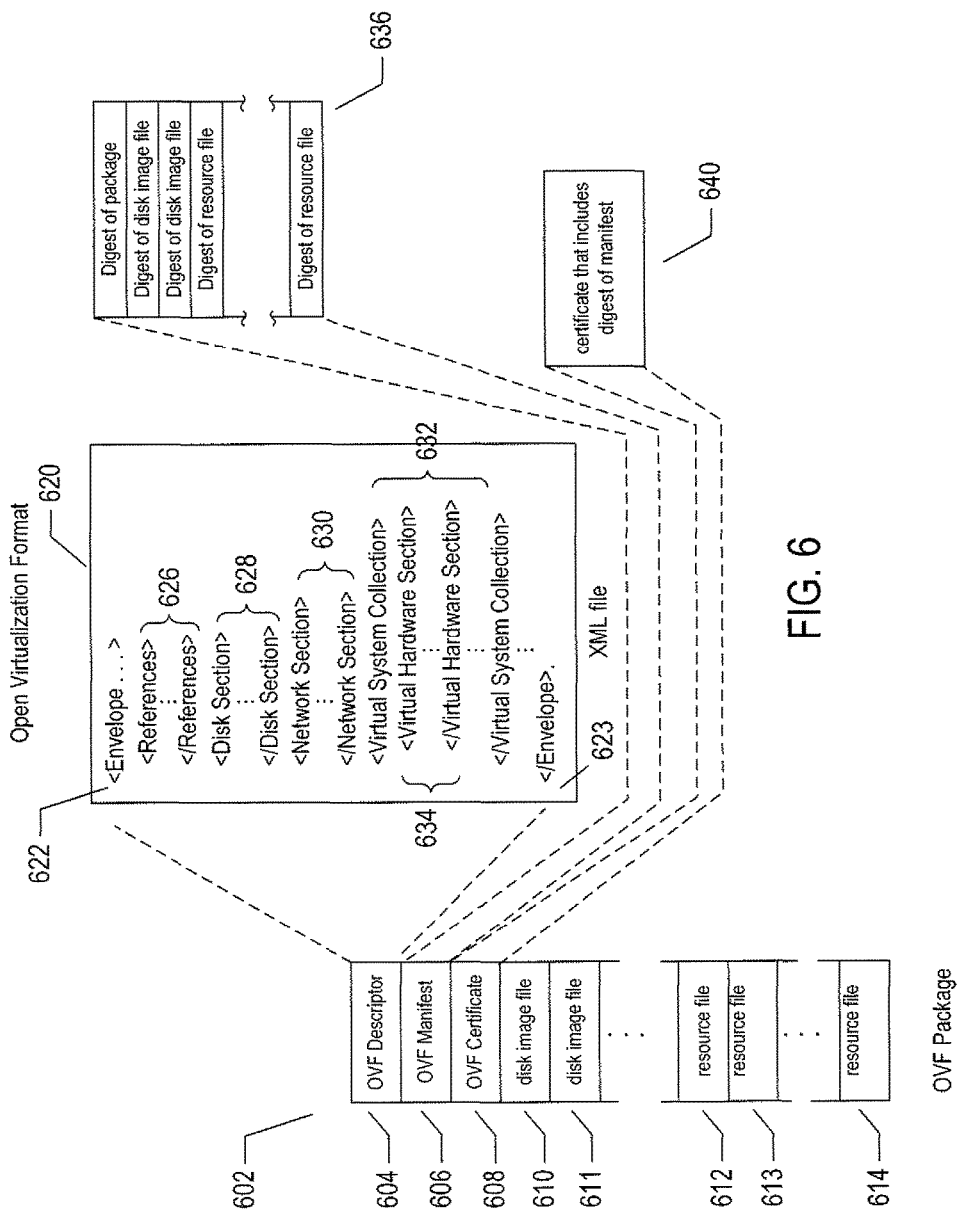
FIG. 6 illustrates an OVF package.

A virtual machine or virtual application, described below, is encapsulated within a data package for transmission, distribution, and loading into a virtual-execution environment. One public standard for virtual-machine encapsulation is referred to as the "open virtualization format" COVF"). The OVF standard specifies a format for digitally encoding a virtual machine within one or more data files. FIG. 6 illustrates an OVF package. An OVF package 602 includes an OVF descriptor 604, an OVF manifest 606, an OVF certificate 608, one or more disk-image files 610-611, and one or more resource files 612-614. The OVF package can be encoded and stored as a single file or as a set of files. The OVF descriptor 604 is an XML document 620 that includes a hierarchical set of elements, each demarcated by a beginning tag and an ending tag. The outermost, or highest-level, element is the envelope element, demarcated by tags 622 and 623. The next-level element includes a reference element 626 that includes references to all files that are part of the OVF package, a disk section 628 that contains meta information about all of the virtual disks included in the OVF package, a networks section 630 that includes meta information about all of the logical networks included in the OVF package, and a collection of virtual-machine configurations 632 which further includes hardware descriptions of each virtual machine 634. There are many additional hierarchical levels and elements within a typical OVF descriptor. The OVF descriptor is thus a self-describing, XML file that describes the contents of an OVF package. The OVF manifest 606 is a list of cryptographic-hash-function-generated digests 636 of the entire OVF package and of the various components of the OVF package. The OVF certificate 608 is an authentication certificate 640 that includes a digest of the manifest and that is cryptographically signed. Disk image files, such as disk image file 610, are digital encodings of the contents of virtual disks and resource files 612 are digitally encoded content, such as operating-system images. A virtual machine or a collection of virtual machines encapsulated together within a virtual application can thus be digitally encoded as one or more files within an OVF package that can be transmitted, distributed, and loaded using well-known tools for transmitting, distributing, and loading files. A virtual appliance is a software service that is delivered as a complete software stack installed within one or more virtual machines that is encoded within an OVF package.

Figure 7:
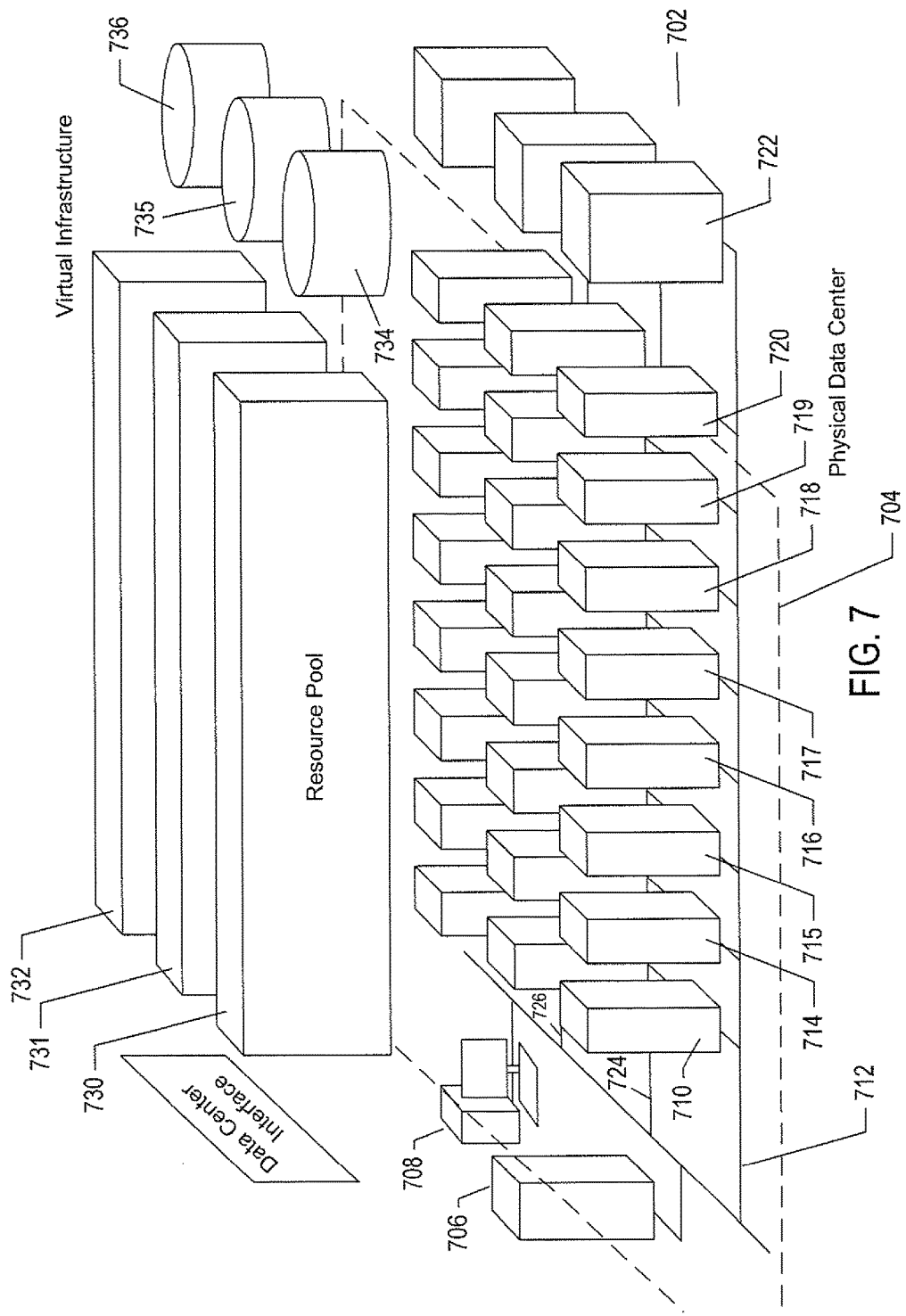
FIG. 7 illustrates virtual data centers provided as an abstraction of underlying physical-data-center hardware components.

The advent of virtual machines and virtual environments has alleviated many of the difficulties and challenges associated with traditional general-purpose computing. Machine and operating-system dependencies can be significantly reduced or entirely eliminated by packaging applications and operating systems together as virtual machines and virtual appliances that execute within virtual environments provided by virtualization layers running on many different types of computer hardware. A next level of abstraction, referred to as virtual data centers which are one example of a broader virtual-infrastructure category, provide a data-center interface to virtual data centers computationally constructed within physical data centers. FIG. 7 illustrates virtual data centers provided as an abstraction of underlying physical-data-center hardware components. In FIG. 7, a physical data center 702 is shown below a virtual-interface plane 704. The physical data center consists of a virtual-infrastructure management server ("VI-management-server") 706 and any of various different computers, such as PCs 708, on which a virtual-data-center management interface may be displayed to system administrators and other users. The physical data center additionally includes generally large numbers of server computers, such as server computer 710, that are coupled together by local area networks, such as local area network 712 that directly interconnects server computer 710 and 714-720 and a mass-storage array 722. The physical data center shown in FIG. 7 includes three local area networks 712, 724, and 726 that each directly interconnects a bank of eight servers and a mass-storage array. The individual server computers, such as server computer 710, each includes a virtualization layer and runs multiple virtual machines. Different physical data centers may include many different types of computers, networks, data-storage systems and devices connected according to many different types of connection topologies. The virtual-data-center abstraction layer 704, a logical abstraction layer shown by a plane in FIG. 7, abstracts the physical data center to a virtual data center comprising one or more resource pools, such as resource pools 730-732, one or more virtual data stores, such as virtual data stores 734-736, and one or more virtual networks. In certain implementations, the resource pools abstract banks of physical servers directly interconnected by a local area network.

The virtual-data-center management interface allows provisioning and launching of virtual machines with respect to resource pools, virtual data stores, and virtual networks, so that virtual-data-center administrators need not be concerned with the identities of physical-data-center components used to execute particular virtual machines. Furthermore, the VI-management-server includes functionality to migrate running virtual machines from one physical server to another in order to optimally or near optimally manage resource allocation, provide fault tolerance, and high availability by migrating virtual machines to most effectively utilize underlying physical hardware resources, to replace virtual machines disabled by physical hardware problems and failures, and to ensure that multiple virtual machines supporting a high-availability virtual appliance are executing on multiple physical computer systems so that the services provided by the virtual appliance are continuously accessible, even when one of the multiple virtual appliances becomes compute bound, data-access bound, suspends execution, or fails. Thus, the virtual data center layer of abstraction provides a virtual-data-center abstraction of physical data centers to simplify provisioning, launching, and maintenance of virtual machines and virtual appliances as well as to provide high-level, distributed functionalities that involve pooling the resources of individual physical servers and migrating virtual machines among physical servers to achieve load balancing, fault tolerance, and high availability.

Figure 8:
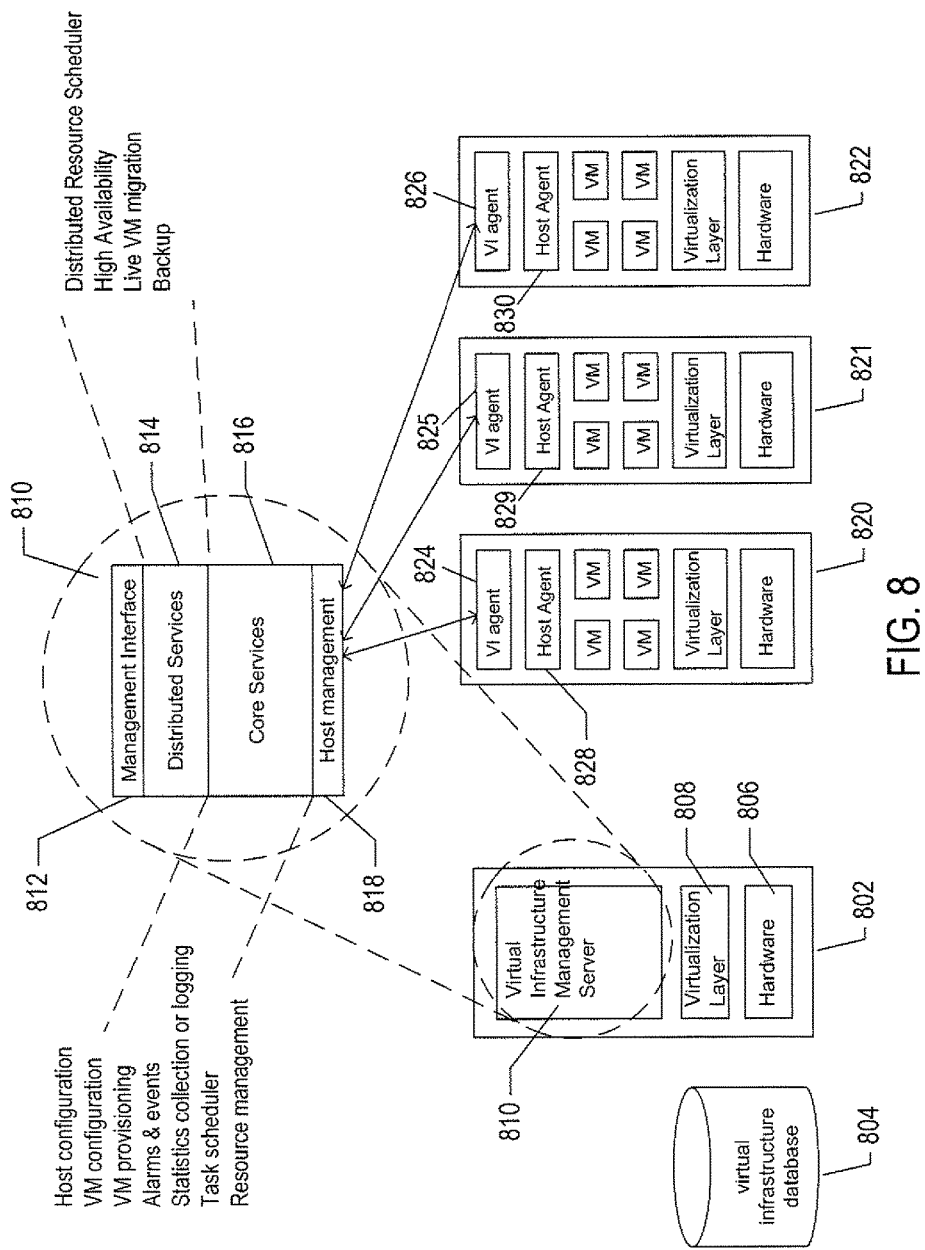
FIG. 8 illustrates virtual-machine components of a VI-management-server and physical servers of a physical data center above which a virtual-data-center interface is provided by the VI-management-server.

FIG. 8 illustrates virtual-machine components of a VI-management-server and physical servers of a physical data center above which a virtual-data-center interface is provided by the VI-management-server. The VI-management-server 802 and a virtual-data-center database 804 comprise the physical components of the management component of the virtual data center. The VI-management-server 802 includes a hardware layer 806 and virtualization layer 808, and runs a virtual-data-center management-server virtual machine 810 above the virtualization layer. Although shown as a single server in FIG. 8, the VI-management-server ("VI management server") may include two or more physical server computers that support multiple VI-management-server virtual appliances. The virtual machine 810 includes a management-interface component 812, distributed services 814, core services 816, and a host-management interface 818. The management interface is accessed from any of various computers, such as the PC 708 shown in FIG. 7. The management interface allows the virtual-data-center administrator to configure a virtual data center, provision virtual machines, collect statistics and view log files for the virtual data center, and to carry out other, similar management tasks. The host-management interface 818 interfaces to virtual-data-center agents 824, 825, and 826 that execute as virtual machines within each of the physical servers of the physical data center that is abstracted to a virtual data center by the VI management server.

The distributed services 814 include a distributed-resource scheduler that assigns virtual machines to execute within particular physical servers and that migrates virtual machines in order to most effectively make use of computational bandwidths, data-storage capacities, and network capacities of the physical data center. The distributed services further include a high-availability service that replicates and migrates virtual machines in order to ensure that virtual machines continue to execute despite problems and failures experienced by physical hardware components. The distributed services also include a live-virtual-machine migration service that temporarily halts execution of a virtual machine, encapsulates the virtual machine in an OVF package, transmits the OVF package to a different physical server, and restarts the virtual machine on the different physical server from a virtual-machine state recorded when execution of the virtual machine was halted. The distributed services also include a distributed backup service that provides centralized virtual-machine backup and restore.

The core services provided by the VI management server include host configuration, virtual-machine configuration, virtual-machine provisioning, generation of virtual-data-center alarms and events, ongoing event logging and statistics collection, a task scheduler, and a resource-management module. Each physical server 820-822 also includes a host-agent virtual machine 828-830 through which the virtualization layer can be accessed via a virtual-infrastructure application programming interface ("API"). This interface allows a remote administrator or user to manage an individual server through the infrastructure API. The virtual-data-center agents 824-826 access virtualization-layer server information through the host agents. The virtual-data-center agents are primarily responsible for offloading certain of the virtual-data-center management-server functions specific to a particular physical server to that physical server. The virtual-data-center agents relay and enforce resource allocations made by the VI management server, relay virtual-machine provisioning and configuration-change commands to host agents, monitor and collect performance statistics, alarms, and events communicated to the virtual-data-center agents by the local host agents through the interface API, and to carry out other, similar virtual-data-management tasks.

The virtual-data-center abstraction provides a convenient and efficient level of abstraction for exposing the computational resources of a cloud-computing facility to cloud-computing-infrastructure users. A cloud-director management server exposes virtual resources of a cloud-computing facility to cloud-computing-infrastructure users. In addition, the cloud director introduces a multi-tenancy layer of abstraction, which partitions virtual data centers ("VDCs") into tenant-associated VDCs that can each be allocated to a particular individual tenant or tenant organization, both referred to as a "tenant." A given tenant can be provided one or more tenant-associated VDCs by a cloud director managing the multi-tenancy layer of abstraction within a cloud-computing facility. The cloud services interface (308 in FIG. 3) exposes a virtual-data-center management interface that abstracts the physical data center.

Figure 9:
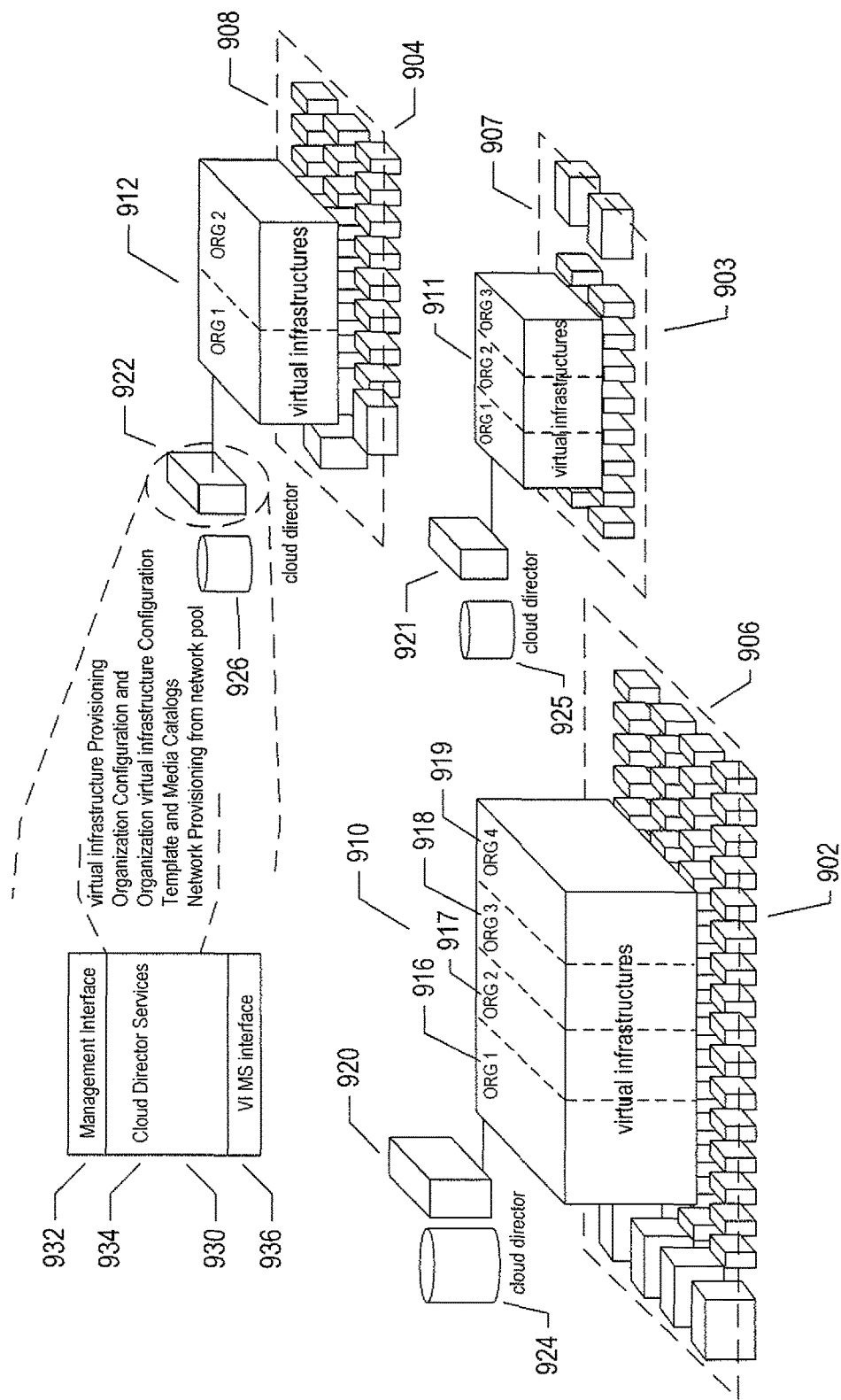
FIG. 9 illustrates a cloud-director level of abstraction.

FIG. 9 illustrates a cloud-director level of abstraction. In FIG. 9, three different physical data centers 902-904 are shown below planes representing the cloud-director layer of abstraction 906-908. Above the planes representing the cloud-director level of abstraction, multi-tenant virtual data centers 910-912 are shown. The resources of these multi-tenant virtual data centers are securely partitioned in order to provide secure virtual data centers to multiple tenants, or cloud-services-accessing organizations. For example, a cloud-services-provider virtual data center 910 is partitioned into four different tenant-associated virtual-data centers within a multi-tenant virtual data center for four different tenants 916-919. Each multi-tenant virtual data center is managed by a cloud director comprising one or more cloud-director servers 920-922 and associated cloud-director databases 924-926. Each cloud-director server or servers runs a cloud-director virtual appliance 930 that includes a cloud-director management interface 932, a set of cloud-director services 934, and a virtual-data-center management-server interface 936. The cloud-director services include an interface and tools for provisioning multi-tenant virtual data center virtual data centers on behalf of tenants, tools and interfaces for configuring and managing tenant organizations, tools and services for organization of virtual data centers and tenant-associated virtual data centers within the multi-tenant virtual data center, services associated with template and media catalogs, and provisioning of virtualization networks from a network pool. Templates are virtual machines that each contains an OS and/or one or more virtual machines containing applications. A template may include much of the detailed contents of virtual machines and virtual appliances that are encoded within OVF packages, so that the task of configuring a virtual machine or virtual appliance is significantly simplified, requiring only deployment of one OVF package. These templates are stored in catalogs within a tenant's virtual-data center. These catalogs are used for developing and staging new virtual appliances and published catalogs are used for sharing templates in virtual appliances across organizations. Catalogs may include OS images and other information relevant to construction, distribution, and provisioning of virtual appliances.

Considering FIGS. 7 and 9, the VI management server and cloud-director layers of abstraction can be seen, as discussed above, to facilitate employment of the virtual-data-center concept within private and public clouds. However, this level of abstraction does not fully facilitate aggregation of single-tenant and multi-tenant virtual data centers into heterogeneous or homogeneous aggregations of cloud-computing facilities.

Figure 10:
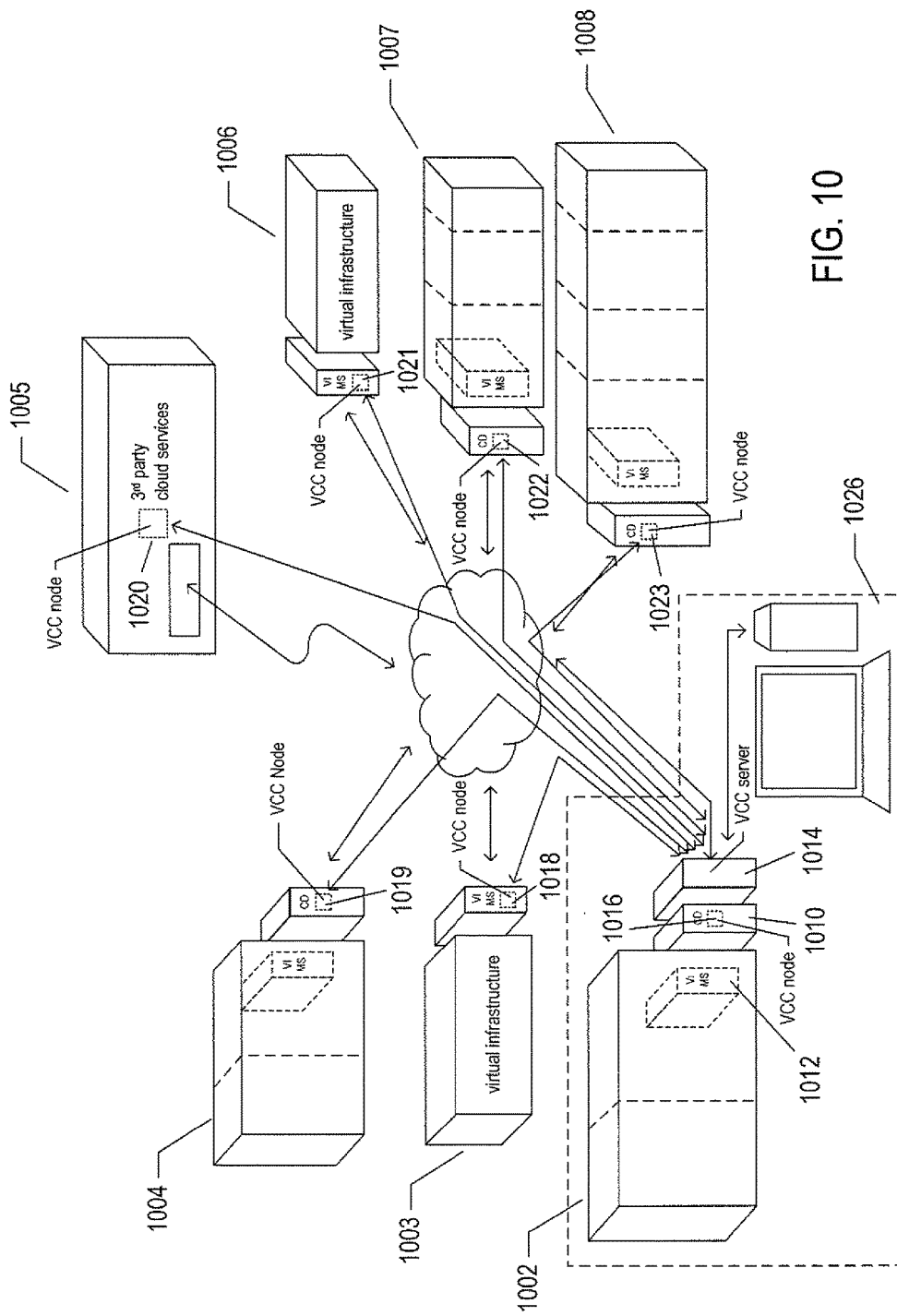
FIG. 10 illustrates virtual-cloud-connector nodes ("VCC nodes") and a VCC server, components of a distributed system that provides multi-cloud aggregation and that includes a cloud-connector server and cloud-connector nodes that cooperate to provide services that are distributed across multiple clouds.

FIG. 10 illustrates virtual-cloud-connector nodes ("VCC nodes") and a VCC server, components of a distributed system that provides multi-cloud aggregation and that includes a cloud-connector server and cloud-connector nodes that cooperate to provide services that are distributed across multiple clouds. VMware vCloud™ VCC servers and nodes are one example of VCC server and nodes. In FIG. 10, seven different cloud-computing facilities are illustrated 1002-1008. Cloud-computing facility 1002 is a private multi-tenant cloud with a cloud director 1010 that interfaces to a VI management server 1012 to provide a multi-tenant private cloud comprising multiple tenant-associated virtual data centers. The remaining cloud-computing facilities 1003-1008 may be either public or private cloud-computing facilities and may be single-tenant virtual data centers, such as virtual data centers 1003 and 1006, multi-tenant virtual data centers, such as multi-tenant virtual data centers 1004 and 1007-1008, or any of various different kinds of third-party cloud-services facilities, such as third-party cloud-services facility 1005. An additional component, the VCC server 1014, acting as a controller is included in the private cloud-computing facility 1002 and interfaces to a VCC node 1016 that runs as a virtual appliance within the cloud director 1010. A VCC server may also run as a virtual appliance within a VI management server that manages a single-tenant private cloud. The VCC server 1014 additionally interfaces, through the Internet, to VCC node virtual appliances executing within remote VI management servers, remote cloud directors, or within the third-party cloud services 1018-1023. The VCC server provides a VCC server interface that can be displayed on a local or remote terminal, PC, or other computer system 1026 to allow a cloud-aggregation administrator or other user to access VCC-server-provided aggregate-cloud distributed services. In general, the cloud-computing facilities that together form a multiple-cloud-computing aggregation through distributed services provided by the VCC server and VCC nodes are geographically and operationally distinct.

Figure 11:
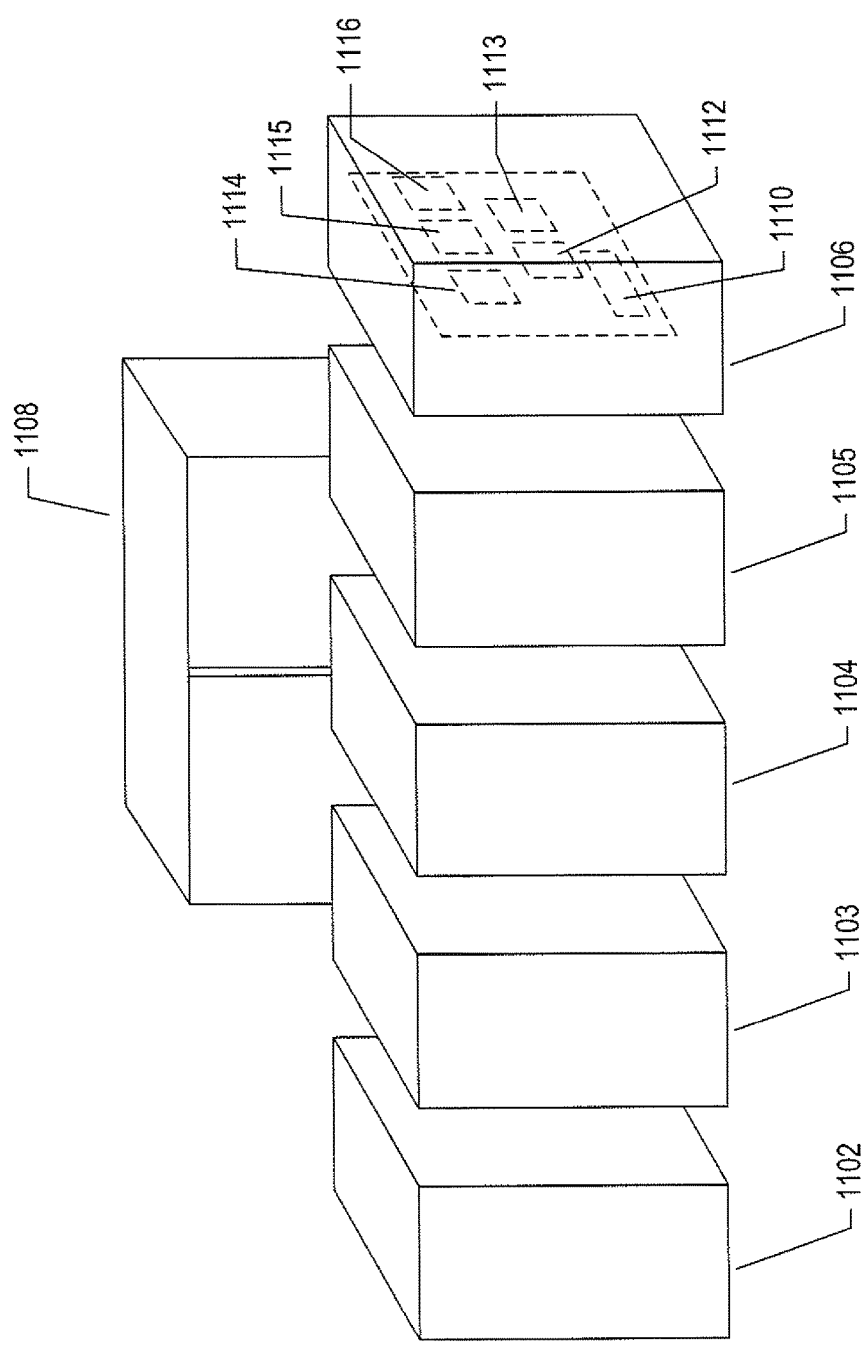
FIGS. 11-12 illustrate a resource pool, discussed briefly, above, with reference to FIG. 7.
Figure 12:
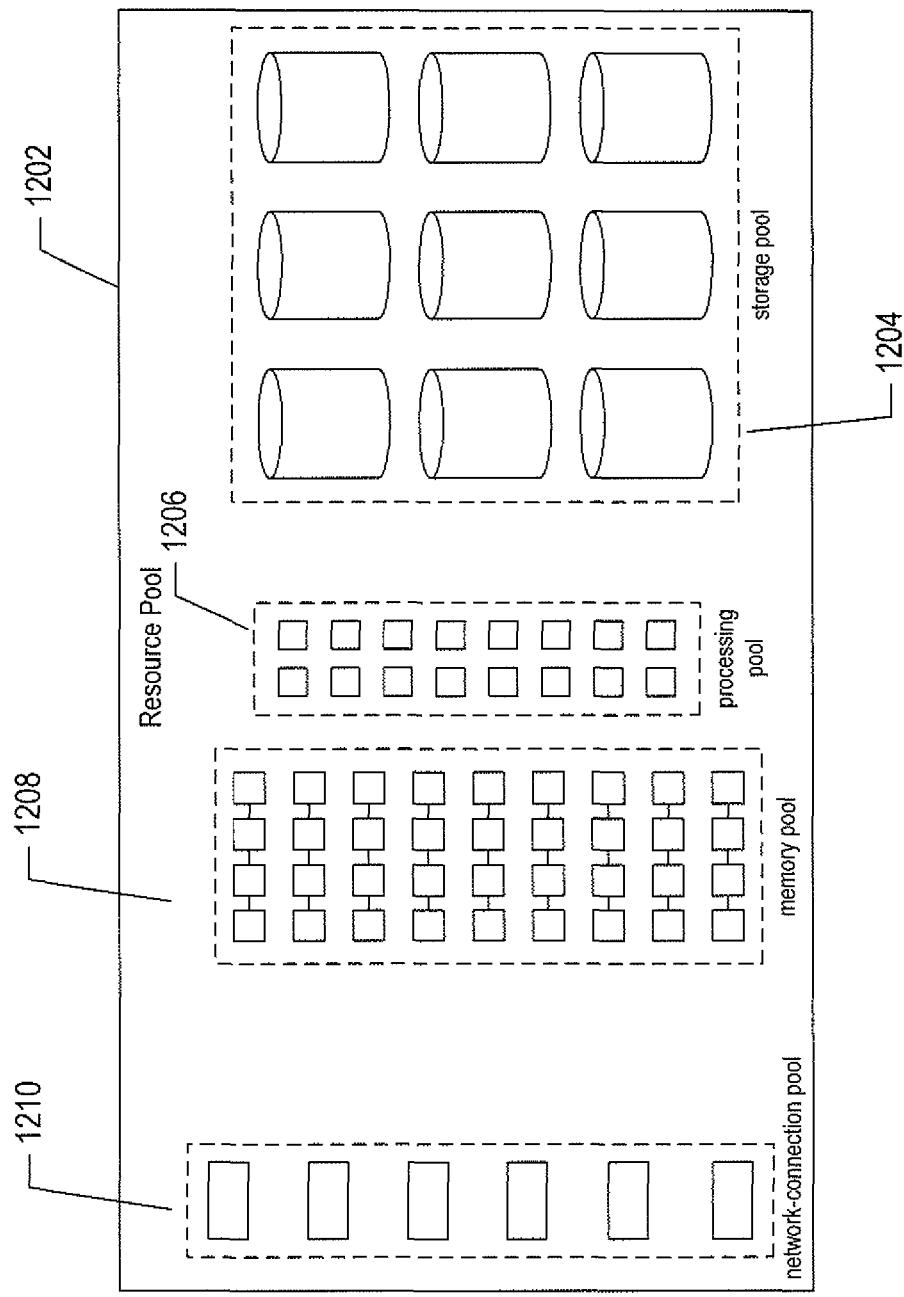

FIGS. 11-12 illustrate a resource pool, discussed briefly, above, with reference to FIG. 7. FIG. 11 shows a small cluster of physical computing machinery. In FIG. 11, five multi-processor servers 1102-1106 are shown along with a large data-storage-array enclosure 1108. Each of the server computers includes one or more network interconnect cards ("NICs") 1110, two or more processors 1112-1113, and generally multiple banks of integrated-circuit memory 1114-1116. The internal components of server 1106 are shown, in FIG. 11, as an example of the types of components contained within the remaining servers 1102-1105. Of course, server computers and storage arrays are extremely complex machines with hundreds to thousands of individual parts and subcomponents. FIG. 11 is intended only to illustrate the computing cluster at a high level.

FIG. 12 illustrates abstraction of the computing resources contained in the cluster shown in FIG. 11 as a resource pool. The resource pool 1202 includes a data-storage pool 1204, a processing pool 1206, a memory pool 1208, and a network-connection pool 1210. The storage pool 1204 is an abstract collection or aggregation of the data-storage resources of the cluster available to virtual machines for data storage, including portions of internal disk drives within the server computers as well as disk drives and other data-storage devices within the data-storage array 1108. The processing pool 1206 is an abstract aggregation of the processing bandwidth provided by hardware threads, cores, and processors within the server computers 1102-1106. Similarly, the memory pool 1208 includes the memory resources contained in the server computers 1102-1106 that are accessible for use by virtual machines. The network-connection pool 1210 is an abstract aggregation of the NICs and/or other communications hardware within the server computers 1102-1106 available for transmitting and receiving data at the request of virtual machines. The resource-pool abstraction represents, to virtual machines within a virtualized computer system, an overall, aggregate set of resources that can be accessed by the virtual machines without specifying the types and numbers of individual devices and components that are aggregated together to provide the overall bandwidth and/capacity of the various component pools of the resource pool.

Figure 13:
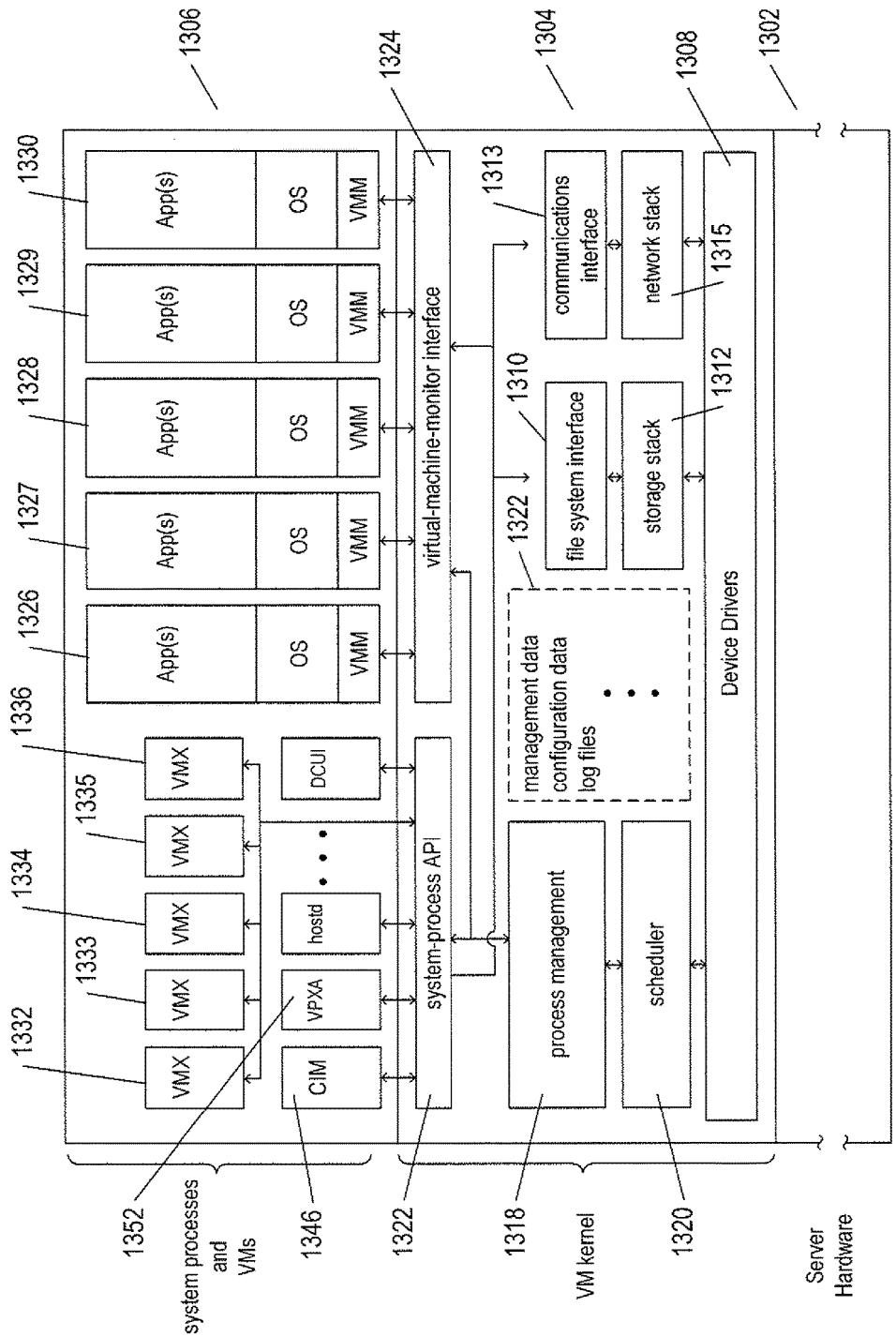
FIG. 13 provides additional details with regard to the internal components of a server computer, or host system, within a virtual data center.

Host-Gateway-Facilitated Aggregation of Host Servers into a Higher-Level Distributed Computing System FIG. 13 provides additional details with regard to the internal components of one implementation of a server computer, or host system, within a virtual data center. As discussed above, a host computer includes a hardware layer 1302, a virtualization layer 1304, and a system processes and virtual-machine layer 1306. The virtualization layer 1304 comprises, in the implementation shown in FIG. 13, a VM kernel that provides functionality similar to that provided by a traditional operating system. The VM kernel includes device drivers 1308 that interface directly with hardware components of the hardware layer 1302. The VM kernel provides a file system that includes a file-system interface 1310 and a layered file-system implementation referred to as a "storage stack" 1312. Similarly, the VM kernel provides a communications networking interface 1313, an underlying, layered communications and networking implementation referred to as a "network stack" 1315. Like an operating system, the VM kernel provides process management for managing concurrent, and, in multi-processor systems, simultaneous execution of multiple different processes 1318 and a scheduler 1320 that schedules access by various computational entities, including virtual machines and system processes, to hardware resources. The VM kernel stores a variety of different types of management data, configuration data, log files, and other such operational data 1322 in the file system 1310 and 1312. The VM kernel provides a system-process interface 1322 to support execution of a variety of different system processes and a virtual-machine-monitor interface 1324 that provides an execution environment for multiple virtual machines 1326-1330. The system processes that run within an execution environment provided by the system-process interface 1322 include VMX processes 1332-1336, each associated with a virtual-machine monitor 1338-1342. In addition, the system processes include a common-information model ("CIM") process 1346 that enables hardware-level management from remote applications and a direct-console user interface ("DCUI") 1348 that provides a configuration and management interface accessible through a host console. A hostd process 1350 provides a programmatic interface to the VM kernel and provides functionality such as user authentication, user authorization, and creation and management of local users. A VPXA process 1352 is an agent that uses a proprietary protocol to connect a VI management server with the hostd process and provides various types of functionalities, including a heartbeat and host-sync facilities, discussed below. In addition, a host system may include many additional agents and processes, including a high-availability agent, a syslog daemon, various storage-system and networking-related processes, and other processes involved in the operation and operational management of the host system.

Figure 14:
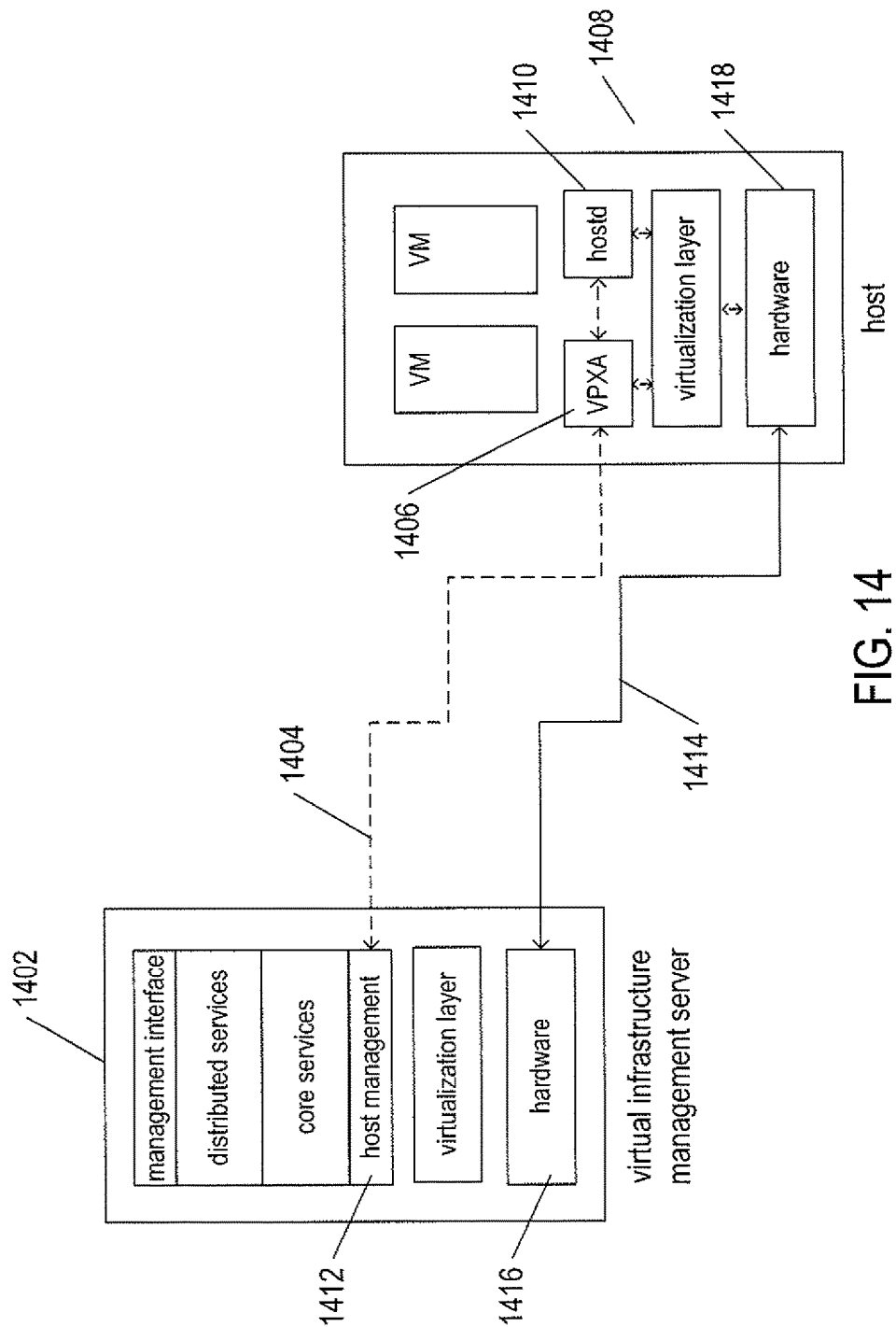
FIG. 14 illustrates communications between a VI management server and a host computer managed by the VI management server.

FIG. 14 illustrates communications between a VI management server and a host computer managed by the VI management server. In FIG. 14, the VI management server 1402 logically interfaces, as represented by dashed arrow 1404, to the VPXA agent or process 1406 within the host system 1408 in order to access management functionality provided both by the VPXA process 1406 as well as by the hostd process 1410. Of course, the logical communications between the host-management interface 1412 within the management application of the VI management server and the VPXA agent 1406 is implemented above an actual hardware interconnection 1414 between the hardware layers 1416 and 1418 of the VI management server and host system, respectively, generally involving local networking hardware and, in many cases, larger-scale communications infrastructures. Using the proprietary communications protocol provided by the host-management interface 1412 and VPXA agent 1406, the VI management server accesses a variety of different types of management functionality that allows the VI management server to configure, provision, power on, and power off virtual machines, move virtual machines among host systems, collect configuration information and operational statistics from the host system, configure various devices, system processes, and other entities within the host server, access information stored by the host server within the VM kernel file system, and many other host management facilities.

Figure 15A:
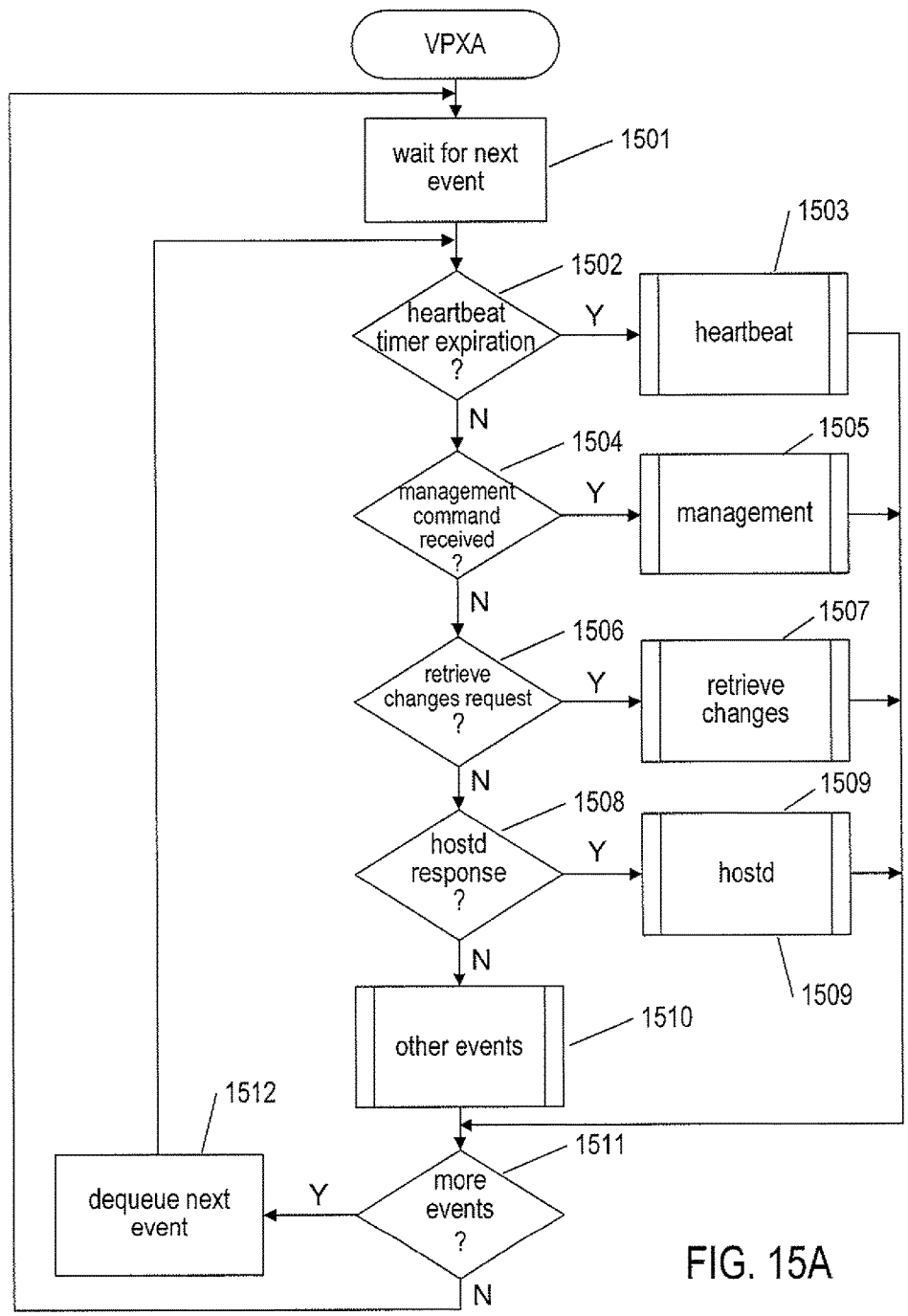
FIGS. 15A-G illustrate, using control-flow diagrams, communications between the VI management server and host server.

FIGS. 15A-G illustrate, using control-flow diagrams, communications between the VI management server and host server. FIG. 15A shows an event loop that continuously executes within the VPXA agent in order to respond to events, including timer expirations and messages received from the VI management server. In step 1501, the VPXA event loop waits for a next event to occur. When a next event occurs, then the type of event is determined, in a subsequent series of conditional blocks. Once determined, the event is handled by a call to an event handler. When, for example, the event is a heartbeat-timer expiration, as determined in step 1502, then a heartbeat handler is called in step 1503. When a management command is received from the VI management server, as determined in step 1504, then a management-command handler is called in step 1505. When a retrieve-changes request is received in step 1506, then a retrieve-changes handler is called in step 1507. The retrieve-changes request is part of the host-sync operation, in which, as a result of a heartbeat message, a VI management server determines that the configuration of a host has changed and seeks the configurations for local storage by issuing a retrieve-changes request. The retrieve-changes request is also referred to, below, as a "getChanges request" and as a "getChanges command." When a response from the hostd process is received, as determined in step 1508, then a hostd handler is called in step 1509. A default handler 1510 is shown in FIG. 15A that handles other types of events that occur with respect to the VPXA agent. When, after handling the most recently occurred event, another event has been received and queued to an input event queue, as determined in step 1511, then a next event is dequeued from the input queue, in step 1512, and control returns to step 1502. Otherwise, control returns to step 1501 where the VPXA event loop waits for a next event to occur.

Figure 15B:
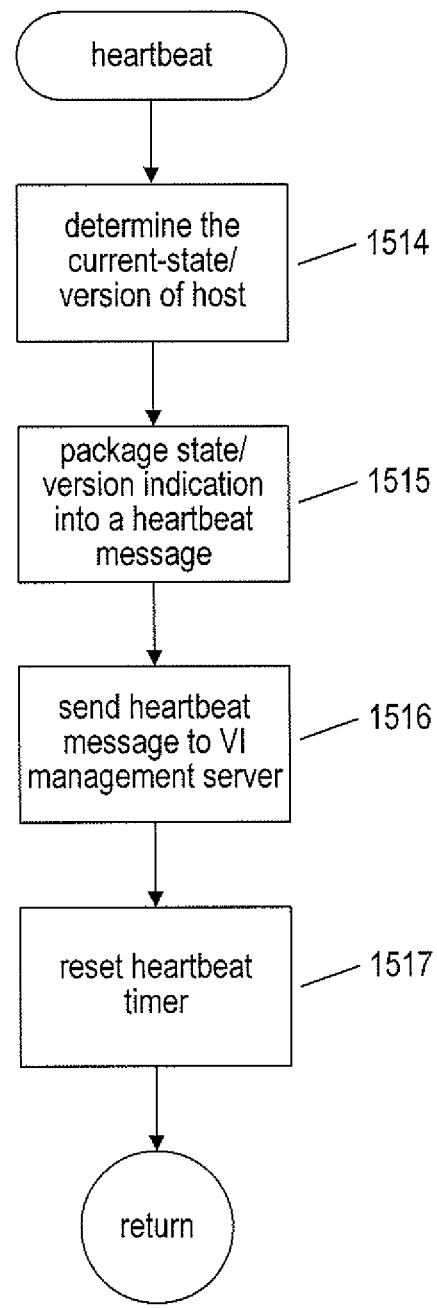

FIG. 15B illustrates the heartbeat handler called in step 1503 of FIG. 15A. In step 1514, the heartbeat handler determines a current state/version that represents the current operational status of the host server. The state/version indication is, in one implementation, an alphanumeric symbol string or a series of one or more symbol strings and floating-point numbers. The state/version indication is of sufficient length, and therefore has a sufficient number of different possible values, to uniquely assign a state/version indication value to each significant operational state of the host server system. In step 1515, the heartbeat handler packages the state/version indication into a heartbeat message which, in step 1516, the handler sends to the VI management server via the logical communications path between the host-management interface within the VI management server and the VPXA agent within the host server. Finally, in step 1517, the heartbeat handle resets the heartbeat timer in order to specify the time at which a next heartbeat message is sent to the VI management server. The heartbeat message is provided by the VPXA agent to allow the VI management server to track and monitor the operational status of host servers managed by the VI management server and to quickly recognize a host-server failure in order to restart VMs that were executing on the failed host server on other host servers.

Figure 15C:
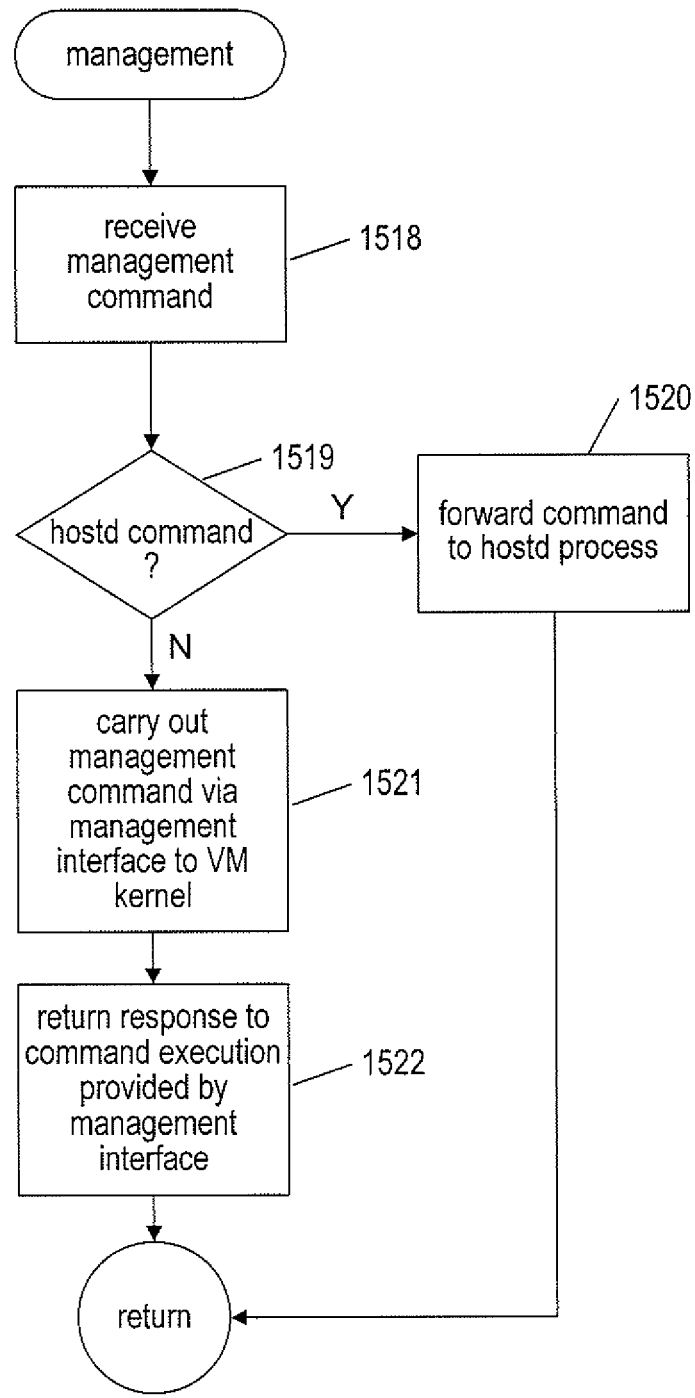

FIG. 15C illustrates the management handler called in step 1505 of FIG. 15A. In step 1518, the management handler receives the management command that was received by the VPXA agent from the VI management server. When the management command is a management command directed to the hostd process, as determined in step 1519, the management command is forwarded to the hostd process for execution, in step 1520. When the hostd process finishes executing the command, a hostd response is returned to the VPXA agent and handled by a hostd handler, called in step 1509 of FIG. 15A. Otherwise, in step 1521, the management handler accesses a management interface provided by the VM kernel to carry out the management command on behalf of the VI management server. In step 1522, the response from the management interface of the VM kernel is received and returned to the VI management server. In certain cases, although not shown in FIGS. 15A-G, the management handler may terminate after submitting the management command to the VM kernel management interface, with the VM kernel management interface subsequently generating an event for command completion that is handled by a separate event handler, just as the hostd event handler handles responses from the hostd process.

Figures 15D, 15E:
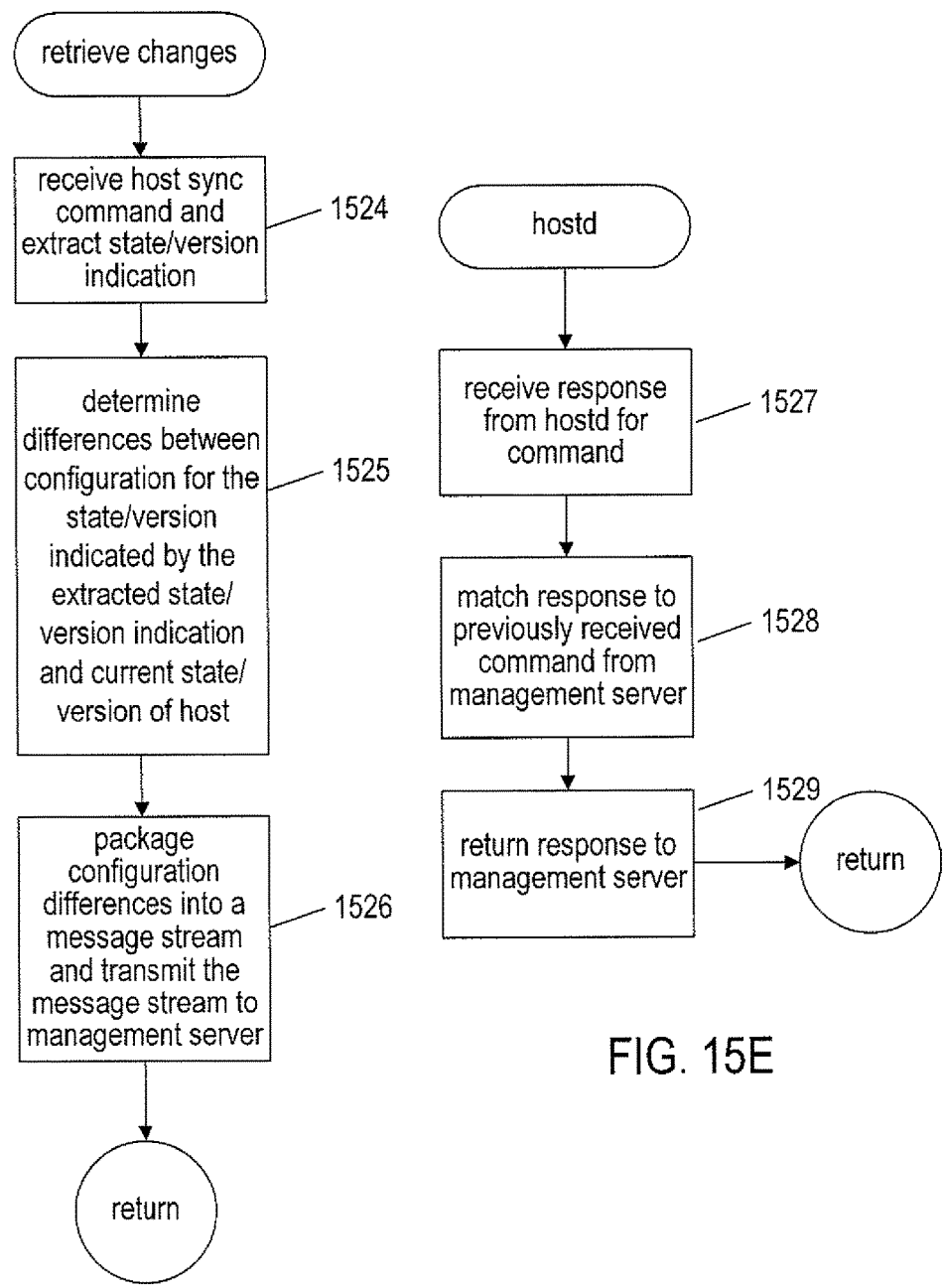

FIG. 15D shows the retrieve-changes handler called in step 1507 of FIG. 15D. In step 1524, the retrieve-changes handler receives a retrieve-changes command received by the VPXA agent from the VI management server and extracts a state/version indication from the retrieve-changes command. This is the state/version indication which the VI management server considers to be the current state/version of the host server. However, because a different state/version indication was returned by the VPXA agent in a previous heartbeat message, the VI management server has requested the retrieve-changes operation in order to obtain updated status and configuration information for the host server. In step 1525, the retrieve-changes handler determines the differences between the current configuration and operational status of the host server and the configuration and operational status that the host server had when the extracted state/version indication was returned to the VI management server. These configuration differences are packaged into a message stream, transmission of which is initiated in step 1526. One of the significant motivations for creation of the VPXA agent and proprietary protocol by which the VPXA agent communicates with the host-management interface within the VI management server is that the heartbeat messages and host sync operation provide more efficient monitoring and configuration-change information exchange between the VI management server and host servers than a direct interconnection between the VI management server and the hostd process.

FIG. 15E illustrates the hostd handler called in step 1509 of FIG. 15A. In step 1527, the hostd handler receives a response to a command executed by the hostd process on behalf of the VI management server. In step 1528, the VPXA agent matches the received response to a previously received management command from the VI management server and then, in step 1529, returns the received response from the hostd process to the VI management server in the context of the previously received command from the VI management server.

Figure 15F:
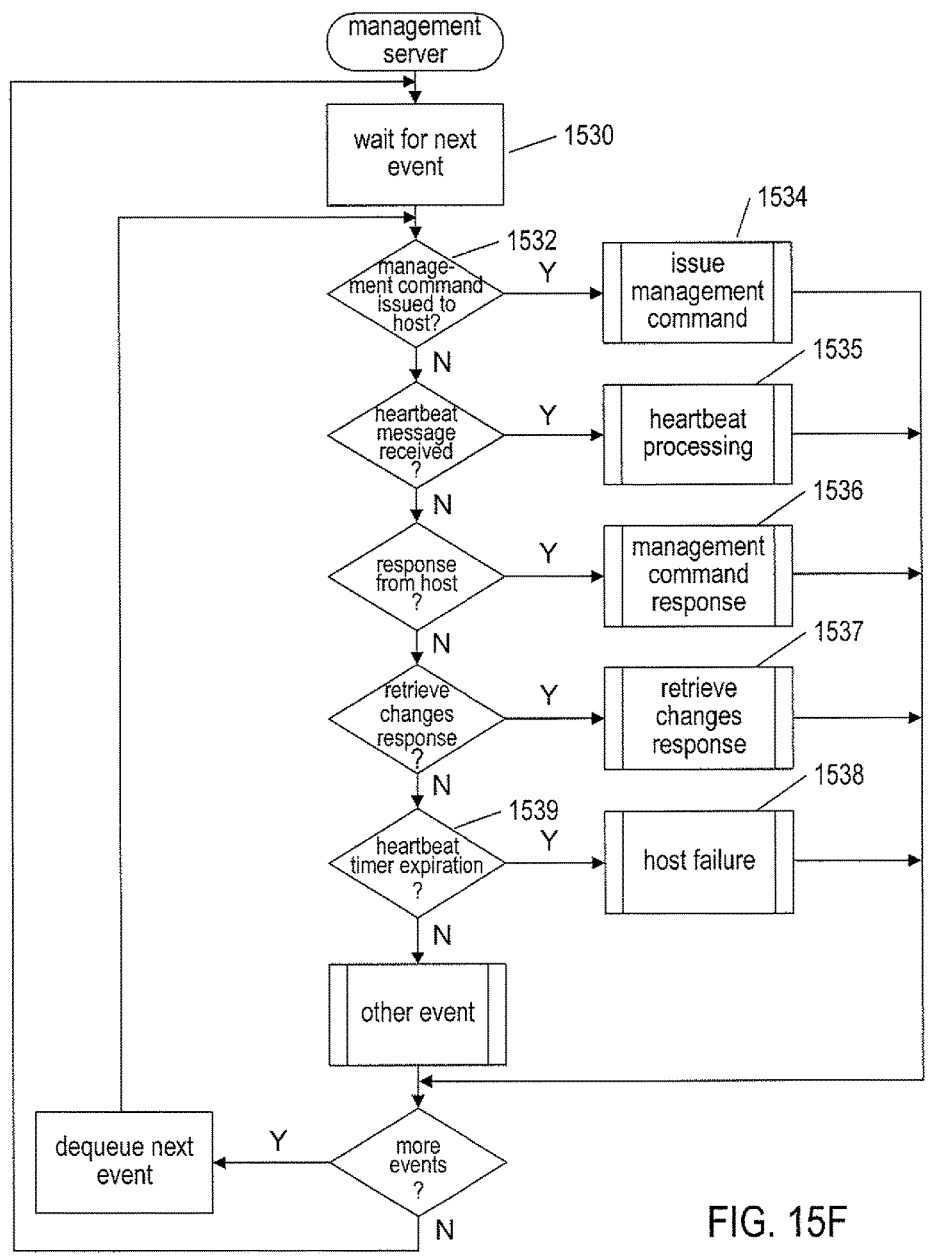

FIG. 15F shows an event loop that runs within the management process of the VI management server that provides the host-management interface that communicates with the VPXA agents and host servers managed by the VI management server. The event loop shown in FIG. 15F is similar to the event loop shown in FIG. 15A for the VPXA agent. The management-server event loop waits for a next event to occur in step 1530. Each different type of event, determined by a sequence of conditional steps, such as conditional step 1532, results in a call to a corresponding handler, as in the event loop discussed above with reference to FIG. 15A. Calls to handlers explicitly shown in FIG. 15F include a call to a handler that issues management commands to host servers 1534, a heartbeat-message-processing handler 1535, a handler for received responses to issued management commands 1536, a handler for receiving processing responses to retrieve-changes commands 1537, and a host-failure handler 1538 that is called to handle host failure events detected by expiration of a heartbeat timer associated with the host, identified in conditional step 1539. In the interest of brevity, only the heartbeat-processing handler 1535 is further discussed.

Figure 15G:
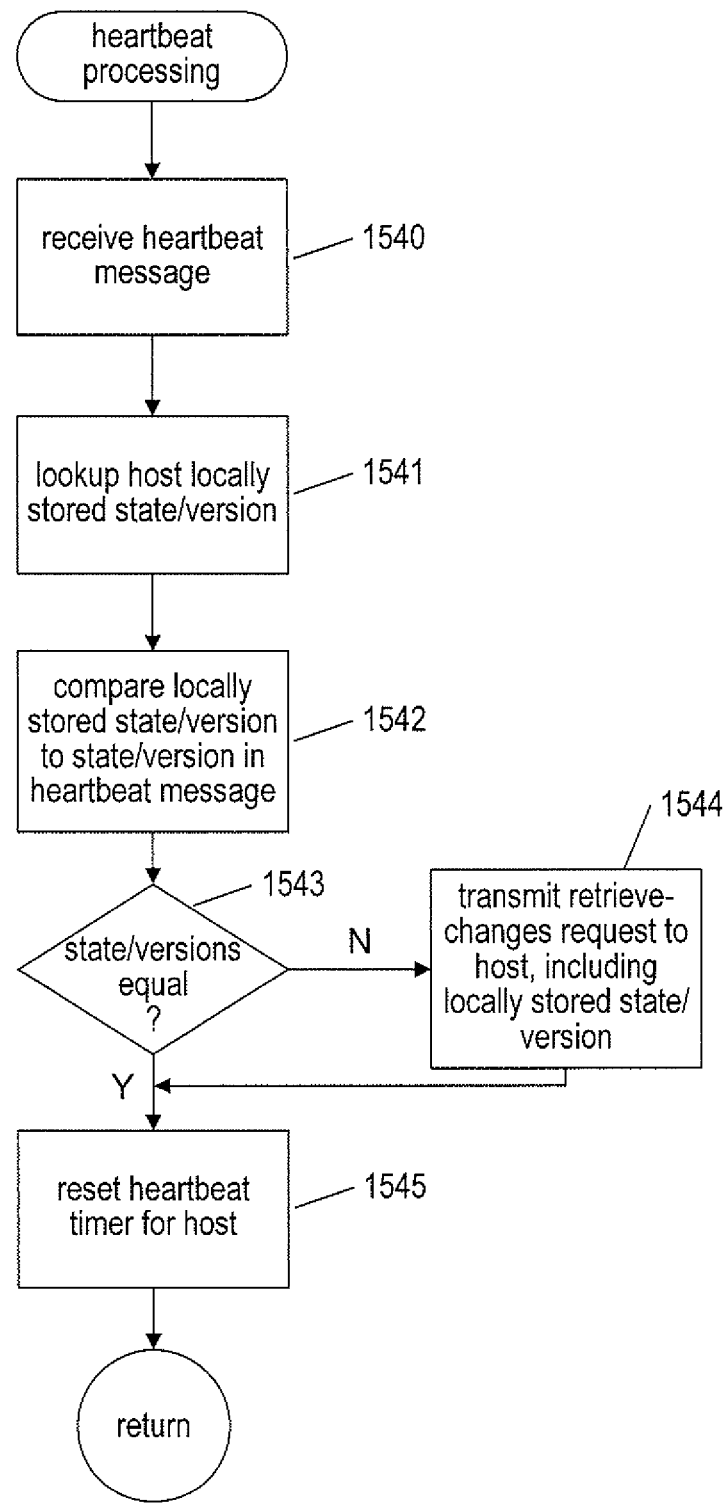

FIG. 15G illustrates the heartbeat-processing handler called at step 1535 of FIG. 15F. In step 1540, the heartbeat-processing handler receives a heartbeat message forwarded to the management server from a host server. In step 1541, the heartbeat-processing handler looks up the current state/version indication stored for the host server from which the heartbeat message was received. In step 1542, the heartbeat-processing handler compares the locally stored state/version indication with the state/version indication contained in the heartbeat message. When the two state/version indications are not equal, as determined in step 1443, then the heartbeat-processing handler, in step 1544, transmits a retrieve-changes request to the host server from which the heartbeat message was received, including in the retrieve-changes request the locally stored state/version indication. Finally in step 1545, the heartbeat timer for the host from which the heartbeat message was received is reset.

The host-management-interface/VPXA agent communications protocol and information exchanged include many additional details not shown in FIGS. 15A-F. A full description of these interfaces, the commands and information exchanged through them, and other details of VPX-agent implementation and VI-management-server implementation would require many hundreds of pages of description and hundreds of illustrative figures. However, these details are unnecessary for describing host-cluster aggregation via host gateways, and are therefore omitted from the current document.

Figure 16A:
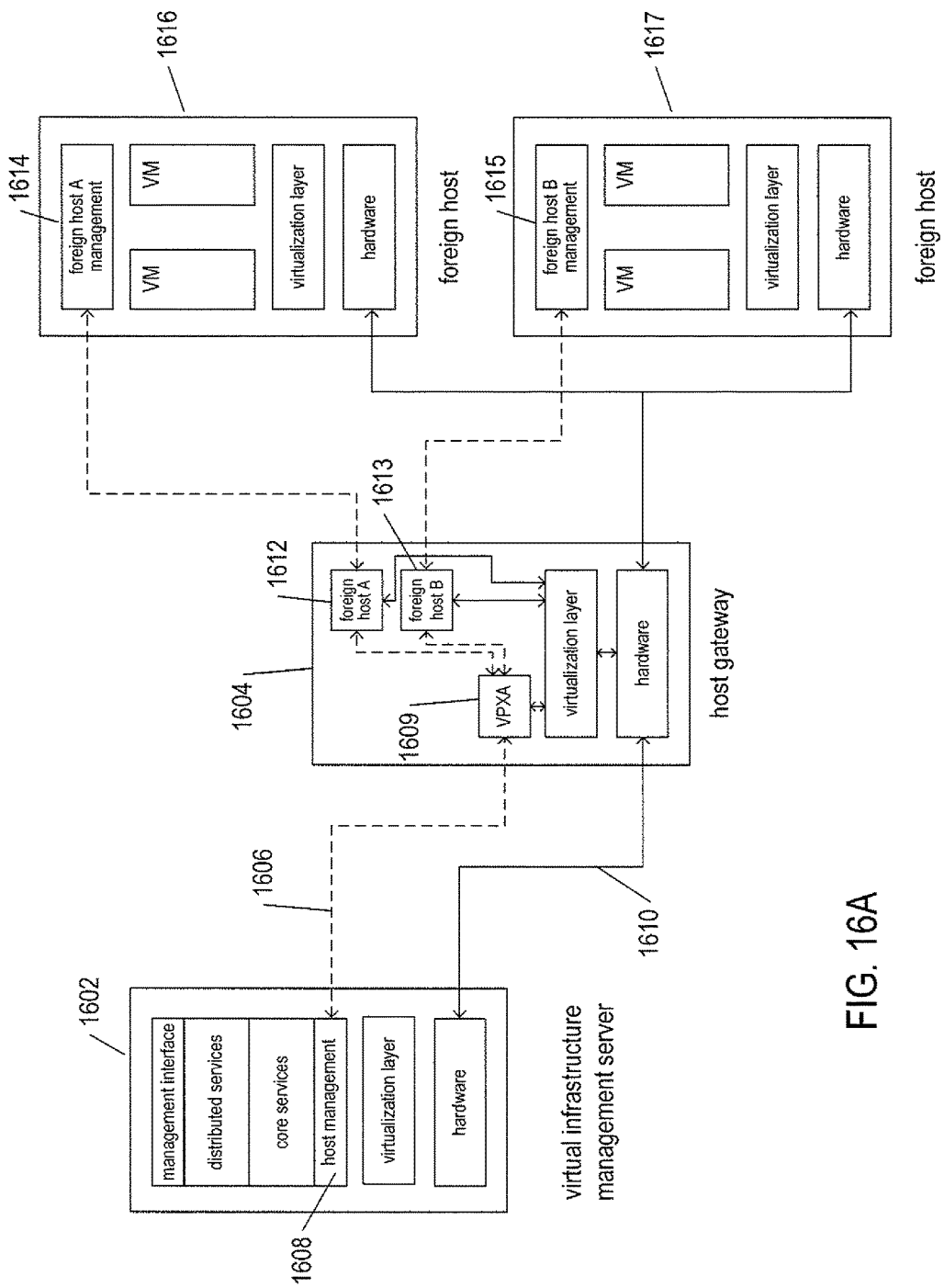
FIGS. 16A-E illustrate a host-gateway appliance that has been developed in order to, among other things, connect hosts running different types of virtualization layers to a VI management server that includes a host-management interface designed to interface to host servers with a specific type of virtualization layer.

FIGS. 16A-E illustrate a host-gateway appliance that has been developed in order to, among other things, connect hosts running different types of virtualization layers to a VI management server that includes a host-management interface designed to interface to host servers with a specific type of virtualization layer. FIG. 16A shows interconnection of a VI management server via a host-gateway appliance to two foreign hosts. Foreign hosts are host servers running virtualization layers different from the virtualization layer to which the host-management interface within the VI management server is designed to interface. As in FIG. 14, the VI management server 1602 connects to the host-gateway appliance 1604 via a logical communications pathway 1606 provided by the host-management interface 1608 within the VI management server, a VPXA agent 1609 within the host-gateway appliance 1604, and an underlying hardware-level communications pathway 1610. However, within the host-gateway appliance, the VPXA agent interfaces to a first foreign-host adapter 1612 and a second foreign-host adapter 1613 that, in turn, interface to foreign-host management interfaces 1614 and 1615, respectively, within a first foreign host system 1616 and a second foreign host system 1617. In general, the host-gateway appliance includes a different foreign-host adapter for each different type of virtualization layer included in the foreign-host systems interconnected by the host-gateway appliance to the VI management server. In essence, the foreign-host adaptors 1612 and 1613 implement communications pathways to foreign-host management interfaces that replace or substitute a hostd process within a host executing the virtualization layer to which the host-management interface of the VI management server is designed to interface.

Figure 16B:
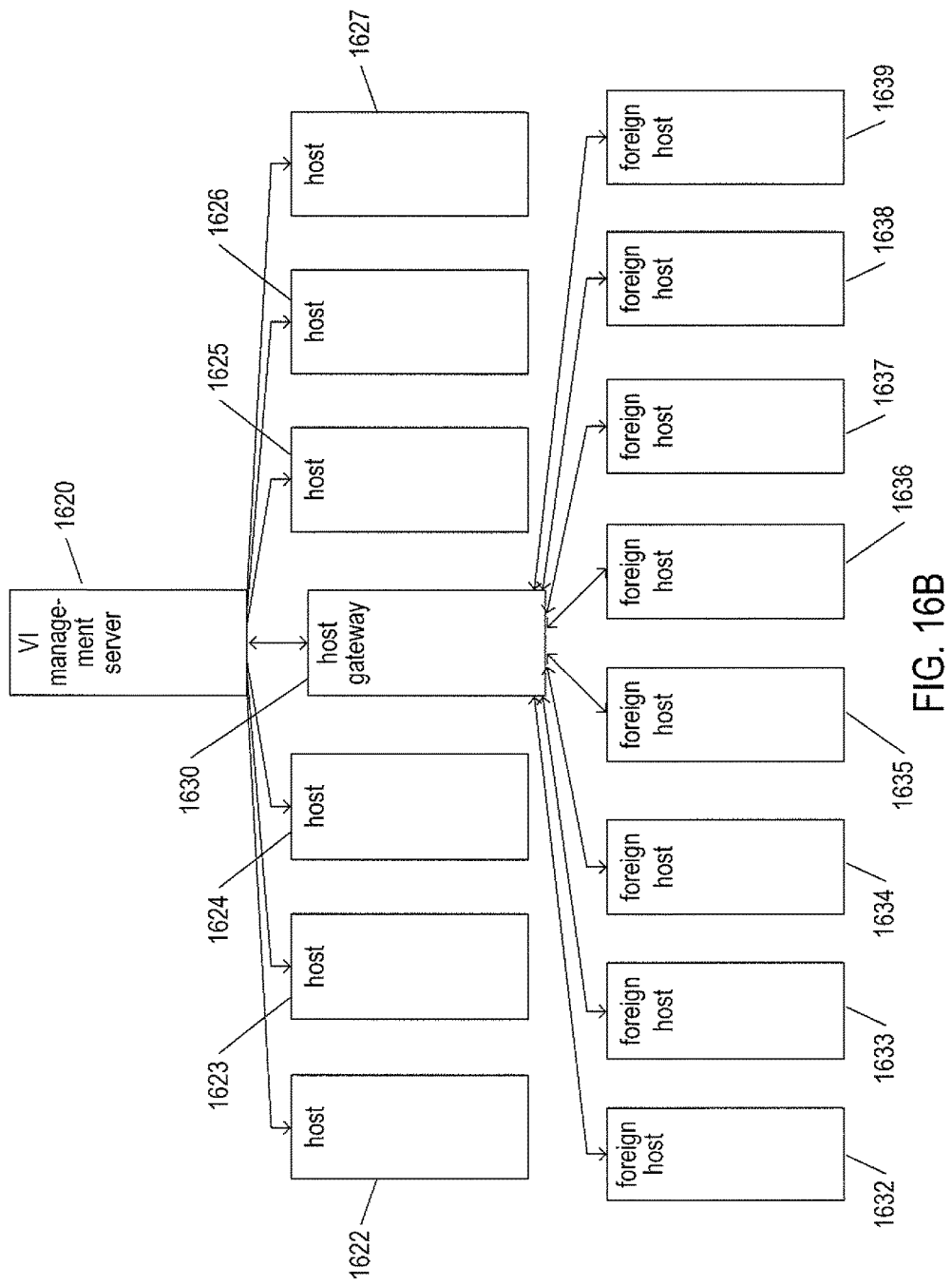

FIG. 16B illustrates a virtual data center that includes both native hosts managed directly by a VI management server and foreign hosts managed by the VI management server via a host-gateway appliance. In FIG. 16B, the VI management server 1620 manages native host systems 1622-1627 through the host-management-interface/VPXA-agent communications pathway discussed above with reference to FIG. 14. The VI management server 1620 additionally connects to a host-gateway appliance 1630, as discussed above with reference to FIG. 16A, in order to interface to, and manage, a number of foreign host servers 1632-1639. In order to provide an interconnection between the VI management server and foreign hosts, the host-gateway appliance includes a VPXA agent that is modified to interface to foreign-host adapters, rather than to a single hostd process, as discussed above with reference to FIG. 14.

Figure 16C:
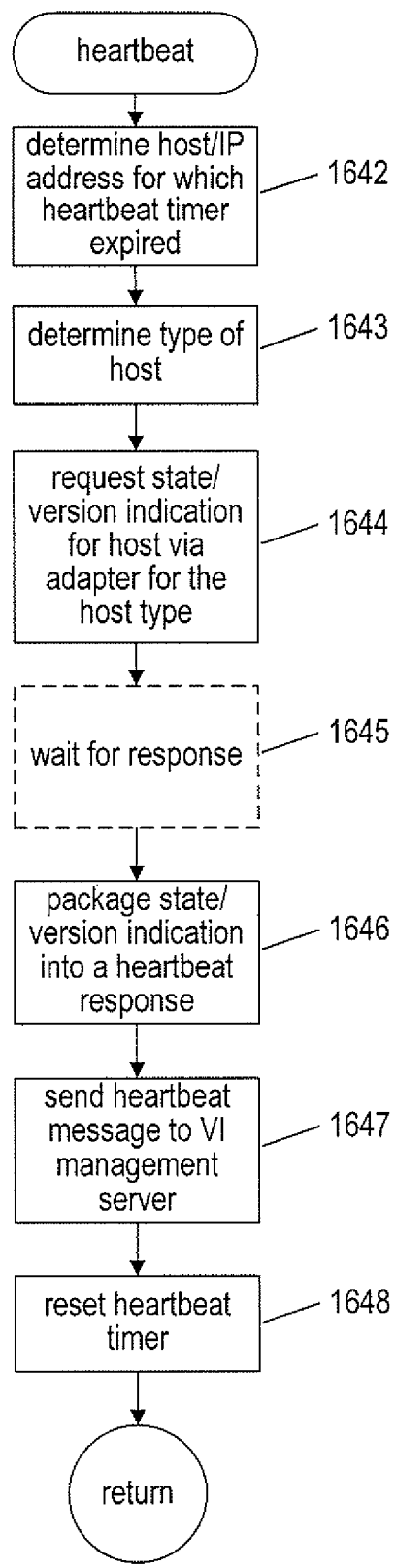
Figure 16D:
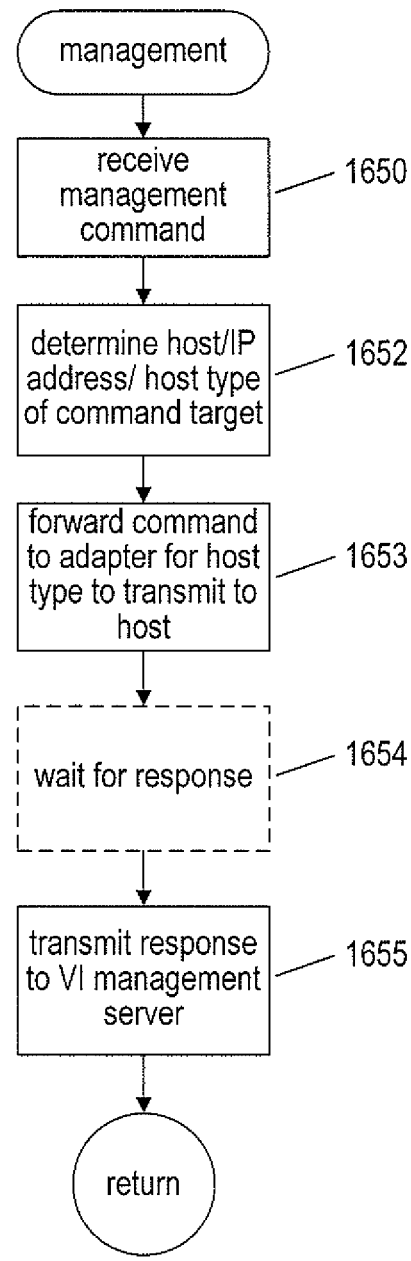
Figure 16E:
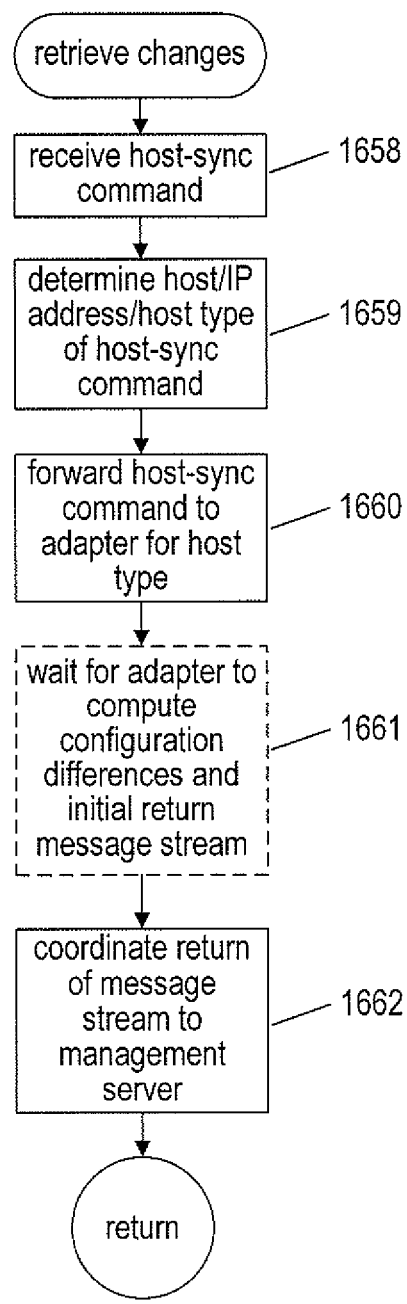

FIGS. 16C-E illustrate, using control-flow diagrams, modifications to the event handlers discussed above with reference to FIGS. 15B-D that execute within an event loop of a native VPXA agent running within a native host. In the heartbeat handler illustrated in FIG. 16C, the heartbeat handler determines the host and an IP address for the host for which the heartbeat timer expired, in step 1642. In step 1643, the heartbeat handler determines the type of host corresponding to the heartbeat-timer expiration. The information used to make this determination is stored by the VPXA process in the VM kernel file system, in the currently described implementation. In step 1644, the heartbeat handler requests a current state/version indication for the host server corresponding to the heartbeat-timer expiration via the foreign-host adapter for the determined host type. In step 1645, the heartbeat handler waits for a response to this request. The heartbeat handler may actually wait for a response or may instead terminate, at this point, with the response handled by an additional state/version-indication-request handler. The dashed-line representation of the wait-for-response step 1645 indicates that any of many different types of techniques for waiting for, and processing, an asynchronously executed command can be used to handle the response returned by the foreign-host adapter. This same illustration convention is used in subsequent figures to indicate two or more possible approaches for handling asynchronous responses. In step 1646, the state/version indication returned by the foreign-host adapter for the host corresponding to the heartbeat-timer expiration handled by the heartbeat handler is packaged into a heartbeat response which is then sent, in step 1647, to the VI management server. In step 1648, the heartbeat timer is reset. Note that the foreign-host adapter, upon receiving the request for the state/version indication, may either immediately return a state/version indication stored for the host system based on a separate heartbeat protocol carried out between the foreign-host adapter and foreign hosts or may request information from the management interface of the foreign host, via a communications protocol, and then transform the returned information into the state/version indication returned to the VI management server in step 1647.

FIG. 16D provides a control-flow-diagram illustration of the management handler within the VPXA agent of a host-gateway appliance. In step 1650, the management handler receives a management command forwarded to the host-gateway appliance by the VI management server. In step 1652, the management handler determines the host, IP address for the host, and the type of the host to which the management command is directed, using locally stored information. In step 1653, the management handler forwards the management command and the determined information to the foreign-host adapter for the host type determined in step 1652. In step 1654, the management handler either waits for the response or terminates, with the response handled by an additional management-command-response handler. Finally, in step 1655, the management handler transmits the response received from the foreign-host adapter to the VI management server.

FIG. 16E illustrates the retrieve-changes handler executed in response to a retrieve-changes event within a VPXA-agent event loop for a VPXA agent executing within a host-gateway appliance. In step 1658, the retrieve-changes handler receives a retrieve-changes command sent to the host-gateway appliance by the VI management server. In step 1659, the host, IP address of the host, and type of host are determined. In step 1660, the retrieve-changes command, along with the information determined in step 1659, are forwarded to the foreign-host adapter corresponding to the determined host type. In step 1661, the host sync handler either waits for the foreign-host adapter to obtain configuration differences and initiate a return message stream or terminates, with an additional retrieve-changes-response handler invoked when the return message stream is initiated. In step 1662, the retrieve-changes handler coordinates return of the messages in the message stream to the VI management server.

The host-gateway appliance may have uses in addition to connection of foreign hosts to VI management servers. For example, a host-gateway appliance can be used in order to provide access, by a VI management server, to multiple native host systems via a single IP address associated with a host-gateway appliance. Alternatively, the host-gateway appliance can be used so that VDC management-server commands are transmitted to native hosts connected to the host-gateway appliance via an IP address different from the IP addresses by which the native host systems are directly connected to for other purposes. In these cases, a native-host adapter, equivalent to the foreign-host adapters discussed above with reference to FIG. 16A, is included in the host-gateway appliance to allow the VPXA agent within the host-gateway appliance to communicate with VPXA agents within native hosts connected by the host-gateway appliance to the VI management server.

Implementations of the Currently Disclosed Testing and Analysis Methods and Systems Although the host gateway has been developed to allow for incorporation of non-native hosts into virtual data centers and other virtual infrastructure managed by a VI management server, the host gateway can be modified to provide a low-cost and efficient simulation and testing appliance for simulating large virtual data centers and other virtual infrastructure in order to test VI management servers and to apply large computational loads to VI management servers in order to observe the effects of large computational loads on VI-management-server operation. The modified host-gateway system simulates large numbers of host systems and provides an interface to the simulated host systems equivalent to the interface provided by the host-gateway appliance to foreign host systems. Simulation of host systems is more time-efficient and cost-effective than configuring large physical distributed computing systems and can be used for many testing and analysis tasks.

Figure 17A:
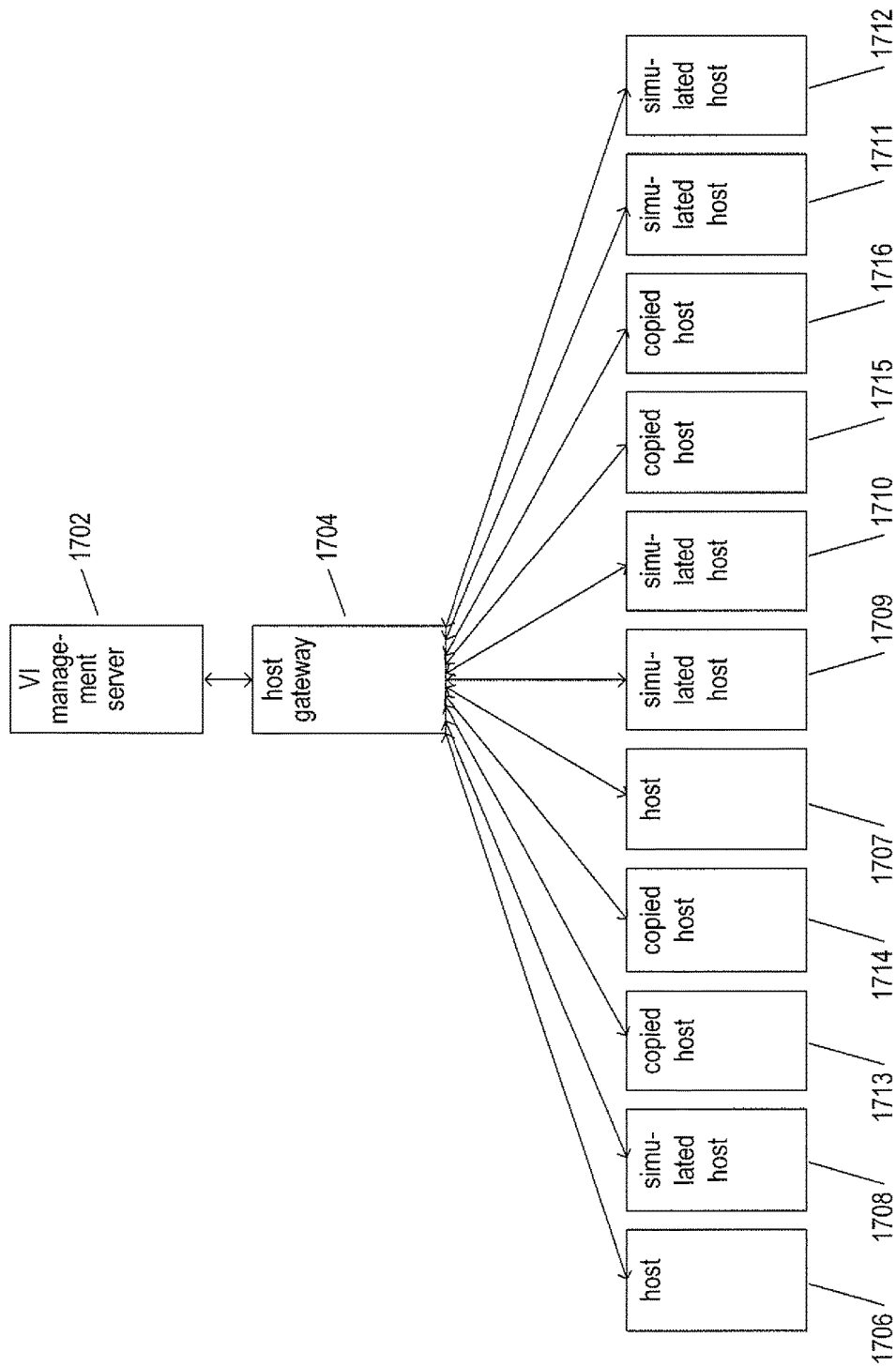
FIGS. 17A-D illustrate a modified host gateway that is used as a simulation/testing appliance for a VI management server.

FIGS. 17A-D illustrate a modified host gateway that is used as a simulation/testing appliance for a VI management server. FIG. 17A illustrates a simulated virtual infrastructure provided by a modified host gateway. As shown in FIG. 17A, a VI management server 1702 is connected to a modified host-gateway appliance 1704 that is, in turn, connected to several native host servers 1706-1707 as well as to a larger number of simulated host servers 1708-1712 and copied host servers 1713-1716. As discussed, in greater detail, below, simulated host servers are virtual host servers generated by simulation logic within the modified host gateway. By contrast, copied host servers are simulated host servers that modify messages exchanged between a native host server and the VI management server in order to simulate additional host servers. Various different types of simulated configurations can be generated, involving only simulated hosts, only copied hosts, or both simulated and copied hosts. Copied hosts rely on at least one native host being connected to the host gateway that exchanges messages with the VI management server. In certain cases, simulated hosts may operate independently from native hosts.

Figure 17B:
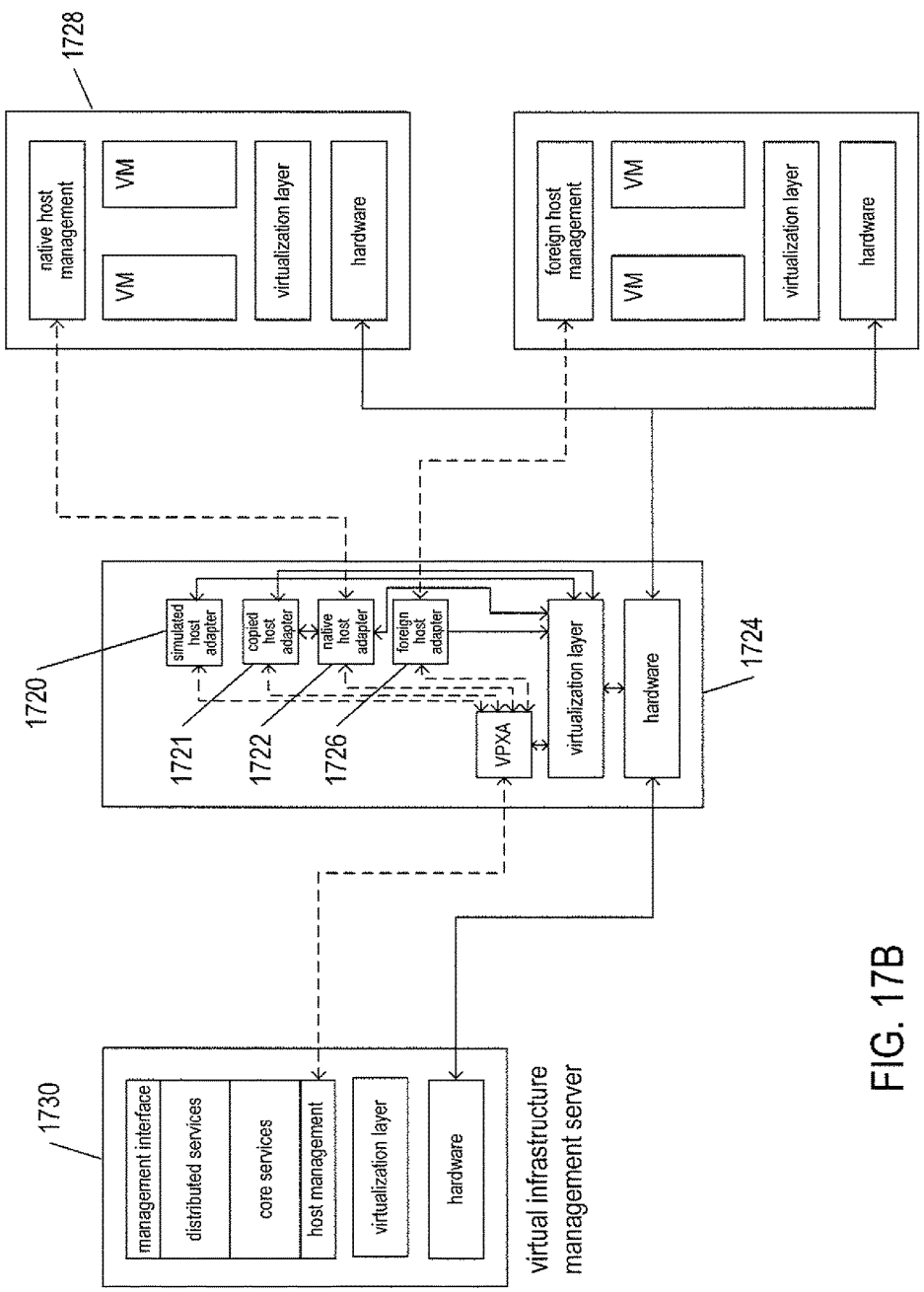

FIG. 17B, using illustration conventions similar to those used in FIG. 16A, illustrates the modifications to the host gateway shown in FIG. 16A to allow the additionally modified host gateway appliance to simulate host servers for testing and analysis purposes. Much of the elements and detail shown in FIG. 17B are identical to those shown in FIG. 16A, and are therefore not again redundantly described. In order to allow for simulation of host servers, three new types of host adapters 1720-1722 may be included in the implementation of a modified host gateway 1724 shown in FIG. 17B. The native-host adapter 1722, like the previously described foreign-host adapters, such as foreign-host adapter 1726 and foreign-host adapters 1612 and 1613 in FIG. 16A, operates as a link between the modified host gateway appliance 1724 and an actual host server 1728. The native-host adapter is included in the host gateway to facilitate implementation of copied-host adapters and to link the VI management server 1730 through the host-gateway appliance to a native remote host server 1728, rather than to a non-native host server. The simulated-host adapter 1720 may entirely emulate a host server, using emulation scripts, or may, like the copied-host adapter 1721, intercept and modify messages exchanged between the VI management server 1730 and the native remote host server 1728. Furthermore, a copied-host adapter directly intercommunicates with the native host adapter 1722. A given host-gateway appliance may include multiple native-host adapters, simulated-host adapters, and copied-host adapters. In the implementation described below, there is a one-to-one mapping between simulated-host adapters and simulated host servers and a one-to-one mapping between copied-host adapters and copied host servers, but, in alternative implementations, these adapters may be alternatively designed and implemented to simulate two or more host servers.

Figure 17C:
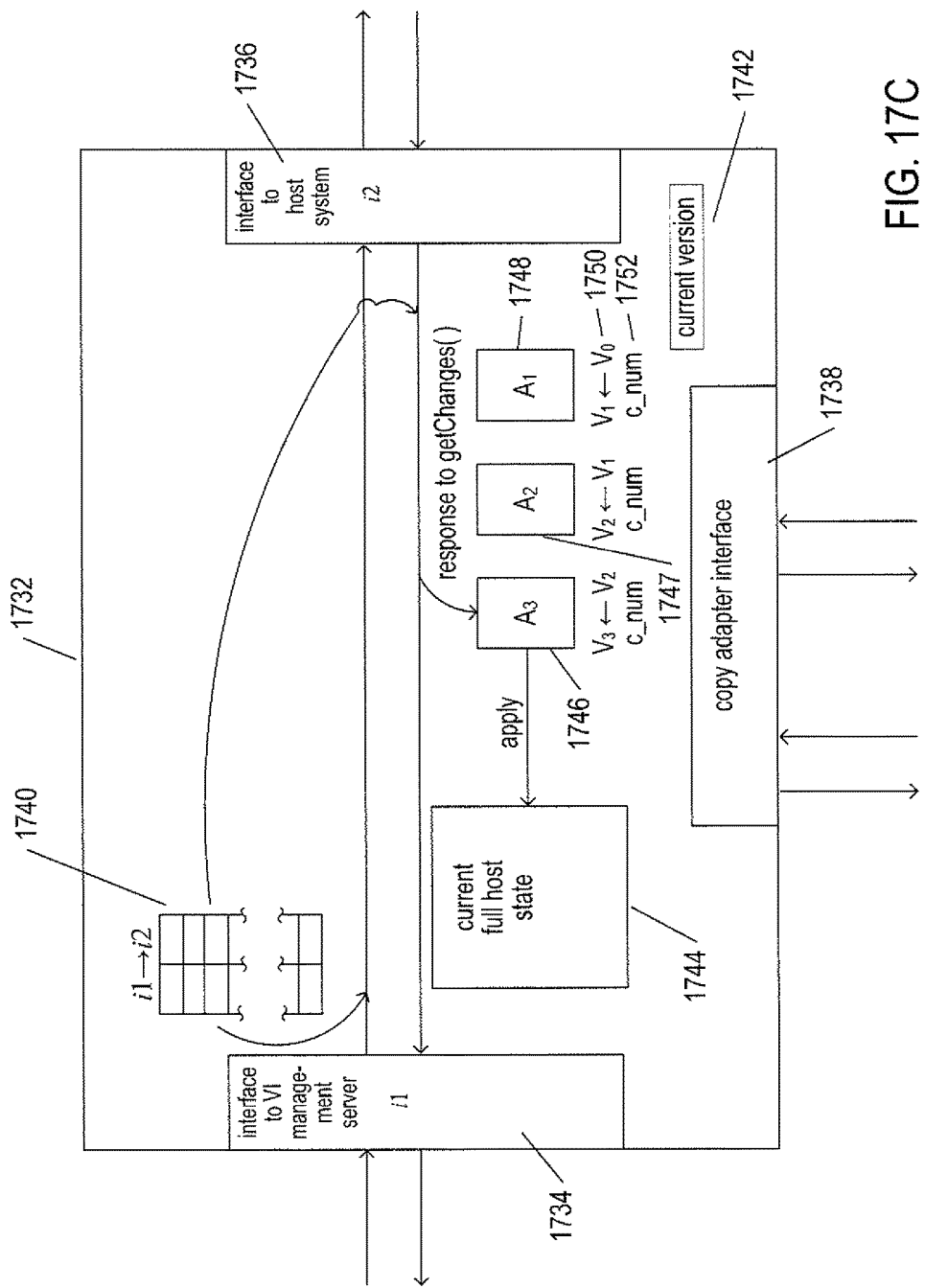

FIG. 17C illustrates certain of the internal components of a native host adapter (1722 in FIG. 17B). The native host adapter 1732 includes a communications interface 1734 to the VI management server via the host-gateway VPXA agent and host-gateway communications hardware as well as a communications interface 1736 to a native host server, again through the communications hardware of the host-gateway appliance. The native host adapter 1732 also includes a communications interface 1738 that allows each copied-host adapter to request state/version indications and host-state information from the native host adapter. The native host adapter additionally includes an IP-address mapping table 1740 that includes IP-address mappings that allow the native-host adapter to substitute different IP addresses for the IP addresses that occur in messages received through the interface to the VI management server and through the interface to the host system 1736. For example, a management command may be received from the VI management server that includes a target or destination IP address of the host-gateway appliance and a source IP address of the VI management server. The message is directed by the VPXA agent of the host-gateway appliance to the native host adapter 1732. The native host adapter needs to replace the destination IP address of the host-gateway appliance with the IP address of the native host server to which the native host adapter forwards the message and also needs to replace the source address of the VI management server with the IP address of the host-gateway appliance. Similarly, when a response to the command message is received from the native host system through the communications interface to the native host system 1736, the message has a target or destination IP address of the host-gateway appliance and a source address of the native host system. The contents of the remapping table 1740 are used to substitute the IP address of the VI management server for the target or destination address and an IP address of the host gateway system for the source address. IP address mapping thus allows the host-gateway appliance to insert itself into the communications path between the VI management server and the native host server without either the VI management server of the native host server being aware that they are communicating through the host-gateway appliance. Both the IP-address remapping table and a subsequently discussed UUID remapping table are generally bi-directional, including both forward and backward remappings. Alternatively, the remapping tables may consist of a pair of tables, one for forward remappings of messages received from the VI management server, and another for backward remappings of messages received from the native host server.

The native host adapter additionally includes a local instance of the current state/version indication for the native host computer 1742. Finally, the native host adapter maintains a copy of the full host state 1744 for the native host computer as well as a sequence of delta changes to the full host state 1746-1748, received from the native host system in response to getChanges commands forwarded by the native host adapter to the native host system on behalf of the VI management server. The phrases "retrieve-changes request" and "getChanges request" are also used to refer to a getChanges command. Each delta change, such as delta change 1748, represents a set of substitutions that, when applied to a full host state, transforms the full host state to a next full host state with a next associated state/version indication. The delta change may include many individual position/length/replacement-text objects, each of which specifies a particular local change to the host state. The change in state/version indication produced by applying the delta change to a first host state to generate a next host state is maintained with each delta. For example, delta 1748 is associated with an indication 1750 that application of the delta to the full host state associated with state/version indication $V_0$ transforms the full host state to the full host state associated with the state/version indication $V_1$. In addition to being associated with the state/version transformation information 1750, each delta, such as delta 1748, is associated with the current number of copied hosts to which the delta has not yet been forwarded 1752. The response to a getChanges command may, in certain cases, be a full new host state, rather than a delta. In this case, a special delta is pushed onto the sequence of deltas to indicate that getChanges returned a full host state, rather than a delta-change for the current host state. The special delta may be encoded in any of many different ways to distinguish it from deltas that are applied to a first host state to transform the first host state into a next host state.

The native host adapter is basically a pass-through adapter that allows the host-gateway appliance (1724 in FIG. 17B) to communicate with a native host system. In the current testing application, a native host adapter communicates with copied-host adapters to simulate the presence of additional native host systems. Each native host adapter may communicate with one or more copied-host adapters. A testing system may, for example, include two native host adapters, each of which communicates with a different one of two different native host systems, and each of which additionally communicates with its own set of one or more copied-host adapters. Although the current implementation assumes native host adapters providing support for copied-host adapters, alternative implementations may modify foreign-host adapters to serve an equivalent purpose.

Figure 17D:
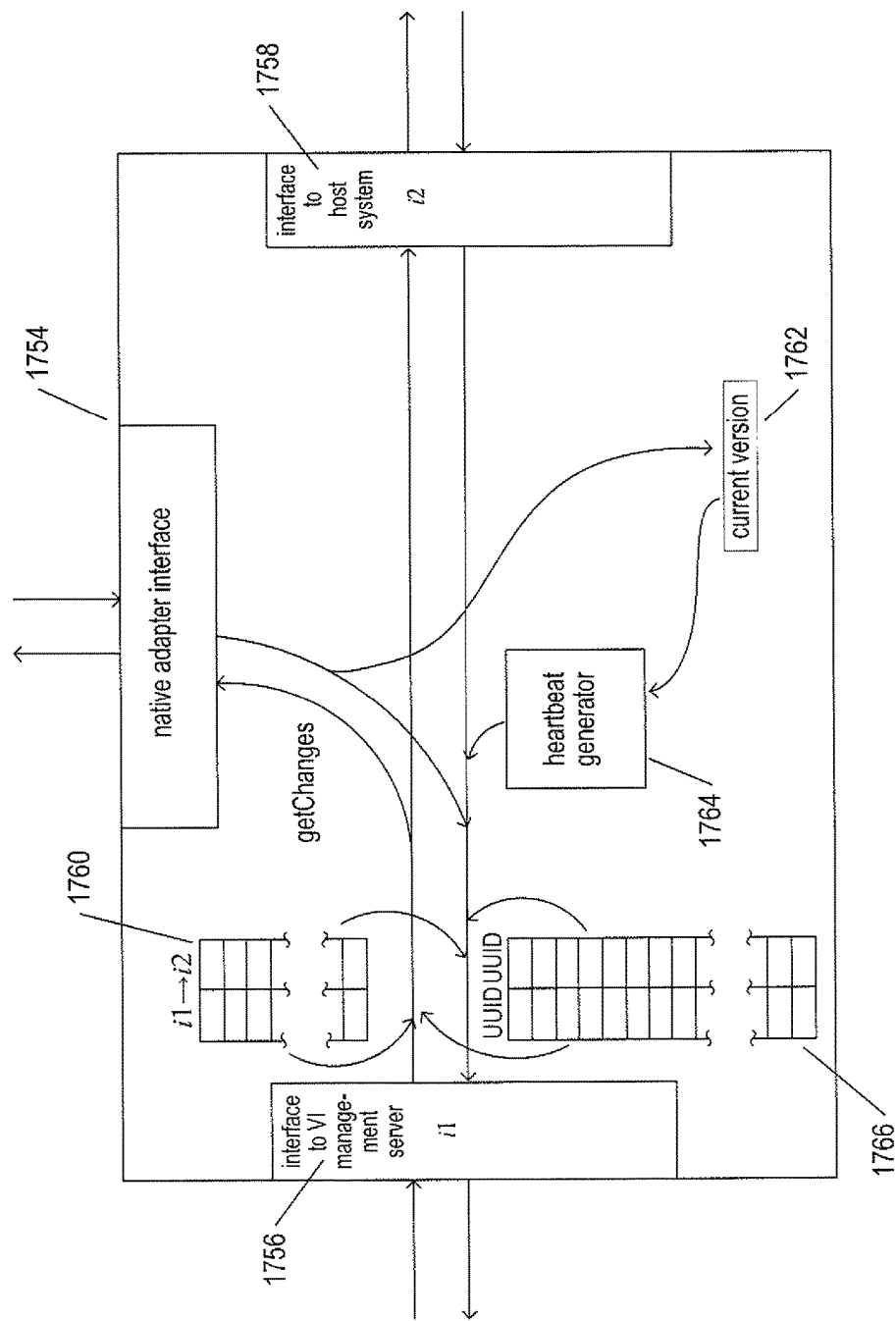

FIG. 17D illustrates certain of the internal components of a copied-host adapter. The copied-host adapter 1754 (1721 in FIG. 17B), like the native host adapter discussed above with reference to FIG. 17C, includes a communications interface 1756 to the VI management server and a communications interface 1758 to the native host system to which the native host adapter interfaces. Like the native host adapter, the copied-host adapter includes an IP-address remapping table 1760, used for the same purpose as the IP-address mapping table is used by the native host adapter. Like the native host adapter, the copied-host adapter also includes a locally stored current state/version indication 1762. In addition, the copied-host adapter includes a heartbeat generator 1764, similar to those implemented within foreign host adapters, and a universal unique identifier ("UUID") remapping table 1766. Many of the internal components of host systems and virtual data centers are referenced by, or associated with, UUIDs. Because the copied-host adapter is used to simulate a different host server than the native host server to which the copied-host adapter and the native host adapter are interconnected through respective communications interfaces, the components within the simulated host are assigned new, unique UUIDs to distinguish the simulated features and components from the actual features and components of the native host system. The remapping table is built on the fly by each copied-host adapter, generating new, unique UUIDs for the simulated host server as needed.

The copied-host adapter depends on the native-host adapter for state and state/version-indication information for a copied host server, which is the same state and state/version-indication information provided to the native-host adapter by the native host server with which the native-host adapter communicates. The copied-host adapter remaps IP addresses and UUIDs within certain of the VI-management-server command messages directed to the copied host and forwards them on to the native host server with which the native-host adapter communicates and returns remapped responses back to the VI management server. Thus, the host-gateway appliance, running a native-host adapter and a number n of copied-host adapters, simulates n host servers and provides connectivity to one native host server, simulating a large set of host servers managed by the VI management server.

Figure 18A:
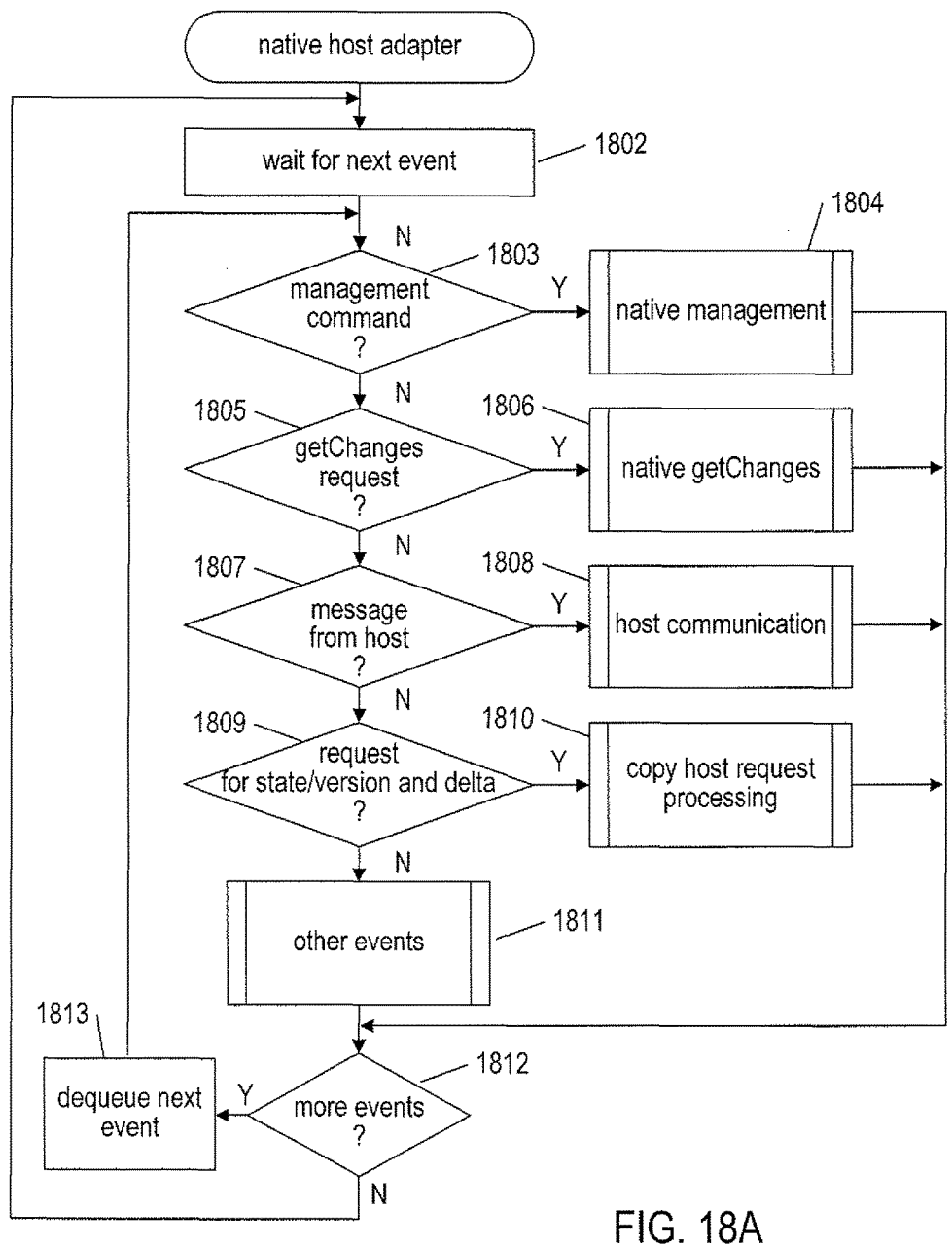
FIGS. 18A-F provide control-flow diagrams that illustrate operation of the native host adapter.

FIGS. 18A-F provide control-flow diagrams that illustrate operation of the native host adapter. FIG. 18A shows a high-level event loop that is used to model operation of the native host adapter. In step 1802, the native host adapter waits for a next event to occur. When the event is reception of a management command, through the interface to the VI management server (1734 in FIG. 17C) and host-gateway-appliance VPXA, from the VI management server, as determined in step 1803, a native-management handler is called, in step 1804. Otherwise, when the event is reception of a getChanges request from the VI management server, as determined in step 1805, a native getChanges routine is called, in step 1806, to process the getChanges request. When the event is reception of a message from the native host system, as determined in step 1807, a host-communications routine is called, in step 1808, to process the received message from the native host system. When the event is a request for a state/version indication and delta change from a copied host, as determined in step 1809, then, in step 1810, a copied host request processing routine is called to process the received request. A default handler 1811 is shown to indicate that various other types of events may occur and may be handled by the native host adapter. When there are additional events queued for processing, as determined in step 1812, control flows to step 1813, where a next event is dequeued from a queue of waiting events and control flows back to step 1803. Otherwise, control flows back to step 1802, where the native host adapter waits for a next event to occur.

Figure 18B:
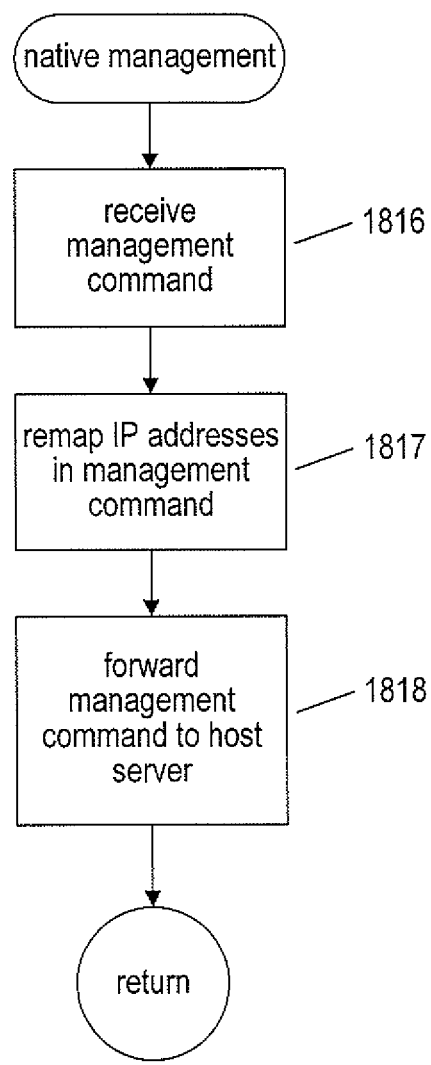

FIG. 18B shows a native management handler called in step 1804 of FIG. 18A. In step 1816, the management command is received by the handler. In step 1817, the management handler remaps any IP addresses in the management-command message using the IP-address remapping table (1740 in FIG. 17C), discussed above. Then, in step 1818, the native management handler forwards the management command to the native host server. Thus, as discussed above, the native host adapter is essentially a pass-through mechanism to facilitate exchanges of messages between the VI management server and a native host server.

Figure 18C:
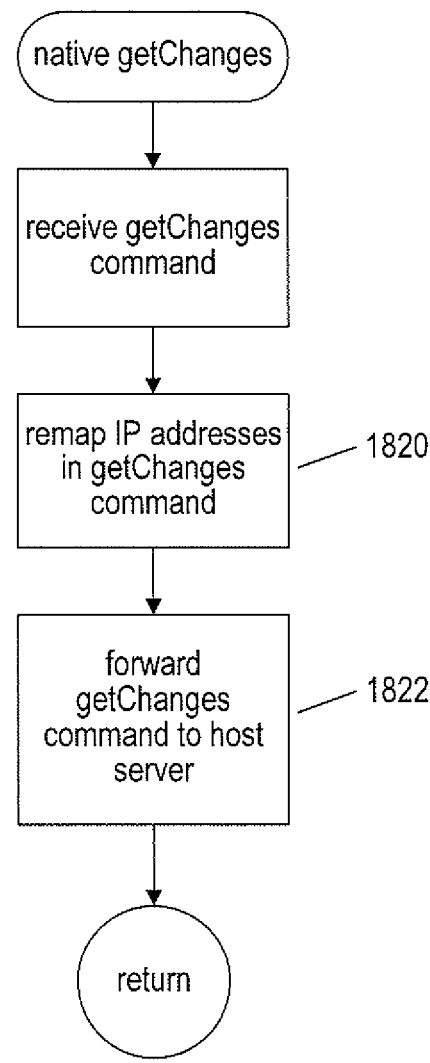

FIG. 18C illustrates the native getChanges handler called in step 1806 of FIG. 18A. This handler is similar to the native management handler, discussed above with reference to FIG. 18B. IP addresses within the getChanges command are remapped, in step 1820 and the getChanges command is forwarded to the native host server in step 1822.

Figure 18D:
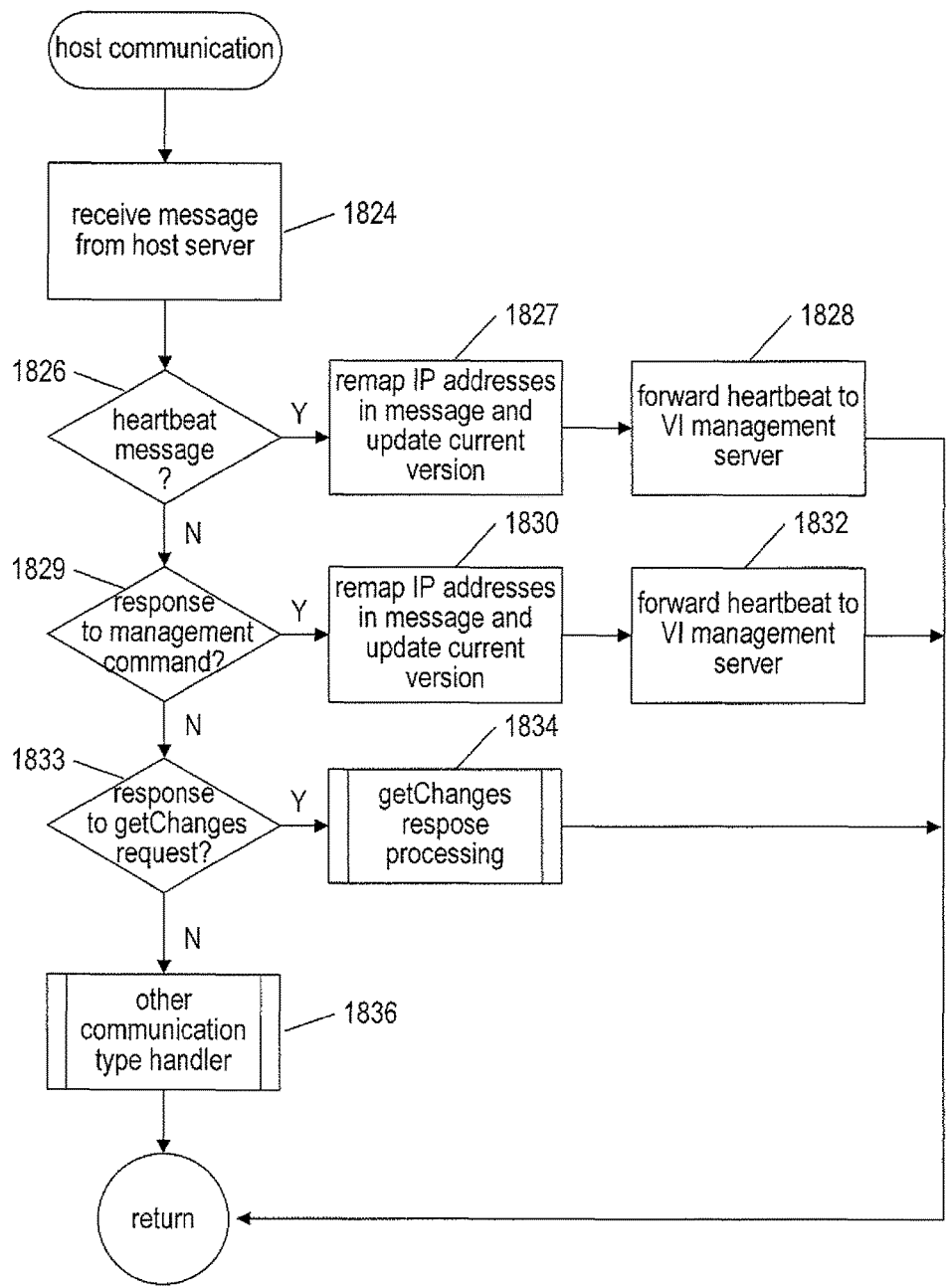

FIG. 18D shows the host-communications handler called in step 1808 of FIG. 18A. In step 1824, the host-communications handler receives a message from the native host server. When the message is a heartbeat message, as determined in step 1826, then, in step 1827, the host-communications handler remaps IP addresses in the message and extracts a state/version indicator from the message to update the locally stored current state/version indicator (1742 in FIG. 17C). In step 1828, the host-communications handler forwards the heartbeat message to the VI management server. Otherwise, when the message is a response to a management command forwarded to the native host server, as determined in step 1829, then, in step 1830, the IP addresses within the response message are remapped using the remapping table (1740 in FIG. 17C) and the management-command response is forwarded to the VI management server, in step 1832. When the received message from the native host server is a response to a getChanges request, as determined in step 1833, a getChanges response processing routine is called in step 1834 to process the getChanges-request response. A default handler 1836 is shown in FIG. 18D to indicate that other types of host communication may be received and handled by the native host adapter.

Figure 18E:
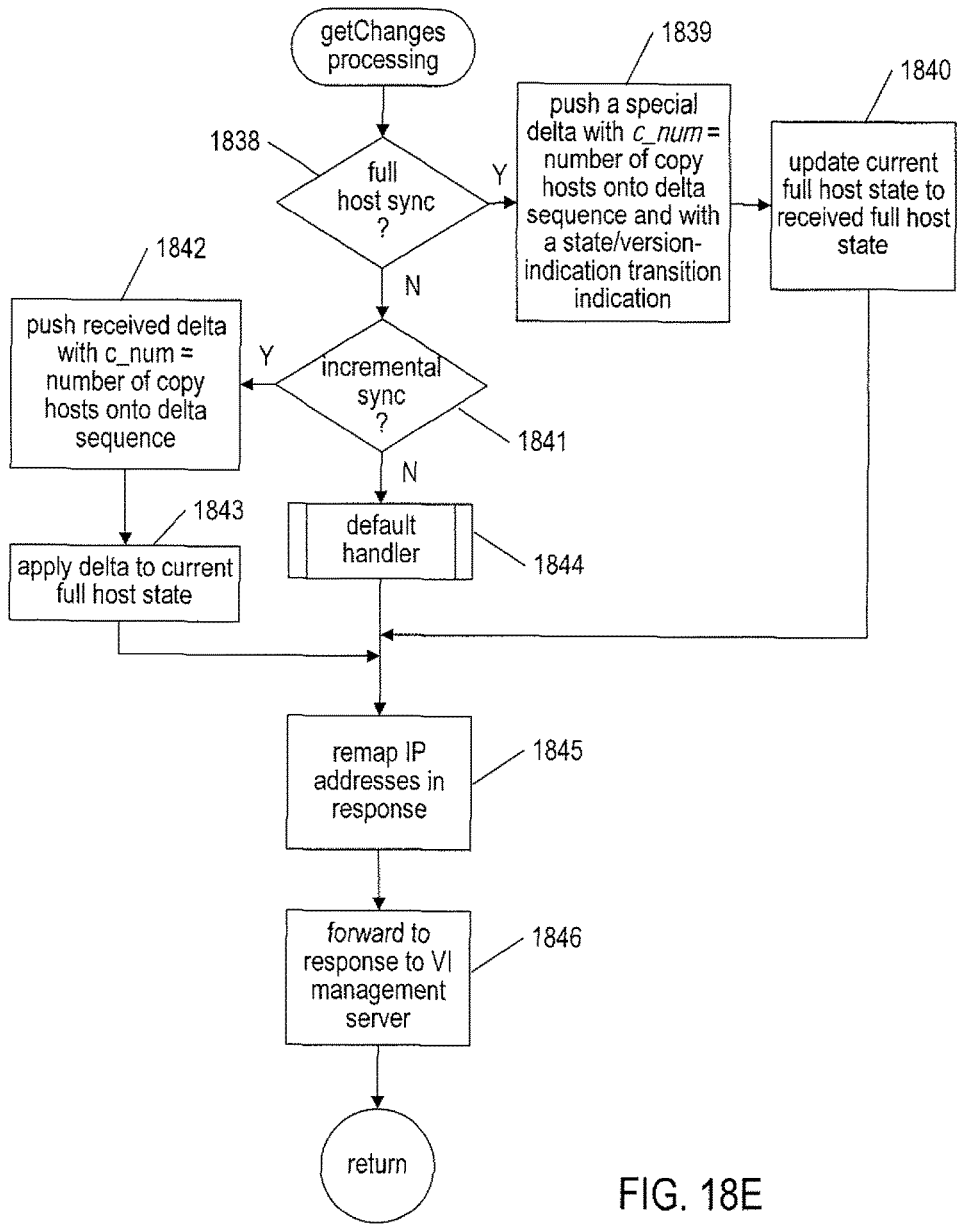

FIG. 18E provides a control-flow diagram for the getChanges processing routine called in step 1834 of FIG. 18D. When the response to the getChanges request includes a full host state, which corresponds to a full host sync operation, as determined in step 1838, a special delta is pushed onto the delta sequence (1746-1748) in FIG. 17C to indicate return of a full host state. In addition, the value c_num associated with the delta is set to the number of copied hosts communicating with the native-host adapter and the delta is associated with a state/version-indicator transition, such as the transition 1750 shown in FIG. 17C, in step 1839. In step 1840, the current full host state (1744 in FIG. 17C) locally stored within the native host adapter is updated to the full host state received in the response message. Otherwise, when the received response to the getChanges request corresponds to an incremental sync operation, and therefore contains a delta change, as determined in step 1841, then the received delta change is pushed onto the sequence of deltas (1746-1748 in FIG. 17C) maintained within the native host adapter, with the value c_num associated with the delta set to the number of copied hosts communicating with the native-host adapter and with an appropriate state/version indicator transition indication, in step 1842. In step 1842, the received delta change is applied to the locally stored current full host state to produce a new full host state. A default handler 1844 is shown to indicate that other types of response to the getChanges request may additionally be handled by the native host adapter. In step 1845, the IP addresses within the response to the getChanges request are remapped using the remapping table (1740 in FIG. 17C) within the native host adapter. Finally, in step 1846, the response to the getChanges request is forwarded to the VI management server.

Figure 18F:
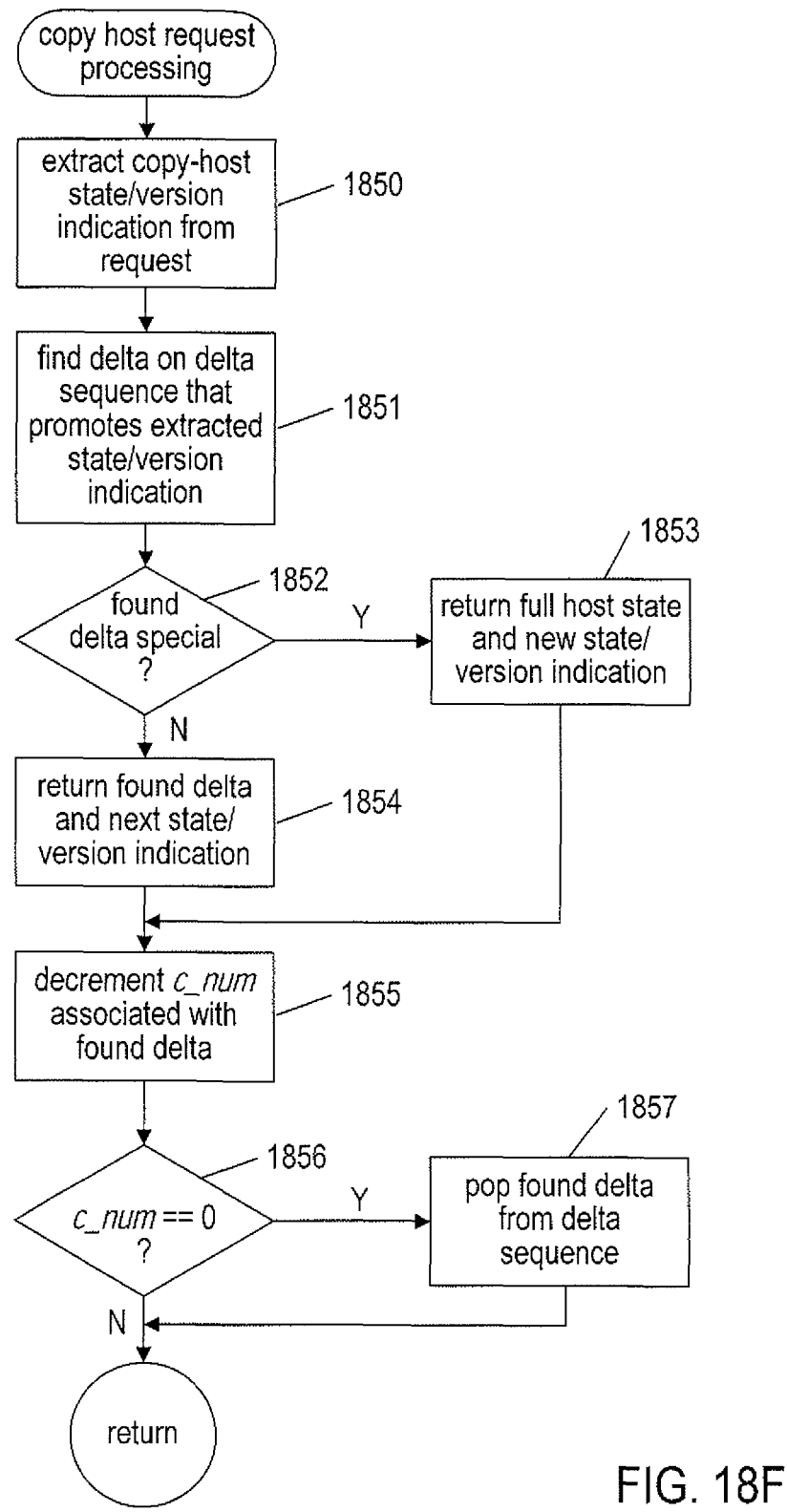

FIG. 18F provides a control-flow diagram for the copied host request processing routine called in step 1810 of FIG. 18A. In step 1850, the routine extracts the current copied-host state/version indicator from the request message. In step 1851, the routine finds a delta on the delta sequence stored within a native host adapter that promotes the extracted state/version indicator to a new state/version indicator. When the delta found in step 1851 is a special delta, as determined in step 1852, then the native host adapter returns the full host state and corresponding new state/version indicator to the requesting copied host in step 1853. Otherwise, the found delta change and corresponding new state/version indicator are returned in step 1854. In step 1855, the value c_num associated with the found delta is decremented. When the current value of c_num is now 0, as determined in step 1856, the delta found in step 1851 is popped or removed from the delta sequence in step 1857, since it is no longer needed by any additional copied hosts.

Figure 19A:
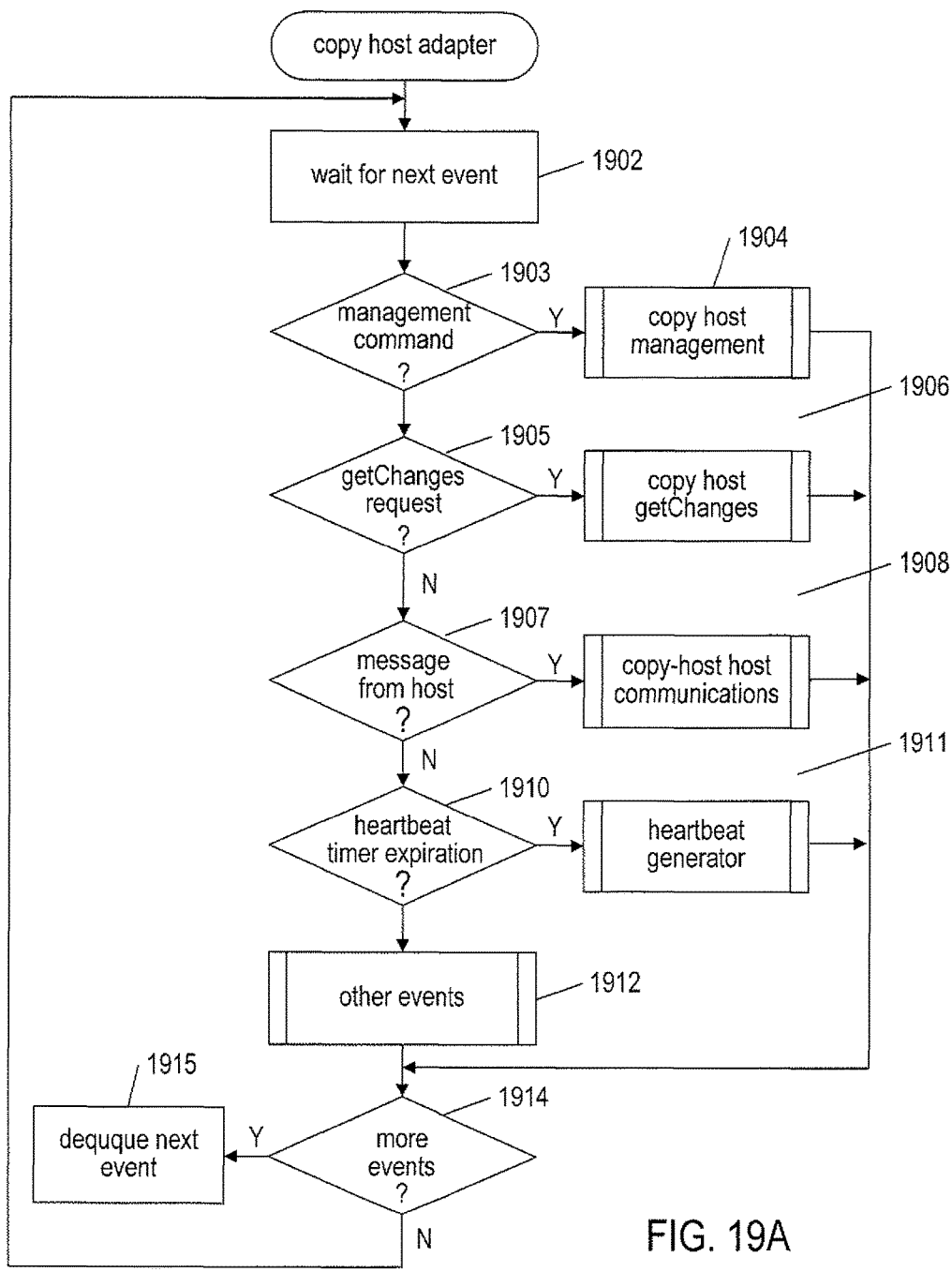
FIGS. 19A-D illustrate operation of a copied host adapter which simulates the presence of a host server.

FIGS. 19A-D illustrate operation of a copied host adapter which simulates the presence of a host server. FIG. 19A shows a control-flow diagram for an event loop that models operation of the copied host adapter. In step 1902, the copied host adapter waits for a next event to occur. When the next-occurring event is a reception of a management command from the VI management server, as determined in step 1903, a copied host management handler is called in step 1904. Otherwise, when the event corresponds to reception of a getChanges request from the VI management server, as determined in step 1905, a copied host getChanges handler is called in step 1906. When the event corresponds to reception of a message from the native host computer, as determined in step 1907, a copied-host host-communications handler is called in step 1908. Otherwise, when the event is expiration of a heartbeat timer, as determined in step 1910, then the heartbeat generator (1764 in FIG. 17D) is invoked, in step 1911, to generate a new heartbeat message, reset the heartbeat timer, and send the heartbeat message to the VI management server. A default handler 1912 is shown in FIG. 19A to indicate other events may occur and may be handled by the copied host adapter during copied-host-adapter operation. When there are more events queued for handling, as determined in step 1914, control flows to step 1915, where a next event is dequeued from a queue of pending events and control returns to step 1903. Otherwise, control returns to step 1902.

Figure 19B:
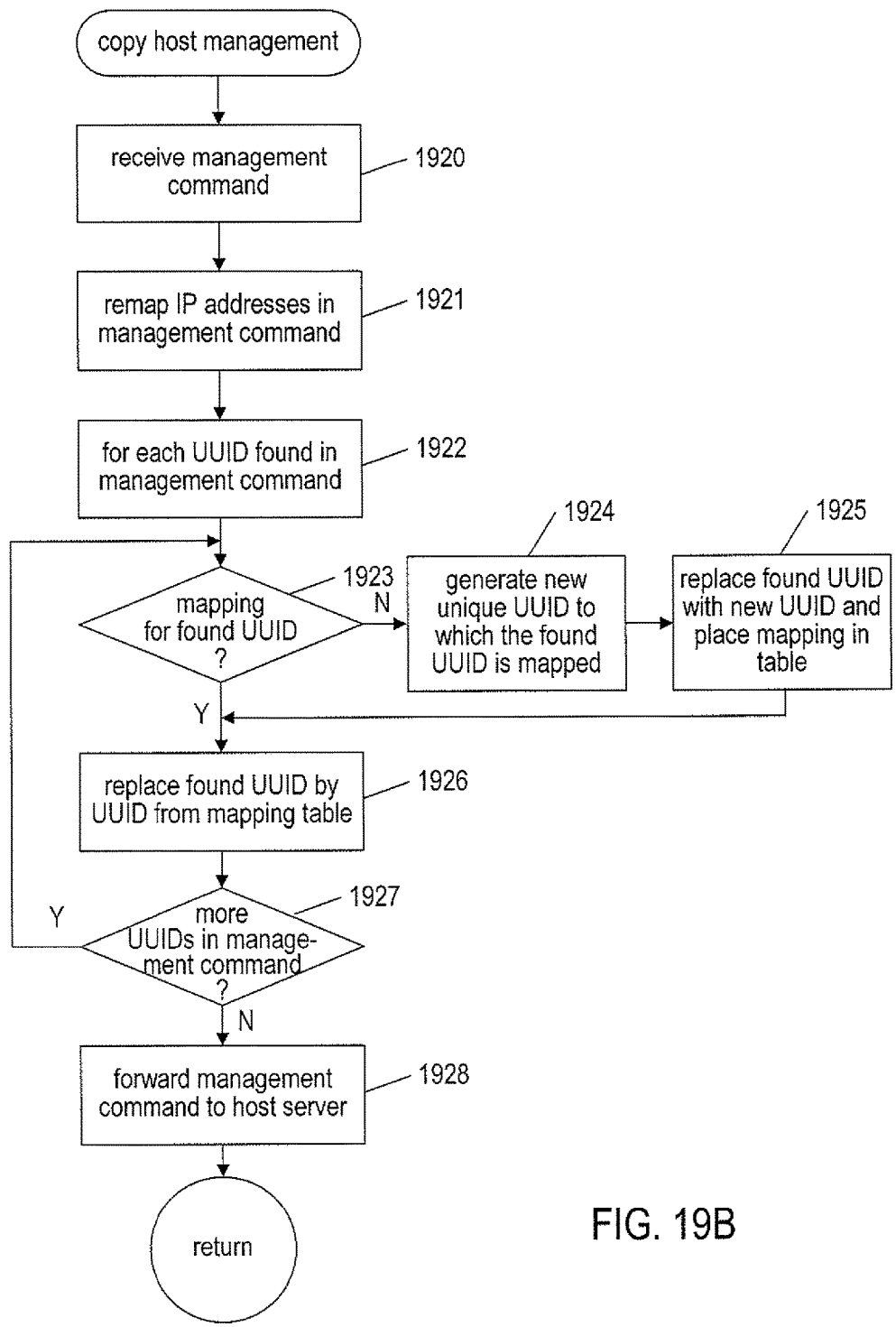

FIG. 19B provides a control-flow diagram for the copied host management handler shown in step 1904 of FIG. 19A. In step 1920, the management command is received. In step 1921, the IP addresses in the management command are remapped using the IP-address remapping table (1760 in FIG. 17D). In the for-loop of steps 1922-1927, the handler identifies each UUID within the management command. When no remapping can be found for the currently considered UUID found in the management command, as determined in step 1923, a new unique UUID is generated for remapping the UUID, in step 1924, and the found UUID is replaced with the newly generated UUID, in step 1925. Otherwise, in step 1926, the remapping found for the UUID is used to remap the found UUID to the corresponding UUID in the remapping identified in the remapping table. In step 1928, the management command with remapped IP addresses and UUIDs is forwarded to the native host server.

Figure 19C:
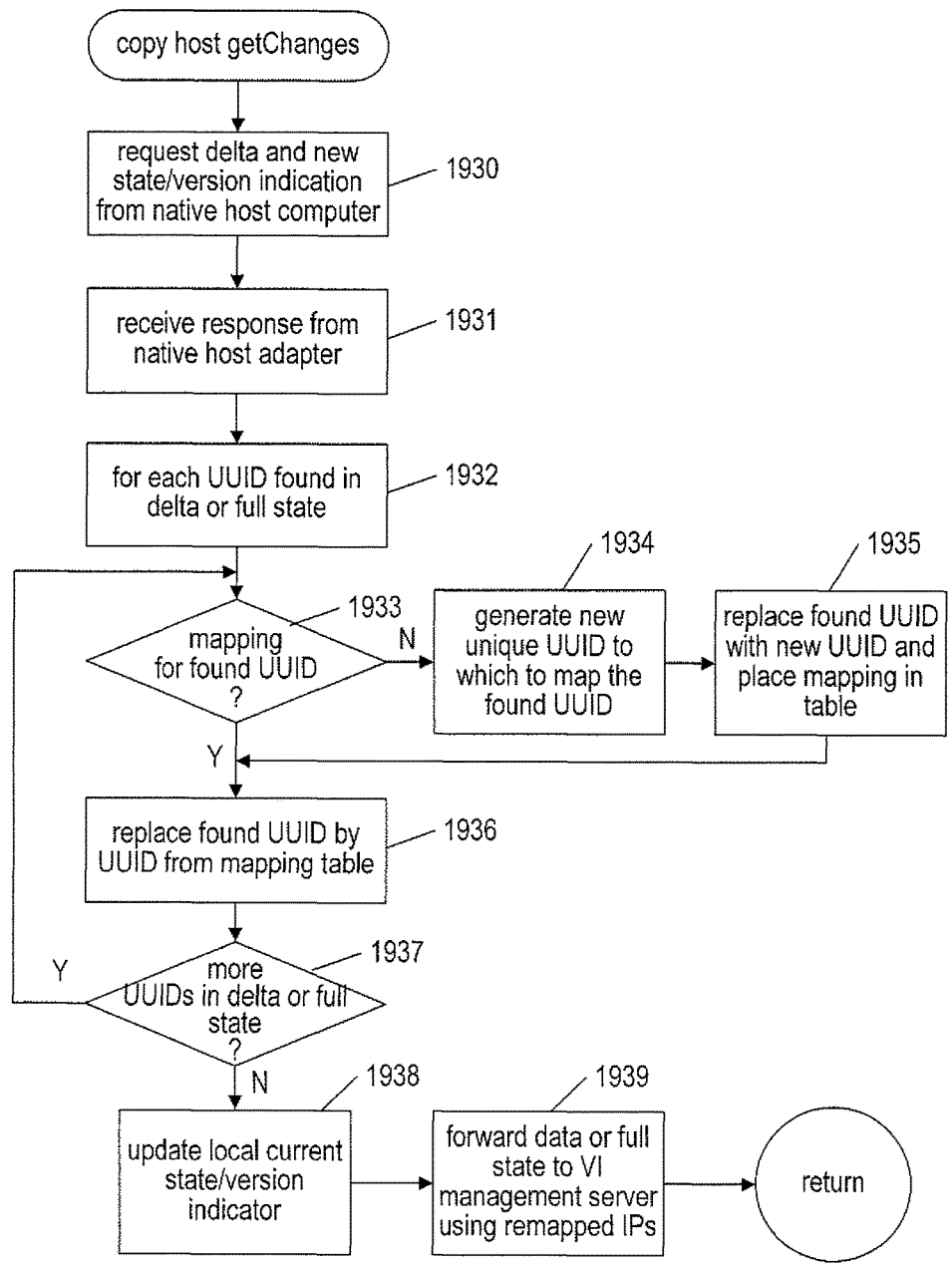

FIG. 19C provides a control-flow diagram for the copied host getChanges handler shown as step 1906 in FIG. 19A. In step 1930, the handler requests a delta and new state/version indication from the native host adapter, supplying the current state/version indicator stored locally in the copied host adapter (1762 in FIG. 17D). In step 1931, the handler receives a response from the native host adapter. The handler extracts the delta or full state from the response message and remaps all UUIDs within the delta or full state in the for-loop of steps 1932-1937. In step 1938, the handler updates the locally stored current state/version indicator to that received in the response from the native host adapter and, in step 1939, forwards the delta or full state to the VI management server using remapped IP addresses.

Figure 19D:
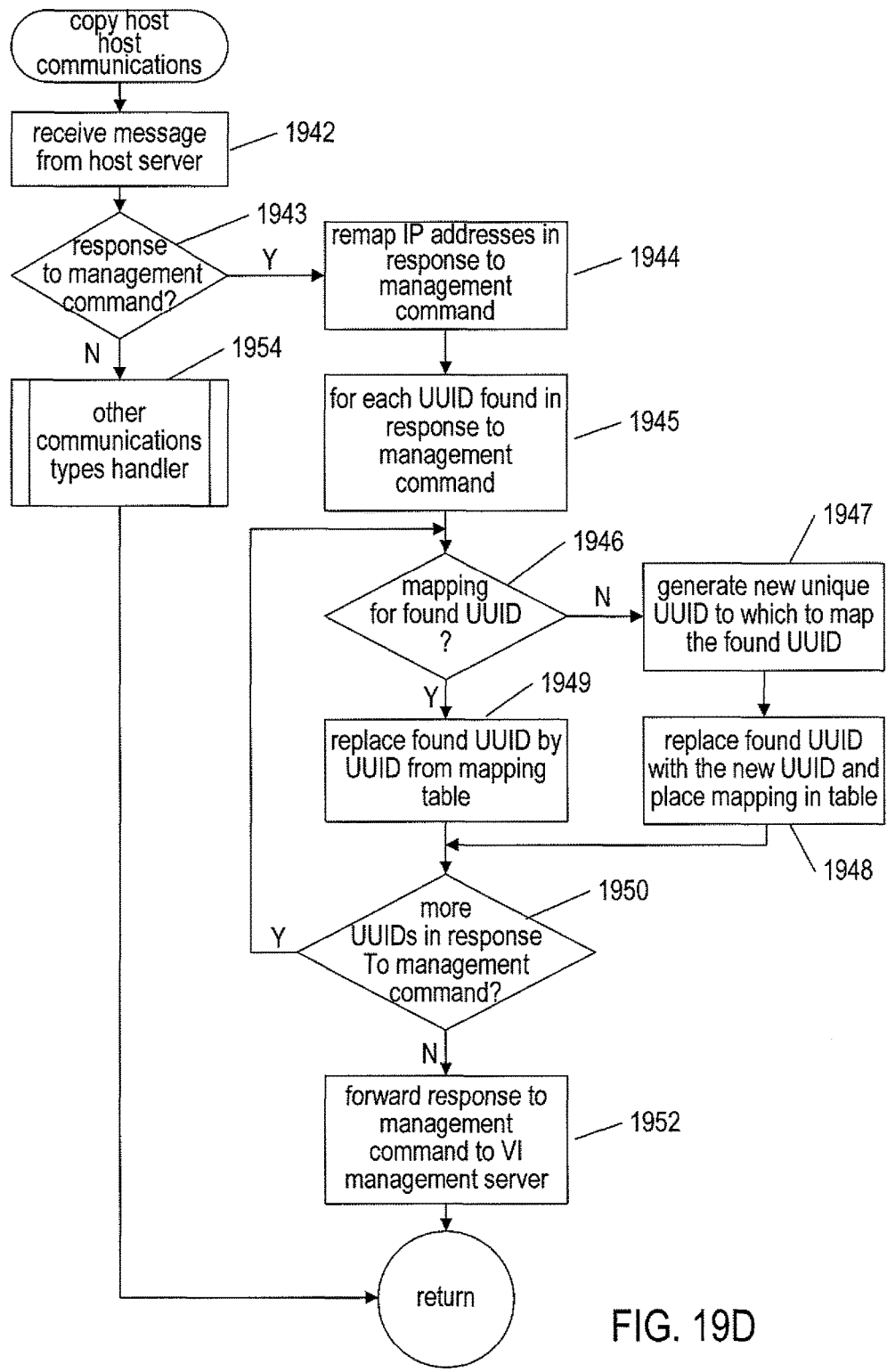

FIG. 19D provides a control-flow diagram for the copied host host-communications handler shown as step 1908 in FIG. 19A. In step 1942, the handler receives a message from the native host server. When the message is a response to a management command, as determined in step 1943, then, in step 1944, the handler remaps IP addresses in the response and, in the for-loop of steps 1945-1950, remaps any UUIDs in the response to the management command. In step 1952, the handler forwards the response to the management command, with remapped IP addresses and UUIDs, to the VI management server. A default handler 1954 is shown in FIG. 19D to indicate that other types of host communications may be received and handled by the copied host adapter.

Thus, the native-host adapter and copied-host adapter cooperate within the host-gateway appliance to simulate an additional host server for testing purposes. As discussed above, any number of copied-host adapters may be included within the host-gateway appliance and may cooperate with the native host adapter to simulate that number of additional host servers. The copied host adapter generates simulated heartbeat messages for the simulated host but passes management commands, with remapped UUIDs, to the native host to which the native host adapter is connected and returns responses to those commands, again with remapped UUIDs, from the native host to the VI management server. State information returned in response to receiving getChanges requests from the VI management server is obtained from the native host adapter, which stores the contents of responses to getChanges requests from the native host server as long as they are needed by copied host adapters. In this way, all of the simulated native host servers faithfully replay or replicate the state changes observed for the actual native host server to which the native host adapter is connected.

As discussed above with reference to FIG. 17A, the host-gateway appliance may also support simulated host adapters that simulate host servers. A variety of different implementations of simulated host adapters is possible. In general, a simulated host adapter runs one or more scripts that together implement a host-server emulation. Various different types of scripting languages may be used, including JavaScript. The simulated host adapter receives and processes all incoming messages from the VI management server via the script-based emulation. In certain cases, simulated responses may be immediately returned using message templates and locally stored or generated data. In other cases, much as a copied host, the simulated host may modify incoming messages and forward them to an actual host. In yet other cases, incoming messages may simply be discarded, when they are not needed to maintain the illusion of a remote simulated host server. Simulated hosts may be used as pure emulators, without communicating with real hosts, as testing engines that alter received messages before forwarding them to a real host, or as latency simulators that introduce latencies in the VI-management-server-to-physical-host communications. In a sense, simulated hosts are somewhat more generalized artificial host servers than copied hosts, using scripted simulation and emulation logic in addition to access to both the VI management server and, in certain cases, an actual native host to carry out various types of simulations.

Although the present invention has been described in terms of particular embodiments, it is not intended that the invention be limited to these embodiments. Modifications within the spirit of the invention will be apparent to those skilled in the art. For example, any of many different design and implementation parameters may be varied in order to generate a variety of different implementations of the above-disclosed methods and systems, including choice of native virtualization layers, programming languages, communications protocols, modular organization, data structures, control structures, and other such design and implementation parameters. As discussed above, various implementation details may be varied to produce alternative implementations.

It is appreciated that the previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

The invention claimed is:

1. A virtual-infrastructure-management-server-testing-and-analysis system comprising:
    one or more processors;
    one or more memories;
    communications controllers and hardware;
    a communications agent that includes computer instructions stored in one or more of the one or more memories that are executed on one or more of the one or more processors to control the communications agent to receive electronic messages from a virtual-infrastructure-management server and return responses to the electronic messages through the communications controllers and hardware to the virtual-infrastructure-management server;
    at least one physical-host adapter, including computer instructions stored in one or more of the one or more memories that are executed on one or more of the one or more processors to control the at least one physical-host adapter to forward messages to a native or foreign physical host server and receive messages from the native or foreign physical host server through the communications controllers and hardware; and
    at least one simulation adapter, including computer instructions stored in one or more of the one or more memories that are executed on one or more of the one or more processors to control the simulation adapter to simulate connectivity to a physical host server, the simulation adapter selected from among
        when the virtual-infrastructure-management-server-testing-and-analysis system includes at least one physical-host adapter that exchanges messages with a native physical host server, a copied-host adapter that receives management commands from the virtual-infrastructure-management server, remaps IP-addresses and component identifiers in the received commands, and forwards the received and remapped management commands to the physical host server and that receives responses to management commands from the physical host server, remaps IP-addresses and component identifiers, and forwards the received and remapped responses to the virtual-infrastructure-management server, and
        a simulated-host adapter that employs script-based emulation logic to emulate a host server.

2. The virtual-infrastructure-management-server-testing-and-analysis system of claim 1 wherein the physical-host adapter forwards message to, and receives messages from, a native physical host adapter; and
    wherein the physical-host adapter comprises:
        a communications interface to the communications agent,
        a communications interface to the native physical host server,
        an interface for information exchange between the native physical-host adapter and the simulation adapter,
        an IP-address remapping table,
        a current state/version indication,
        a current physical-host-state representation, and
        a sequence of delta changes, each associated with
            a state/version-indication transition, and
            a number of copied-host adapters which have not yet received the delta change.

3. The virtual-infrastructure-management-server-testing-and-analysis system of claim 2 wherein the IP-address remapping table is used by the physical-host adapter to modify received messages before forwarding the received messages and contains:
    forward IP-address remappings that remap one or more virtual-infrastructure-management-server-testing-and-analysis-system addresses to physical-host-server addresses and that remap one or more VI management server IP addresses to virtual-infrastructure-management-server-testing-and-analysis-system addresses; and
    reverse IP-address remappings that remap one or more physical-host-server addresses to virtual-infrastructure-management-server-testing-and-analysis- system addresses and that remap one or more virtual-infrastructure-management-server-testing-and-analysis-system addresses to VI management server IP addresses.

4. The virtual-infrastructure-management-server-testing-and-analysis system of claim 2 wherein the current state/version indication represents the current state/version of the native physical host system, obtained from a heartbeat message received from the native physical host system.

5. The virtual-infrastructure-management-server-testing-and-analysis system of claim 2 wherein the current physical-host-state representation represents the current state of the native physical host system, obtained from a response to a getChanges request received from the native physical host system.

6. The virtual-infrastructure-management-server-testing-and-analysis system of claim 2 wherein the sequence of delta changes, each associated with a state/version-indication transition and a number of copied-host adapters which have not yet received the delta change represents a most recent sequence of responses to getChanges requests received from the physical host system.

7. The virtual-infrastructure-management-server-testing-and-analysis system of claim 1 wherein a copied-host adapter comprises:
    a communications interface to the communications agent;
    a communications interface to the physical host server;
    an interface for information exchange between the physical-host adapter and the simulation adapter;
    an IP-address remapping table;
    a UUID remapping table;
    a current state/version indication; and
    a heartbeat generator.

8. The virtual-infrastructure-management-server-testing-and-analysis system of claim 7 wherein the UUID remapping table is used by the copied-host adapter to modify received messages before forwarding the received messages and contains:
    forward UUID remappings that remap UUIDSs contained in messages received from the virtual-infrastructure-management server to simulated-host UUIDs; and
    reverse UUID remappings that remap simulated-host UUIDs to UUIDSs contained in messages forwarded to the virtual-infrastructure-management server.

9. The virtual-infrastructure-management-server-testing-and-analysis system of claim 7 wherein the current state/version indication represents the current state/version of the simulated host system.

10. The virtual-infrastructure-management-server-testing-and-analysis system of claim 1 wherein the physical-host adapter:
    receives management commands from the virtual-infrastructure-management server, remaps IP-addresses in the received commands, and forwards the received and remapped management commands to the physical host server;
    receives responses to management commands from the physical host server, remaps IP-addresses in the received responses to management commands, and forwards the received and remapped responses to management commands to the virtual-infrastructure-management server;
    receives heartbeat messages from the physical host server, updates the current state/version indication using information extracted from the heartbeat messages, remaps IP-addresses in the heartbeat messages, and forwards the remapped heartbeat messages to the virtual-infrastructure -management server;
    receives getChanges requests from the from the virtual-infrastructure-management server, remaps IP-addresses in the received getChanges requests, and forwards the received and remapped getChanges requests to the physical host server;
    receives responses to getChanges requests from the physical host server, remaps IP-addresses in the received responses to getChanges requests, updates the current physical-host-state representation the sequence of delta changes using information extracted from the responses to getChanges requests, and forwards the remapped responses to getChanges requests to the virtual-infrastructure-management server; and
    receives requests for host-state information from a copied-host adapter and returns state information contained in the current physical-host-state representation or in a delta change to the copied-host adapter.

11. The virtual-infrastructure-management-server-testing-and-analysis system of claim 1 wherein a simulated-host adapter:
    receives management commands from the virtual-infrastructure-management server, remaps IP-addresses in the received commands, remaps UUIDs in the received commands, and forwards the received and remapped management commands to the physical host server;
    receives responses to management commands from the physical host server, remaps IP-addresses in the received responses to management commands, remaps UUIDs in the received responses to management commands, and forwards the received and remapped responses to management commands to the virtual-infrastructure-management server;
    generates heartbeat messages and forwards the heartbeat messages to the virtual-infrastructure-management server; and
    receives getChanges requests from the from the virtual-infrastructure-management server, requests state information from the physical-host adapter, receives responses to the state-information requests from the physical-host adapter and places information extracted from the received responses to the state-information requests into responses to the getChanges requests, remaps UUIDs in the responses to the getChanges requests, and forwards the remapped responses to the getChanges requests to the virtual-infrastructure-management server.

12. The virtual-infrastructure-management- server-testing-and-analysis system of claim 1 wherein a simulated-host adapter comprises:
    a communications interface to the communications agent;
    a communications interface to the physical host server;
    an interface for information exchange between the physical-host adapter and the simulation adapter; and
    the script-based emulation logic for emulating a host server.

13. A method that produces a virtual-infrastructure-management server for testing and analysis, the method comprising:
    providing a host-gateway appliance that includes one or more processors, one or more memories, communications controllers and hardware, and a communications agent that includes computer instructions stored in one or more of the one or more memories that are executed on one or more of the one or more processors to control the communications agent to receive electronic messages from a virtual-infrastructure-management server and return responses to the electronic messages through the communications controllers and hardware to the virtual-infrastructure -management server; and
    modifying the host-gateway appliance to produce an infrastructure-management-server-testing-and-analysis system by incorporating, into the host-gateway appliance
        at least one physical-host adapter, including computer instructions stored in one or more of the one or more memories that are executed on one or more of the one or more processors to control the at least one physical-host adapter to forward messages to a native or foreign physical host server and receive messages from the native or foreign physical host server through the communications controllers and hardware, and
        at least one simulation adapter, including computer instructions stored in one or more of the one or more memories that are executed on one or more of the one or more processors to control the simulation adapter to simulate connectivity to a physical host server, the simulation adapter selected from among
when the virtual-infrastructure-management- server-testing-and-analysis system includes at least one physical-host adapter that exchanges messages with a native physical host server, a copied-host adapter that receives management commands from the virtual-infrastructure-management server, remaps IP-addresses and component identifiers in the received commands, and forwards the received and remapped management commands to the physical host server and that receives responses to management commands from the physical host server, remaps IP-addresses and component identifiers, and forwards the received and remapped responses to the virtual-infrastructure-management server, and
a simulated-host adapter that employs script-based emulation logic to emulate a host server.

14. The method of claim 13
wherein the physical-host adapter forwards message to, and receives messages from, a native physical host adapter; and
wherein the physical-host adapter comprises:
a communications interface to the communications agent,
a communications interface to the native physical host server,
an interface for information exchange between the native physical-host adapter and the simulation adapter,
an IP-address remapping table,
a current state/version indication,
a current physical-host-state representation, and
a sequence of delta changes, each associated with
a state/version-indication transition, and
a number of copied-host adapters which have not yet received the delta change.

15. The method of claim 14 wherein the IP-address remapping table is used by the physical-host adapter to modify received messages before forwarding the received messages and contains:
forward IP-address remappings that remap one or more virtual-infrastructure-management-server-testing-and-analysis-system addresses to physical-host-server addresses and that remap one or more VI management server IP addresses to virtual-infrastructure-management-server-testing-and-analysis-system addresses; and
reverse IP-address remappings that remap one or more physical-host-server addresses to virtual-infrastructure-management-server-testing-and-analysis- system addresses and that remap one or more virtual-infrastructure-management-server-testing-and-analysis-system addresses to VI management server IP addresses.

16. The method of claim 14
wherein the current state/version indication represents the current state/version of the native physical host system, obtained from a heartbeat message received from the native physical host system;
wherein the current physical-host-state representation represents the current state of the native physical host system, obtained from a response to a getChanges request received from the native physical host system; and wherein the sequence of the delta changes, each associated with a state/version-indication transition and a number of copied-host adapters which have not yet received the delta change represents a most recent sequence of responses to getChanges requests received from the physical host system.

17. The method of claim 13 wherein a copied-host comprises:
a communications interface to the communications agent;
a communications interface to the physical host server;
an interface for information exchange between the physical-host adapter and the simulation adapter;
an IP-address remapping table;
a UUID remapping table;
a current state/version indication; and
a heartbeat generator.

18. The method of claim 17 wherein the UUID remapping table is used by the copied-host adapter to modify received messages before forwarding the received messages and contains:
forward UUID remappings that remap UUIDSs contained in messages received from the virtual-infrastructure-management server to simulated-host UUIDs; and
reverse UUID remappings that remap simulated-host UUIDs to UUIDSs contained in messages forwarded to the virtual-infrastructure-management server.

19. The method of claim 17 wherein the current state/version indication represents the current state/version of the simulated host system.

20. A method that simulates host servers in communication with a virtual-infrastructure-management server for testing and analysis, the method comprising:
connecting a virtual-infrastructure-management-server-testing-and-analysis system to the virtual-infrastructure-management server, the virtual-infrastructure-management-server-testing-and-analysis system comprising
one or more processors,
one or more memories,
communications controllers and hardware,
a communications agent that includes computer instructions stored in one or more of the one or more memories that are executed on one or more of the one or more processors to control the communications agent to receive electronic messages from a virtual-infrastructure-management server and return responses to the electronic messages through the communications controllers and hardware to the virtual-infrastructure-management server,
at least one physical-host adapter, including computer instructions stored in one or more of the one or more memories that are executed on one or more of the one or more processors to control the at least one physical-host adapter to forward messages to a native or foreign physical host server and receive messages from the native or foreign physical host server through the communications controllers and hardware; and
at least one simulation adapter, including computer instructions stored in one or more of the one or more memories that are executed on one or more of the one or more processors to control the simulation adapter to simulate connectivity to a physical host server, the simulation adapter selected from among
when the virtual-infrastructure-management- server-testing-and-analysis system includes at least one physical-host adapter that exchanges messages with a native physical host server, a copied-host adapter that receives management commands from the virtual-infrastructure-management server, remaps IP-addresses and component identifiers in the received commands, and forwards the received and remapped management commands to the physical host server and that receives responses to management commands from the physical host server, remaps IP-addresses and component identifiers, and forwards the received and remapped responses to the virtual-infrastructure-management server, and a simulated-host adapter that employs script-based emulation logic to emulate a host server.

21. The method of claim 20 wherein the physical-host adapter:

receives management commands from the virtual-infrastructure-management server, remaps IP-addresses in the received commands, and forwards the received and remapped management commands to the physical host server;

receives responses to management commands from the physical host server, remaps IP-addresses in the received responses to management commands, and forwards the received and remapped responses to management commands to the virtual-infrastructure-management server;

receives heartbeat messages from the physical host server, updates the current state/version indication using information extracted from the heartbeat messages, remaps IP-addresses in the heartbeat messages, and forwards the remapped heartbeat messages to the virtual-infrastructure-management server;

receives getChanges requests from the from the virtual-infrastructure-management server, remaps IP-addresses in the received getChanges requests, and forwards the received and remapped getChanges requests to the physical host server;

receives responses to getChanges requests from the physical host server, remaps IP-addresses in the received responses to getChanges requests, updates the current physical-host-state representation the sequence of delta changes using information extracted from the responses to getChanges requests, and forwards the remapped responses to getChanges requests to the virtual-infrastructure-management server; and receives requests for host-state information from a copied-host adapter and returns state information contained in the current physical-host-state representation or in a delta change to the copied-host adapter.

22. The method of claim 20 wherein a simulated-host adapter:

receives management commands from the virtual-infrastructure-management server, remaps IP-addresses in the received commands, remaps UUIDs in the received commands, and forwards the received and remapped management commands to the physical host server;

receives responses to management commands from the physical host server, remaps IP-addresses in the received responses to management commands, remaps UUIDs in the received responses to management commands, and forwards the received and remapped responses to management commands to the virtual-infrastructure-management server;

generates heartbeat messages and forwards the heartbeat messages to the virtual-infrastructure-management server; and receives getChanges requests from the from the virtual-infrastructure-management server, requests state information from the physical-host adapter, receives responses to the state-information requests from the physical-host adapter and places information extracted from the received responses to the state-information requests into responses to the getChanges requests, remaps UUIDs in the responses to the getChanges requests, and forwards the remapped responses to the getChanges requests to the virtual-infrastructure-management server.

* * * * *